US008302852B2

(12) United States Patent
Brown

(10) Patent No.: US 8,302,852 B2
(45) Date of Patent: Nov. 6, 2012

(54) MONEY MANAGEMENT NETWORK

(76) Inventor: Nicholas Anthony Lindsay Brown, Petaluma, CA (US)

( * ) Notice: Subject to any disclaimer, the term of this patent is extended or adjusted under 35 U.S.C. 154(b) by 165 days.

(21) Appl. No.: 12/777,269

(22) Filed: May 11, 2010

(65) Prior Publication Data
US 2010/0223160 A1    Sep. 2, 2010

Related U.S. Application Data

(63) Continuation of application No. 11/895,881, filed on Aug. 27, 2007, now Pat. No. 7,748,614.

(51) Int. Cl.
*G06Q 40/00* (2012.01)
(52) U.S. Cl. ........................................ 235/379; 235/380
(58) Field of Classification Search .................. 235/379, 235/380; 705/64, 67, 75, 76
See application file for complete search history.

(56) References Cited

U.S. PATENT DOCUMENTS

| | | |
|---|---|---|
| 5,383,113 A | 1/1995 | Kight et al. |
| 5,850,442 A | 12/1998 | Muftic |
| 5,866,889 A | 2/1999 | Weiss et al. |
| 5,884,288 A | 3/1999 | Chang et al. |
| 5,974,146 A | 10/1999 | Randle et al. |
| 5,978,780 A | 11/1999 | Watson |
| 5,996,076 A | 11/1999 | Rowney et al. |
| 6,085,168 A | 7/2000 | Mori et al. |
| 6,088,686 A | 7/2000 | Walker et al. |
| 6,098,053 A | 8/2000 | Slater |
| 6,128,603 A | 10/2000 | Dent et al. |
| 6,173,272 B1 | 1/2001 | Thomas et al. |
| 6,292,789 B1 | 9/2001 | Schutzer |
| 6,311,170 B1 | 10/2001 | Embrey |
| 6,397,196 B1 | 5/2002 | Kravetz et al. |
| 6,411,938 B1 | 6/2002 | Gates et al. |
| 6,473,740 B2 * | 10/2002 | Cockrill et al. ............ 705/26.81 |
| 6,721,713 B1 | 4/2004 | Guheen et al. |
| 6,754,636 B1 | 6/2004 | Walker et al. |
| 6,760,711 B1 | 7/2004 | Gillett et al. |
| 7,076,458 B2 | 7/2006 | Lawlor et al. |
| 7,080,048 B1 | 7/2006 | Sines et al. |
| 7,089,202 B1 | 8/2006 | McNamar et al. |
| 7,146,338 B2 | 12/2006 | Kight et al. |
| 7,748,614 B2 | 7/2010 | Brown |
| 2001/0027437 A1 | 10/2001 | Turbeville et al. |
| 2001/0032139 A1 | 10/2001 | Debonnett, Jr. |
| 2001/0032155 A1 | 10/2001 | Groat et al. |
| 2001/0032178 A1 | 10/2001 | Adams et al. |
| 2001/0056399 A1 | 12/2001 | Saylors |

(Continued)

FOREIGN PATENT DOCUMENTS
WO   WO 0157813   8/2001
(Continued)

OTHER PUBLICATIONS

Fringe Benefits Management Company, "EZ Deduct"; http://www.fbmc-benefits.com/aboutfmbc/ezdeduct.asp (Jun. 24, 2001).

(Continued)

*Primary Examiner* — Ahshik Kim

(57) ABSTRACT

A money management system allowing customers to purchase goods or services from a vendor and authorize transactions from their account in a financial institution without either the vendor or the money management system having access to the sensitive financial information of the customer. The customer's financial institution account identifier is connected to a vendor order identifier at the money management system at the request of the customer, allowing a purchase to take place.

13 Claims, 34 Drawing Sheets

U.S. PATENT DOCUMENTS

| | | | |
|---|---|---|---|
| 2002/0010612 | A1 | 1/2002 | Smith et al. |
| 2002/0016769 | A1 | 2/2002 | Barbara et al. |
| 2002/0128921 | A1 | 9/2002 | Tarr |
| 2003/0074311 | A1 | 4/2003 | Saylors et al. |
| 2003/0211886 | A1 | 11/2003 | Buchanan et al. |
| 2004/0111370 | A1 | 6/2004 | Saylors et al. |
| 2005/0211765 | A1 | 9/2005 | Brown et al. |
| 2006/0212392 | A1 | 9/2006 | Brown |
| 2006/0212393 | A1 | 9/2006 | Brown |
| 2008/0215472 | A1 | 9/2008 | Brown |
| 2008/0270304 | A1 | 10/2008 | Brown |

FOREIGN PATENT DOCUMENTS

| | | |
|---|---|---|
| WO | WO 03034186 | 4/2003 |
| WO | WO 2004084047 | 9/2004 |

OTHER PUBLICATIONS

U.S. Appl. No. 60/214,088, filed Jun. 27, 2000, Titled, "Web Dependent Consumer Financing and Virtual Reselling Method," Now Expired.

U.S. Appl. No. 60/570,968, filed May 14, 2004, Titled, "Money Management Network," Now Expired.

U.S. Appl. No. 11/982,332, filed Oct. 31, 2007, Titled, "Variable Use Advanced Messaging System and Method," Now Abandoned.

U.S. Appl. No. 11/982,365, filed Oct. 31, 2007, Titled, "Funds Transfer System and Method," Now Abandoned.

Avery et al. (1999) "Trends in Home Purchasing Lending: Consolidation and the Communitiy Reinvestment Act"; Federal Reserve Bulletin; 85(2):81.

International Search Report, International Application No. PCT/US2002/033584, Dated Aug. 22, 2003.

International Search Report, International Application No. PCT/US2004/008581, Dated Nov. 9, 2005.

"Computer Incentive Program—Riverview SD"; http://www.pde.psu.edu/supersolutions/computerincentive/compincriverview.html (Jun. 24, 2001).

"Digital Wallet"; http://www.webopedia.com/term/digital_wallet.html (Sep. 22, 2003; Jul. 29, 2009).

"E-Duction: The Ultimate Way to Pay"; http://www.e-duction.com (Jun. 24, 2001).

Fringe Benefits Management Company, "EZ Deduct"; http://www.fbmcbenefits.com/aboutfmbc/ezdeduct.asp (Jun. 24, 2001).

"Teachers' Retirement System of the State of Illinois"; http://www.trs.state.il.us/pubs/ins04.html (Jun. 24, 2001).

IPIN Web Pages; http://www.ipin.com/solutions/virtual_payments/ (Oct. 21, 2003).

Northwestern Financial Review (1999) "Students, Teachers Get Educational Boost From South Dakota Bank"; 184(1):26.

Paypal Web Pages; http://www.paypal.com (Sep. 16, 2003).

\* cited by examiner

FIG. 6

| Financial Institution Home Page |
|---|

| Register for your Financial Institution Payment Account | Other Functions Available<br>Sign In<br>About Financial Institution<br>Apply for Account<br>Business Account |
|---|---|

FIG. 7

| Financial Institution Sign In Page |
|---|

| Customer ID: | Customer Name |
|---|---|
| Password: | ********* |

FIG. 8

Financial Institution Account Signup Page

Contact Information

Customer Name:     Name
Address:     Street
    Town, State, Zip
Home Phone:     Phone Number Employment Information Employer Name:     Company Name
Address:     Street
    Town, State, Zip
Work Phone:     Phone Number Account Customization ☐ Payment Account
☐ Term Loan Account
☐ Automated Savings of $ [____] per month into savings account.
☐ Automated Investment of $ [____] per month into investment account.
☐ Auto Loan

FIG. 9

Financial Institution Bill Pay Page

| Payee | Account | Amount | Date |
|---|---|---|---|
| Cable Company | xxxxx | $x.xx | Date |
| Investment Account | xxxxx | $x.xx | Date |
| Savings Account | xxxxx | $x.xx | Date |
| Mortgage | xxxxx | $x.xx | Date |

FIG. 10

| Financial Institution Account Summary Page | | | |
|---|---|---|---|
| Account | Number | Balance | Date |
| Payment Account | xxxxx | $x.xx | Today |
| Checking Account | xxxxx | $x.xx | Today |
| Savings Account | xxxxx | $x.xx | Today |
| Investment Account | xxxxx | $x.xx | Today |
| Credit Card | xxxxx | $x.xx | Today |
| Loan Account | xxxxx | $x.xx | Today |
| Mortgage | xxxxx | $x.xx | Today |

Make Payments From Paycheck | Secure Online Shopping

FIG. 11

Secure Shopping Network Shopping Page

| Category A | Category B |
|---|---|
| Company 1 | Company 1 |
| Company 2 | Company 2 |
| Company 3 | Company 3 |
| Category C | Category D |
| Company 1 | Company 1 |
| Company 2 | Company 2 |
| Company 3 | Company 3 |
| Category E | Category F |
| Company 1 | Company 1 |
| Company 2 | Company 2 |
| Company 3 | Company 3 |

FIG. 12

```
Secure Shopping Network Account Selection Page

Purchase

Vendor: Product description                    $xxx.xx

Select Payment Option

☐ Financial Institution Loan Account ($xxxxx.xx available)
    Duration of Loan [    ] years (half year increments)
    Estimated Monthly Payment of $xx.xx at xx% APR ☐ Financial Institution Checking ($xxx.xx available)

[ Submit ]   [ Cancel ]
```

FIG. 13

```
Secure Shopping Network Insurance Selection Page

☐ Involuntary Unemployment Insurance for x months for $x.xx / month.
 ☐ Disability for x months for $x.xx per month.
 ☐ Credit Life for $x.xx per month

[ Submit ]   [ Cancel ]
```

FIG. 14

Financial Institution Loan Application Page

Customer Information

| | |
|---|---|
| Customer Name: | Name |
| Address: | Street |
| | Town, State, Zip |
| Home Phone: | Phone Number |
| Employer Name: | Company Name |
| Address: | Street |
| | Town, State, Zip |
| Work Phone: | Phone Number |

Loan Terms

Loan if for x years    Monthly payments will be $xx.xx
APR x.x%    Finance charge of $xx.xx
Amount Financed $xxxx.xx  Total of Payments $xxxx.xx

[Submit]  [Cancel]

FIG. 15

Financial Institution Transaction Summary Page

Vendor: Product Summary    $xxxx.xx
Account Selected    balance
Insurance Selected
Loan Terms
   x years, $xx.xx per month, first payment xx/xx/xx Password: [*******]

[Submit]  [Cancel]

FIG. 16

| Financial Institution Bill Pay Page | | | |
|---|---|---|---|
| Payee | Account | Amount | Date |
| Cable Company | xxxxx | $x.xx | Date |
| Investment Account | xxxxx | $x.xx | Date |
| Savings Account | xxxxx | $x.xx | Date |
| Mortgage | xxxxx | $x.xx | Date |
| Loan for Vendor Product | xxxxx | $xx.xx | Date |

FIG. 17

| Financial Institution Account Summary Page | | | |
|---|---|---|---|
| Account | Number | Balance | Date |
| Payment Account | xxxxx | $x.xx | Today |
| Checking Account | xxxxx | $x.xx | Today |
| Savings Account | xxxxx | $x.xx | Today |
| Investment Account | xxxxx | $x.xx | Today |
| Credit Card | xxxxx | $x.xx | Today |
| Loan Account | xxxxx | $x.xx | Today |
| Mortgage | xxxxx | $x.xx | Today |

Purchase Status

Vendor $xxxx.xx    Product description: Status of Delivery

| Make Payments From Paycheck | Secure Online Shopping |
|---|---|

# MONEY MANAGEMENT NETWORK

The present application is a continuation of U.S. patent application Ser. No. 11/895,881, filed Aug. 27, 2007, which is a continuation application claiming the benefit under 35 USC Section 120 of U.S. patent application Ser. No. 11/130,582, filed May 16, 2005, which is a nonprovisional application of U.S. Provisional Patent Application Ser. No. 60/570,968, filed May 14, 2004, which is a continuation-in-part application of Patent Cooperation Treaty Application Serial Number PCT/US04/08581, filed Mar. 19, 2004, which is a continuation-in-part application of U.S. patent application Ser. No. 10/700,720, filed Nov. 3, 2003 which claims the benefit under 35 USC Section 119(e) of U.S. Provisional Patent Application Ser. No. 60/456,138, filed Mar. 19, 2003, and was a continuation-in-part application of Patent Cooperation Treaty Application Serial Number PCT/US02/33584 filed Oct. 16, 2002, which is a continuation-in-part application of U.S. patent application Ser. No. 10/273,961, filed Oct. 16, 2002 which claims the benefit under 35 USC Section 119(e) of U.S. Provisional Patent Application Ser. No. 60/329,773, filed Oct. 16, 2001, U.S. Provisional Patent Application Ser. No. 60/338,770, filed Dec. 5, 2001, and U.S. Provisional Patent Application Ser. No. 60/342,607, filed Dec. 21, 2001, which is a continuation-in-part application of U.S. patent application Ser. No. 09/894,644, filed Jun. 27, 2001 which claims the benefit under 35 USC Section 119(e) of U.S. Provisional Patent Application Ser. No. 60/214,088, filed Jun. 27, 2000. The present application is based on and claims priority from these applications, the disclosures of which are hereby expressly incorporated herein by reference.

BACKGROUND OF INVENTION

The present invention is directed to a money management network.

Once upon a time in America, everyone paid cash for cars. And as a result, not many people had cars. Then in 1919, the first automobile installment finance company was born. By 1925, the roads were filling up as Americans were making 75 percent of all auto purchases on the installment plan. Installment buying spread rapidly to other industries, and sales of washing machines and refrigerators boomed. The prosperity of the 1920s is often attributed to advances in mass production, but the facts show that it really rested on a revolution in consumer finance.

Mainstream banks are losing billions in wallet share to other lenders. Online credit card fraud is growing in proportion to eCommerce. Money management is much more difficult than it should be for the online banking customer.

BRIEF SUMMARY OF THE INVENTION

The present invention is directed to a money management network including a money management network, a bank web site hosted by a bank, and a vendor web site hosted by a vendor. The bank web site is accessible by a bank/vendor customer. The vendor web site accessible by the bank/vendor customer. The bank web site has means for accepting authorization for a purchase transaction from the bank/vendor customer such that the authorization verifies the bank/vendor customer's identification for the vendor. In one preferred embodiment the vendor receives authorization for a purchase without the vendor receiving customer account information from the bank/vendor customer, the bank, or the money management network.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIGS. 6-17 are exemplary screen images of the present invention.

DETAILED DESCRIPTION OF THE INVENTION

The present invention is directed to a money management network as discussed in the following sections entitled, Secure Internet Shopping, Network Summary, Information Forwarding Request System, Notification Request System, and Future Service Request. Although these sections describe separate and distinct features of the present invention, these features may be used individually or in various combinations of two or more of the features.

Figure 1:
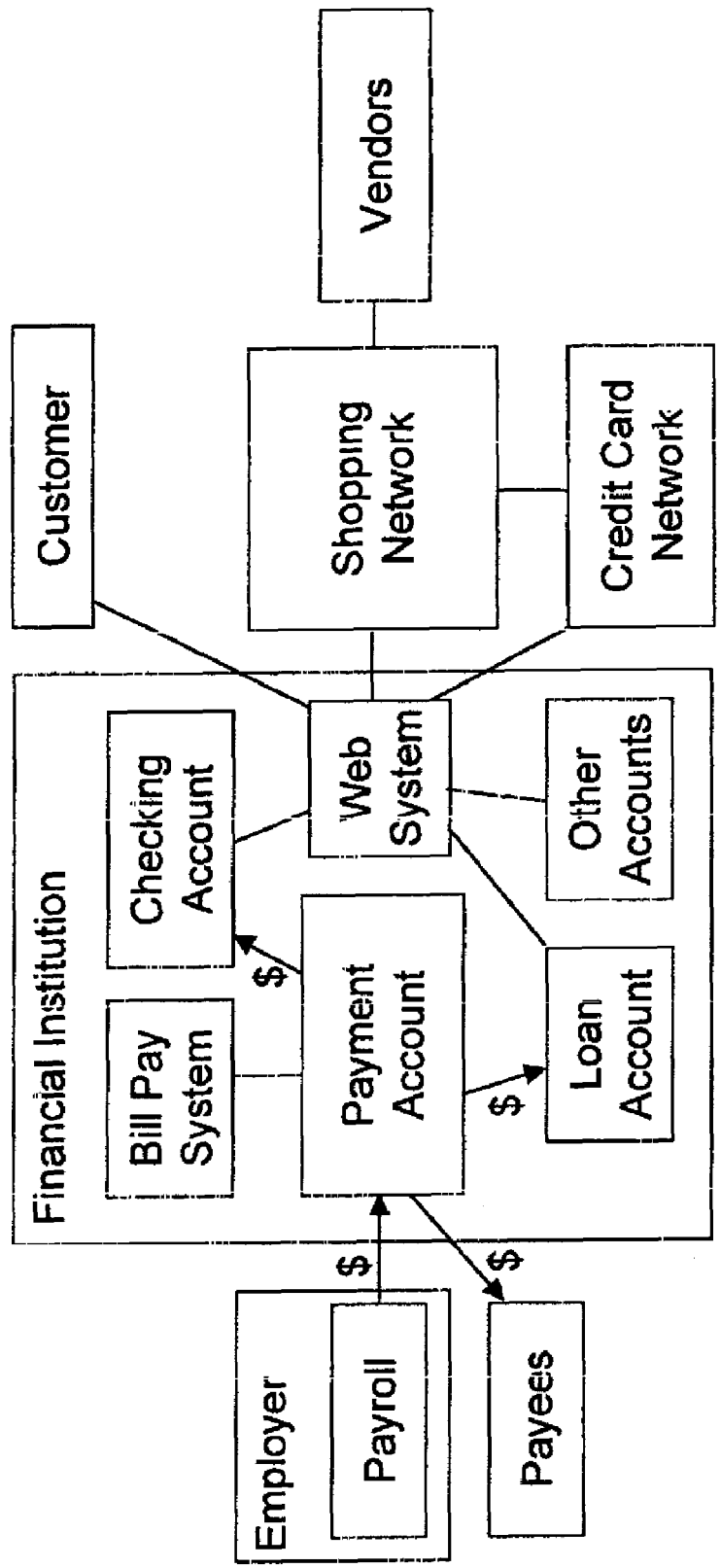
FIG. 1 is a schematic diagram of the primary exemplary components of the proprietary e-finance and e-commerce platform enhancement tools of the present invention.
Figure 2:
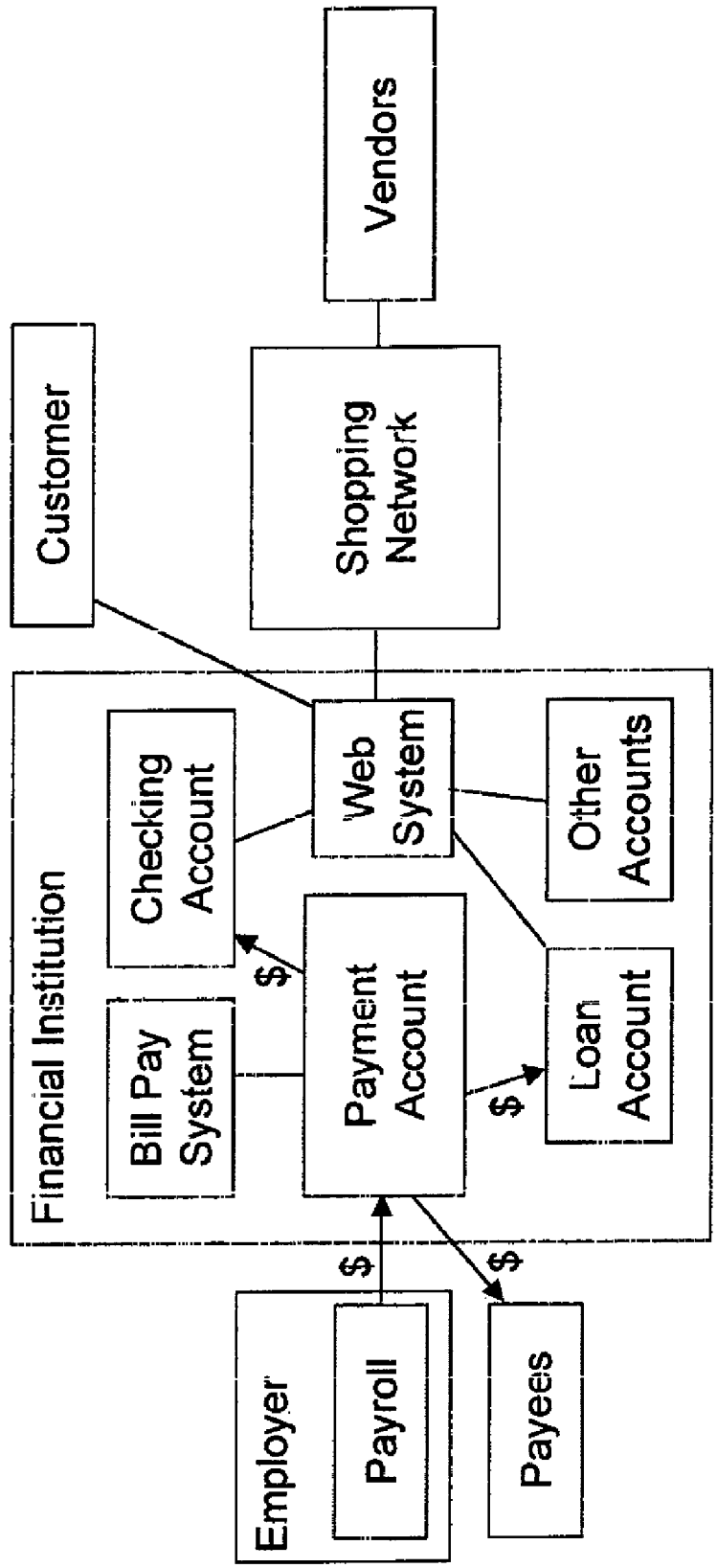
FIG. 2 is a schematic diagram of the primary exemplary components of an alternative embodiment of the proprietary e-finance and e-commerce platform enhancement tools of the present invention.

As shown in FIGS. 1 and 2, the present invention is directed to proprietary e-finance and e-commerce platform enhancement tools that integrate seamlessly with existing online solutions to provide a next generation online banking and eCommerce models. There are three components to this model: the money management account (also referred to as a payment account—an account that provides unique direct deposit and customer directed functionality), the Loan Account, and the Secure Shopping Network. The Money management account merges direct deposit with bill pay and the bank's transfer systems through a guided customer directed setup process that acts as the customer's personal financial assistant to pay bills and automate savings and investment from source-ofincome. Committed funds are retained, accumulated and disbursed through the money management account to automate bill pay, income disbursal for deposits to savings, investment and other committed accounts are automatically disbursed through the banks transfer system. The net result is a personalized financial solution that simplifies the customers' life and makes achieving financial goals easier than ever before. Discretionary funds pass through to the traditional checking account that functions as the customer's discretionary spending account. The Money Management Account enables the loan account to automate repayment of term loans or any other retail product sold by the bank because repayments is now an function of payroll direct deposit. The Loan Account automates the application and repayment processing cuts costs and enables the bank to profit from online term loans while still offering attractive rates. The efficiency of the model enables the average customer to leverage an insignificant portion (1% to 3% or $50 to $250 per month) of his or her income to finance online purchases in the $1000 to $10,000 range. The Secure Shopping Network is designed as an advanced messaging hub that will serve as a transactional intermediary for financial institutions and online vendors. After deployment, a single connection from the bank to the hub will automatically provide a connection to every licensed vendor. The "Click Once"™ Product (herein after referred to as the "Product") is unique because unlike any other payment system, online transactions are settled on the bank's web site instead of on the vendors. This enables an unprecedented security enhancement as sensitive financial information (including account numbers) is not transmitted through the Internet cloud. Expanded payment options including instant term loans for $1,000 to $10,000 (or more) purchases and payment directly from checking accounts for smaller purchases is also available (with lower transaction fees than credit cards). There is minimal behavior change for typical online bank customers as they already pay bills and transfer funds on their bank's trusted web site. Credit card networks are future growth opportunities.

Figure 3:
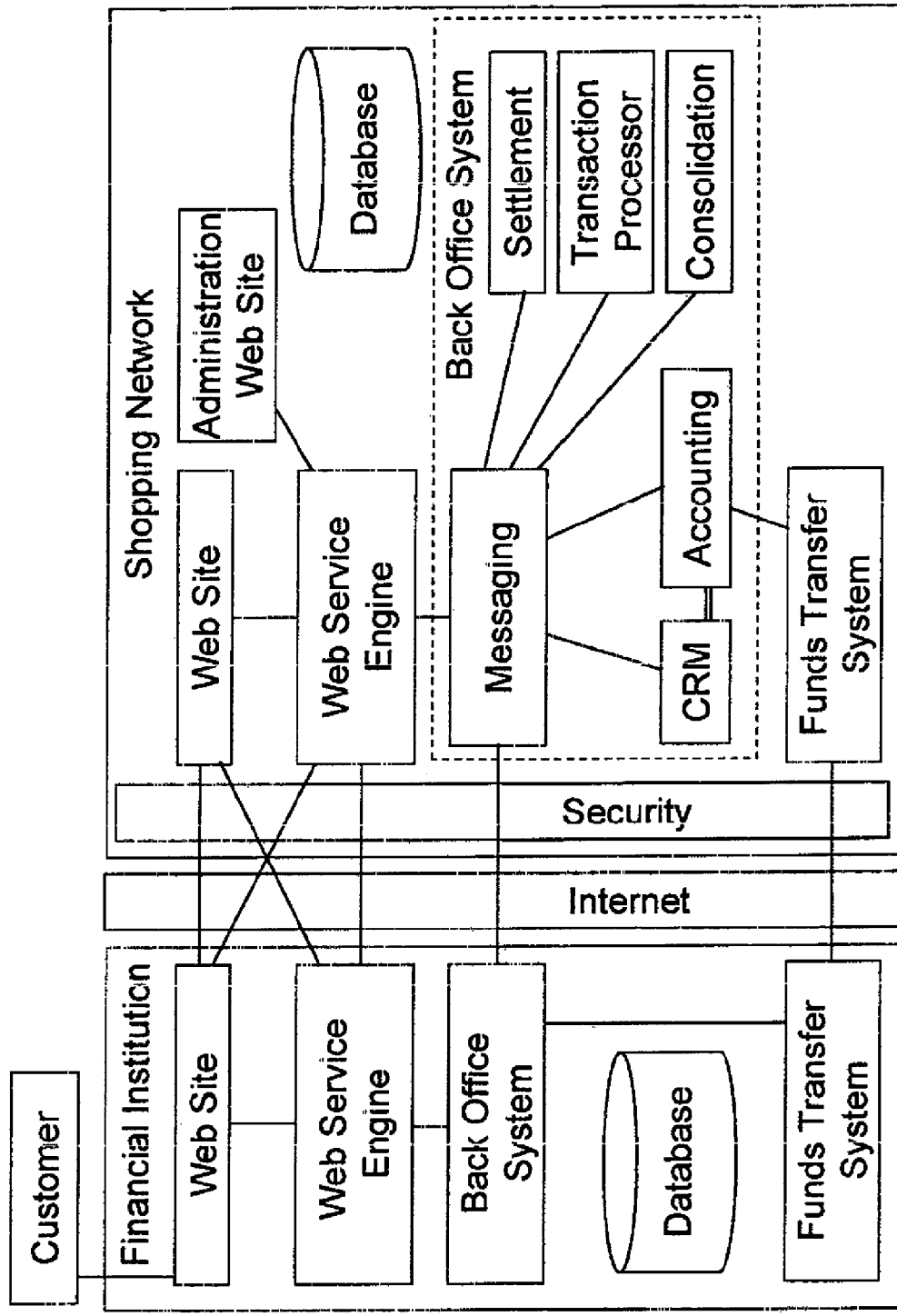
FIG. 3 is a schematic diagram of an exemplary embodiment of the system internals of the present invention.

FIG. 3 is a schematic diagram of an exemplary embodiment of the system internals of the present invention. The product system is designed to be secure, reliable and scalable. This is achieved by providing parallel processing on key components of the system. We are also intending to have multiple data centers with "Hot" backups of the system, providing further reliability and scalability. Although the system design does not rely on any specific hardware/software/database platform, on preferred embodiment is based around IBM based solution.

The present invention may have one or more of the following features. The present invention may make it economically feasible to offer a term loan product to compete with vendor financing, thereby reducing or eliminating the loss of billions in wallet share from existing customers mainstream banks lose to other lenders. The present invention can be used to deliver a revolving credit line as an alternative to credit cards for online purchases. This credit line can be tied to the customer's credit card account but could only be accessed for online purchases. The present invention takes advantage of process automation that enables mainstream banks to offer online term loans to meet customer demand. This provides a new source of consumer capital the average customer can tap to leverage a small portion (1% to 3%) of his monthly income that couldn't be leveraged before. The present invention delivers new revenue streams to financial institution licensees to dramatically increase Return on Investment (ROI) from online banking. Unlike any other payment system, using the present invention, online transactions are settled on the customer's trusted bank web site rather than the vendor's to deliver unprecedented security and expanded payment options. There is minimal consumer behavior change as over fifty-three million customers currently pay bills and transfer funds regularly through their online bank. The present invention uses proprietary eFinance tools to integrate with existing online banking solutions and provide a cost-effective next generation model that features a brand-able, customizable, online personal financial assistant that pays bills, automates savings, helps with investments, and provides instant online term loans. Proprietary eCommerce tools of the present invention integrate with existing online merchant/vendor solutions, enabling express checkout, enhanced security, and expanded payment options for micro and macro payments. The business model of the present invention enables the value driven network to grow rapidly by providing measurable value to every entity that connects to it. Banks will connect for asset growth, customer loyalty, and cost reduction. Vendors will connect to tap the new source of consumer capital. Bank customers will connect for dramatically improved ease-of-use money management and access to automated low interest rate consumer loans.

Figure 4:
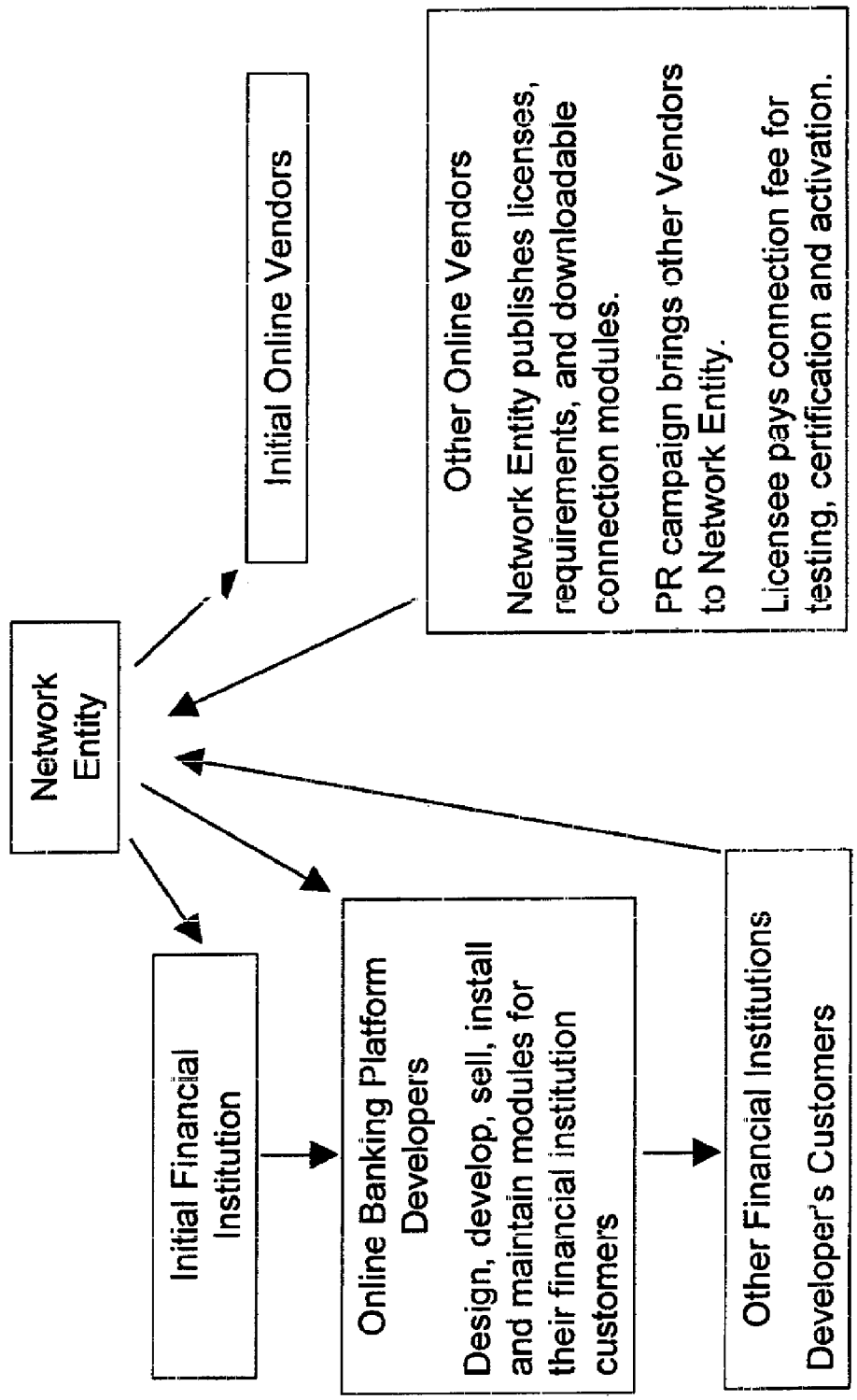
FIG. 4 is a schematic diagram of an exemplary embodiment of the business model of the present invention.

FIG. 4 is a schematic diagram of a simplified exemplary embodiment of the business model of the present invention. This business model should be attractive to banks, consumers vendors, and operators/owners of the money management network (herein after referred to as the "Network Entity"). Bank benefits include, but are not limited to Asset Growth, Cost Reduction, Enhanced Customer Loyalty, and Competitive Differentiator (e.g. Personal Online Financial Assistant). The present invention provides new revenue streams for banks. Specifically, the product will provide banks with two new revenue streams that will be generated through their online bank: Online Term Loans (the interest spread should be healthy due to cost reduction through process automation) and Vendor Transaction Processing Fees (the Network Entity will split vendor transaction processing fees with the bank). Consumer Benefits, but are not limited to Low Cost Consumer Capital, Personal Financial Assistant, Easy Money Management (Powerful Budgeting Tools), and Secure & Convenient Internet Shopping. Vendor Benefits, but are not limited to Expanded Payment Options, Access to New Consumer Capital, Viable Micro Payment Alternative To Credit Cards (60% Transaction Fee Reduction), Express Checkout (Top 10 Customer Concern), and Security Enhancement (Top 10 Customer Concern). The present invention provides expanded payment options & new consumer capital for vendors. Specifically, the product delivers powerful benefits to vendors included access to a new pool of consumer capital, expanded payment options for both macro and micro payments, express customer checkout, and an unprecedented security enhancement. New Consumer Capital Source: With the product the bank provides qualified customers with a personal credit line for online term loans that create a new pool of consumer capital. Consumers can access their online term loan account with unprecedented convenience to finance $1,000 to $10,000 purchases. Viable Alternative for Micro Payments: Vendors can enjoy a 60% reduction in transaction fees for payments made directly from checking accounts as an alternative to credit cards for micro-payments. Case in point: Apple ITUNES™—25¢ of each 99¢ song sold is devoted to minimum credit card transaction fees. The present invention provides the Network Entity (and its investors) with revenue streams. In one exemplary embodiment the Network Entity's revenue model is based on royalty and transaction fee revenue generated through licensed use of its e-finance and e-commerce tools and licensed access to the network. For examples, bank royalties may be 50 basis points on loan origination, vendor royalties may be 2.5% on non-credit card purchases, and vendor transaction processing fees of 0.25% (minimum 10¢—maximum 50¢) may be added to every transaction (and may be split with the customer's bank).

Figure 5:
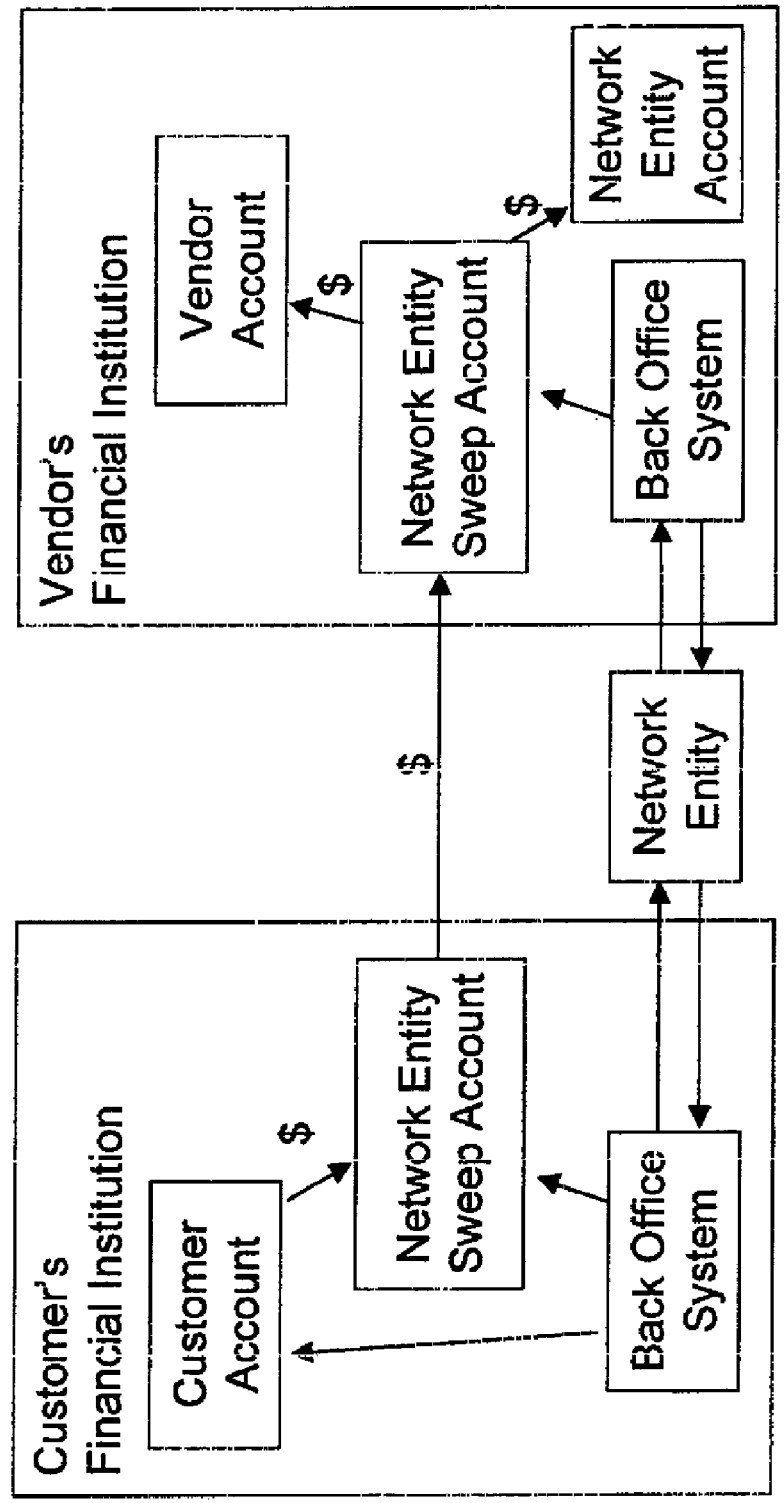
FIG. 5 is a schematic diagram of an exemplary embodiment of the money flow using the present invention.

FIG. 5 is a schematic diagram of an exemplary embodiment of the money flow using the present invention. The money flow may take the following steps. 1. The Customer's Bank's Back Office System transfers money from the Customer's Account to the Network Entity Sweep Account per a Customer Request. 2. The Customer's Bank's Back Office System notifies the Network Entity (or the Network Hub) of funds deposited in the Network Entity Sweep Account. 3. The Network Entity System supplies instructions to the Customer's Bank to transfer funds to the Network Entity Sweep Account in the Vendor's Bank. 4. The Customer's Bank transfers funds to the Vendor's Bank per the Network Entity instructions. 5. The Network Entity System supplies instructions to the Vendor's Bank to internally transfer funds to the Vendor's Account, and to transfer the Network Entity's Vendor Royalty/Transaction Fee to the Network Entity Account. 6. The Vendor's Bank internally transfers funds to the Vendor's account and the Network Entity's accounts, and notifies the Network Entity. It should be noted that if the Customer's Bank and the Vendor's Bank are the same, transfers between banks is not required. For example, 61,000 online vendors have Merchant Accounts with Wells Fargo.

FIGS. 6-17 are exemplary screen images of the present invention.

FIG. 6 shows an exemplary screen image of the present invention showing how the Financial Institution can invite the Financial Institution Customer to request registration for the money management account on the Financial Institution home web page.

FIG. 7 shows an exemplary screen image of the present invention showing how the Financial Institution Customer can sign in to the Financial Institution web system in order to register for a money management account.

FIG. 8 shows an exemplary screen image of the present invention showing how the Financial Institution Customer can verify his/her profile information at the Financial Institution, and then apply for multiple accounts associated with the application for a money management account. This includes but is not limited to the following: a money management account; a Term Loan Account; Automated Savings from the money management account; Automated Investment from the Money management account; Auto line of credit.

FIG. 9 shows an exemplary screen image of the present invention showing how the Financial Institution Customer can see and then change automated payments in the Financial Institution Bill Payment System. This automatically includes any automated savings and investments the Financial Institution Customer has previously requested in the Account Signup Screen (FIG. 8).

FIG. 10 shows an exemplary screen image of the present invention showing how the Financial Institution will display the Customer Account Summary. This screen now includes all the new accounts the customer has signed up for during the money management account Signup process (FIG. 8).

FIG. 11 shows an exemplary screen image of the present invention showing how the Network Entity can display the available Vendors that have connected to the Network, for the purpose of the Customer being able to go shopping at a selected Vendor.

FIG. 12 shows an exemplary screen image of the present invention showing how the Network Entity can display the accounts available to the customer to pay for the purchase the customer is attempting to complete with the Vendors.

FIG. 13 shows an exemplary screen image of the present invention showing how the Network Entity can display the insurance options available to the customer on a loan if a loan is selected to pay for a purchase that the Customer has requested (FIG. 12).

FIG. 14 shows an exemplary screen image of the present invention showing how the Financial Institution can display required or desired disclosures to the Customer about a loan if a loan is selected to pay for a purchase that the Customer has requested (FIG. 12).

FIG. 15 shows an exemplary screen image of the present invention showing how the Financial Institution can display a summary of a transaction that the Customer has requested payment from an account held at the Financial Institution. The customer verifies the information and authorizes the transaction by entering his/her password.

FIG. 16 shows an exemplary screen image of the present invention showing how the Financial Institution can display a summary of all automated payments in the Bill Payment system for this customer, which now includes an automated repayment for a loan if a loan is selected to pay for a purchase that the Customer has requested (FIG. 12).

FIG. 17 shows an exemplary screen image of the present invention showing how the Financial Institution can display a Customer Account Summary, which now includes a summary of the purchase just authorized (FIG. 15), and the status of that purchase.

Secure Internet Shopping

A customer is able to authorize a purchase transaction on the customer's bank's web site instead of the vendor's web site. This results in the identity of the customer verified by the customer's bank. This will eliminate a major area of online fraud, where a customer's account (e.g. credit card) is used on a vendor's web site without his/her permission. All other payment systems rely on sensitive information (account numbers) to identify the customer and complete a transaction and necessitate the accumulation and storage of the customer's sensitive information by the vendor. The product system is unique because the customer is identified by their online bank at login with traditional passwords or biometric devices such as thumb print readers connected to the customer's computer—as a result the vendor never accumulates or stores the customer's sensitive information as it resides on the data base where it was originated.

One preferred embodiment of this model is to facilitate this purchase through a network.

Another preferred embodiment of this model is to facilitate this purchase without the necessity of the customer's account being used or transmitted through the internet, on the vendor's system, or even on the facilitating network's system.

The system to accommodate these models will work as follows. A customer is identified on the customer's bank's system. An order is recognized on the vendor's system. The two systems communicate using a unique transaction code, identifying the linking of the purchase order (PO) with the customer's account using this transaction code. This transaction code may be completely random, or may include identifying information used by the bank and/or vendor to identify the customer and/or order. It is not necessary for the bank to be able to identify the order, provided the bank can identify the customer account. Likewise, it is not necessary for the vendor to identify the customer account, provided the vendor can identify the order.

A preferable method of connecting the bank and the vendor is through a network (or series of networks). A customer is identified on the customer's bank's system, communicating with the network using a unique transaction code. An order is recognized on the vendor's system, communicating with the network using a unique transaction code. The network links the purchase order with the customer's account using these transaction codes. This transaction codes may be completely random, or may include identifying information used by the bank, network, and/or vendor to identify the customer and/or order. It is not necessary for the bank to be able to identify the order, provided the bank can identify the customer account. Likewise, it is not necessary for the vendor to identify the customer account, provided the vendor can identify the order. Finally, it is not necessary for the network to identify either the order or the customer account, provided the network can link the order with the appropriate customer.

Network Summary

Figure 18:
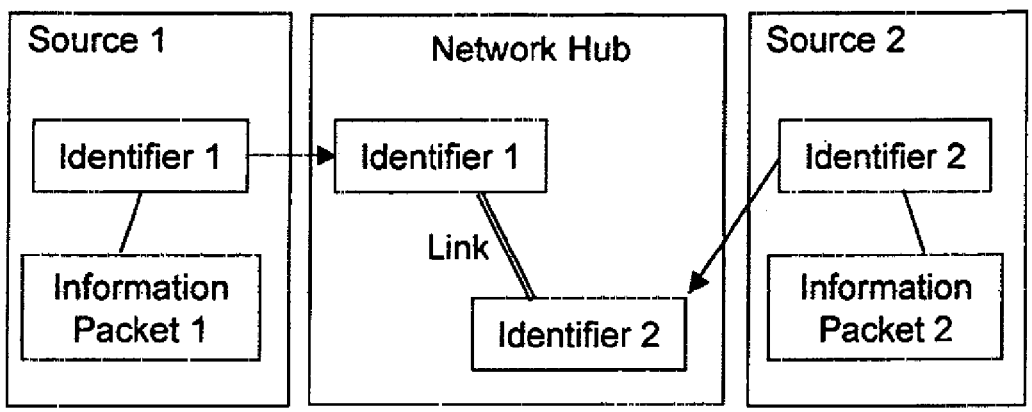
FIG. 18 is a schematic diagram of the system of the present invention showing one exemplary relationship between source 1, the network, and source 2 and the dataflow therebetween.

The network would link two identifiers from two different sources to form a linked pair of identifiers. Identifier 1 would be used by source 1 to uniquely identify the relevant information (information packet 1) retained by source 1. Identifier 2 would be used by source 2 to uniquely identify the relevant information (information packet 2) retained by source 2. The network would be able to link these two information packets retained by these two sources by linking these two identifiers, without knowledge of the two packets of information. FIG. 18 is a graphic representation of one exemplary relationship between source 1, the network, and source 2 and the dataflow therebetween.

The network would be able to deliver select information (part of information packet 1) from source 1 to source 2 without source 2 knowing information identifier 1, or the full contents of information packet 1. An example: Source 1 is a bank, Identifier 1 is a means for the bank to identify the customer and account (not necessarily the customer account number), Information Packet 1 is the customer's account information, Source 2 is a vendor, Identifier 2 is an order number, Information Packet 2 is an order. The network can connect the order with the account, without the bank knowing the order number or order information, the vendor knowing anything about the customer's bank accounts, or the network knowing any more than the order number and a way for the bank to identify the account. The bank can approve a purchase without knowledge of the vendor, and deliver an approval code with account balance and last 4 digits of account number through the network to the vendor.

The key component to this is identifier 1 is not known to source 2, and vice versa. Even source 1 and source 2 do not necessarily know each other in this model.

This network could also link more than two identifiers from more than two different sources in the same manner as above.

One aspect of this network structure is relationships are established between information from different sources by an entity that each source recognizes as "owner" of the information on each source. The relationship is established either directly or indirectly by the entity on the network system.

The internet is a huge system of databases containing information relating to individuals (and other entities like corporations). One of the intension of this network is to allow information on differing systems relating to a specific individual to be linked by that individual, and then specific information to be shared between differing systems at the bequest of the individual.

Possible systems an individual may wish to link: Banks, Brokers, Mortgage Company, Car Loan Company, Other Lenders, Credit Cards, Employer, Vendors, Insurers (health, car, house contents, life, mortgage), Employer's Insurance, Business/Business accounts, Spouse/Kids accounts, Kid's Schools, Associations, Doctors, Dentist, Differing Government Agencies (tax, legal, social security, welfare, DMV, etc. . . . ), Email, Personal Scheduler, Tax software, Accountant, Charities, etc. . . .

Exemplary uses of the system include, for example: address, phone numbers, and other customer information synchronized, and when necessary an update made on all systems with a single update; Arrange an appointment with your doctor, pass insurance information from employer's insurer (all possible disputes resolved prior to visit), make co-payment automatically after visit, insurer pays remainder of bill automatically; school notifies parent of document requiring signature, parent links to school system and signs with digital signature; parent goes to school system and see kid's timetable and grades; and ax preparation based around going to employer and each financial institution system, forwarding electronic version of tax documents directly to accountant (or tax software).

Information Forwarding Request System

This network can be used as a method of forwarding information from one source to another on the internet, at the request of the customer.

The customer is the one that authorizes the connection of two accounts on two different systems, and then authorizes transfer of selected information from one system to the other. The key to this is the customer is in control of his own information, and the network, with the two systems, facilitates the transfer of this information at the customer's request.

Notification Request System

A method for a customer to request future notification of certain specified information.

This is a menu and entry driven system where the customer requests notification from a company or other entity when certain specific conditions are met. This allows the customer to be notified only when he wants to be, allowing targeted sales and marketing of customers. This level of sales and marketing will be considerably more productive than current methods.

An example of this is a customer requesting to be notified when the price of a computer with specific components drops below a certain price. When this happens, emails or other communication methods would be utilized to inform the customer that these specific conditions are met, by appropriate computer vendors.

Another example would be when a specified vendor has a sale on a specific set of products.

Future Service Request

A method for a customer to request future services to be provided on a network, and future companies.

This is a method of collecting requested information for future services, whether by type of provider.

The customer would request specific services, and may also request a specific service provider/vendor. Then system would calibrate this information in order to identify customer demand for future services/providers. This information can be used in many ways including approaching providers with a desired customer group. Any progress relating to this service/provider can later be forwarded to the customer requesting the service.

The Hub

Data Exchange Methods: All data exchange between the network entity and other systems is considered to be sensitive, and will be transmitted securely. The security method used will depend on the other system and circumstances, but likely candidates are SSL, or a secure tunnel between participating organizations. The system of the present invention also uses an authentication and authorization scheme to ensure that only legitimate messages and information are passed.

Web Browsing: When passing a user and necessary information between systems, the system of the present invention uses a web-browsing interface. An example is passing the user from a financial institution web page to the system shopping landing page. Several methods may be used to support the data exchange, including cookies, query strings, and form posts.

Web Services: For interactive real time data exchange, the system of the present invention uses Web services. An example is when the financial institution fetches linked account information from the system of the present invention to display on the customer's account summary page. These web services can be structured to support the data requirements of the other system. Multiple web service requests may be required for any one transaction.

Structured File Messages: The system of the present invention uses structured file messages for interactive real time data exchange and for exchanging batch data in the background. These messages can be structured to support the data requirements and format of the other system. Any protocol suitable for the other system may be used to transfer the files. The message structure chosen by the financial institution may include the ability of combining multiple individual messages into a single message.

Transaction Verification: A certain level of verification is intrinsic in each communication method, and most exchanges of information will not require verification. However, certain messages contain information that require additional verification that the contents are accurate on receipt. There are several methods of verifying accurate delivery of information between the network entity and other systems. Verification methods will vary depending on the messages requiring verification, as each method provides differing levels of authentication, but likely candidates are any or a combination of the following: Data encryption (many methods are available); Hashing Algorithms (e.g. SHA1 and MD5 algorithms are two widely used methods); Message sequence numbers; Confirmation messages (e.g. a financial institution having sent information to the network entity in one data exchange method, proceeds to send confirmation of this information in a different data exchange method, with the network entity verifying the two together prior to processing the received information); and Verification request (e.g. a financial institution having sent information to the network entity, the network entity proceeds to send a verification request (Web Service or Structured File Message) to the financial institution to verify accuracy of this information). These methods of verification are assumed to exist, and are not necessarily included in the figures.

Continuous communication: It may be desirable for the other system to maintain continuous communication with the network entity for certain communication methods. Network Management Message processing is preferably be available for this purpose.

System Structure: The system is intended to consist of multiple Hubs (initially there may only be one), each identical, and all communicating with each other. If any one Hub is unavailable, there will be at least one other Hub able to take over processing for the unavailable Hub, both in available processing power, and in replicated data. Furthermore, all critical components within the Hub should have multiple copies running in parallel, thus providing scalability, load balancing, and rolling upgrades. In short, the system should be as reliable and scalable as possible.

Configurability: The system should be designed so that all variables that control the system operation are configurable and easily manageable. Configuration settings should be maintained for all entities that connect to the system.

Web Server Farm: Critical portions of the network entity production environment are the web servers, application servers, communications equipment, and database (DB) servers. The web content will reside on multiple identical web servers, serviced by redundant server load balancers (SLB). Identical clustered web servers will ensure that in the event of hardware or software failure, the network entity site remains available to end users, vendors and lenders. The SLB group will be interconnected and will be individual session aware; meaning that if any web server, switch or SLB in the group fails, the user session will automatically and instantly transfer to other equipment in the cluster.

Geographic Load Balancing: The system requires data replication, load balancing, and failover between two or more datacenters.

Local Web Load Balancing: The system requires distributing the web site/web service load across multiple servers within a data center.

Component Load Balancing: The system requires load-balancing modules on application servers within a data center. Guaranteed processing and failover is preferably supported.

Database Structure: The production database environment is preferably supported by clustered, fully redundant database servers. These systems preferably are also supported by a heartbeat connection between them. The entire contents of the network entity databases should reside on both systems, once again ensuring constant availability to all users of the application. The database of the system is preferably designed so that it meets the load requirements of the system.

Data Replication: Geographic and local data replication is preferably supported on multiple sets of data. Data replication is preferably on a real-time basis, thus ensuring minimal lost information in event of a Hub becoming unavailable, and providing "Hot" backup capabilities. Expected replication types are "transactional" and "snapshot".

Performance and Scalability: The business model of the present invention is to provide a constantly available network, web presence, and Internet connectivity. For this reason, the entire production web application environment is to be constructed in a "no single point of failure" model.

Performance: Preferably the web site has a sub one-second response time desired for most functionality, including all areas where processing is retained entirely within the Hub. For certain functions, longer response times and timeout processing is preferably configurable. Preferably the Web Service has a sub one-second response time desired for most functionality, including all areas where processing is retained entirely within the Hub. For certain functions, longer response times and timeout processing is preferably configurable. Preferably, Messaging response times and timeout processing are configurable.

Scalability: The system preferably supports the ability to add servers to get a predictable and linear increase in system performance. Parallel processing is preferred on the following components of the system: Web site, Web service engine, Messaging module, Settlement module, Transaction processor module, and Consolidation module.

Rolling Upgrades: The system is preferably designed to support rolling upgrades, to eliminate down time, in the majority of the cases. There may be a few limited cases where a system change will require limited scheduled down time.

Messaging Capabilities: The system is preferably designed to be highly configurable in relation to the messaging system. For each external entity communicating with the system of the present invention the message format and communication method should be configurable. There are certain messages that can only be passed via web browsing but all other messages are preferably supported by either web services or other EDI/XML messaging formats and methods. Other messaging formats may be required to be added at a later time, so it is necessary to facilitate this capability with minimal development impact.

System Tracing: The system preferably has built in configurable support for tracing the system under operation.

Logging: The system preferably supports logging many sources of data such as certain transaction messages, system messages, warnings, errors, and notifications in a way that has minimal impact on system performance.

Monitoring: The system preferably has a configurable monitoring module, able to monitor the entire system, communication and module errors, load balancing, processing times, and other specifics defined by the Network Entity.

System Versioning: The system should support multiple versions of functionality simultaneously. All messages should contain a version number to determine the functionality supported for the version of the message.

Automated Third Party Integration Testing System: A separate third party integration testing system is preferably produced and maintained that allows vendors, financial institutions, lenders, developers, and other companies to test their connection to and integration with the system of the present invention. The test system should provide all of the standard interfaces but only provide configured responses to the requests. A connecting company should be able to run a sequence of test scripts to determine if they comply with the standards of the system of the present invention. Different versions of the test system is preferably capable of running simultaneously. The integration testing process is preferably automated on the network entity's end. Companies connecting to the test system is preferably able to configure themselves, run tests, view and download results, and analyze results.

Platform Recommendations: In one preferred embodiment the system platform is based predominantly on Microsoft technologies. Alternative preferred technologies include, but are not limited to .NET, SQL Server, BizTalk, MSMQ, Great-Plains, CRM, and Data Replication may be achieved by developing a module for this purpose, or alternately by utilizing an available vendor product (e.g. Golden Gate Software's Data Replicator).

Security: The system preferably has all necessary security features. Throughout the system authentication, authorization, and encryption is preferably used to protect information. Also, the system preferably protects against all forms of malicious attack.

Internet connectivity and routing: Redundant connections to the Internet from separate providers will feed to redundant routers. Each router will have at least one independent Internet connection, and will exchange connection state information utilizing Border Gateway Protocol, version 4 (BGP4) with its respective provider. The routers will additionally be connected together to ensure failover and facilitate BGP route table propagation.

Security overview: The security model of the present invention will preferably be redundant and configured for active/active failover. The firewalls will be session aware, and sandwiched between Firewall Load Balancers (FWLB). The Firewalls will have a heartbeat connection between them, as will the FWLB's. The FWLB's will constantly (4 times per second) perform "route out" health checks, and adjust traffic according to network health.

Switching environment: Each physical computer system in the network entity production model will have two or more network interface cards (NIC) installed. In addition, each NIC will be connected to separate layer 2 devices (switches). In the event of NIC, network cable, cable end, or switch failure, the server or system will have the ability to find a secondary path to the network, and the Internet.

Security Summary: Network security and availability will be one of the most critical aspects of the network entity model. Every aspect and function of the network entity production network will be redundant and configured for active fail-over. The "no single point of failure" model will keep critical applications constantly available, allow rapid connectivity, and allow maintenance to occur without effecting end user connectivity.

Geographic Considerations: The system will extend across multiple borders, both within the United States and internationally, which the system preferably accommodates. Preferably companies will have the ability to select desired geographic locations for processing. For example, if a vendor wishes to limit the sale of his goods to customers in the states of Oregon and Washington, at the request of the vendor, the system will only offer this vendor to customers that reside in these states.

International Currencies: It will be necessary to manage transactions in different currencies. The required currency will not be determined by the network entity, but is preferably recognized and transmitted to relevant parties. Standard codes can be used to identify currencies, and should be present on all transactions. Defaults may be used based on initiator of the transaction for all companies except financial institutions. Financial institutions are expected to supply currency codes (where appropriate), and accept all supplied currency codes.

International Languages: It will be necessary for multiple languages to be available on the system of the present invention. A default language will be selected based on circumstances. When a language is selected other than the default, this language should be retained as the future default for this customer/company.

Transaction Flows: This section details the transaction flows of the hub as well as the process flows for each user and system interaction with the hub.

Figure 19:
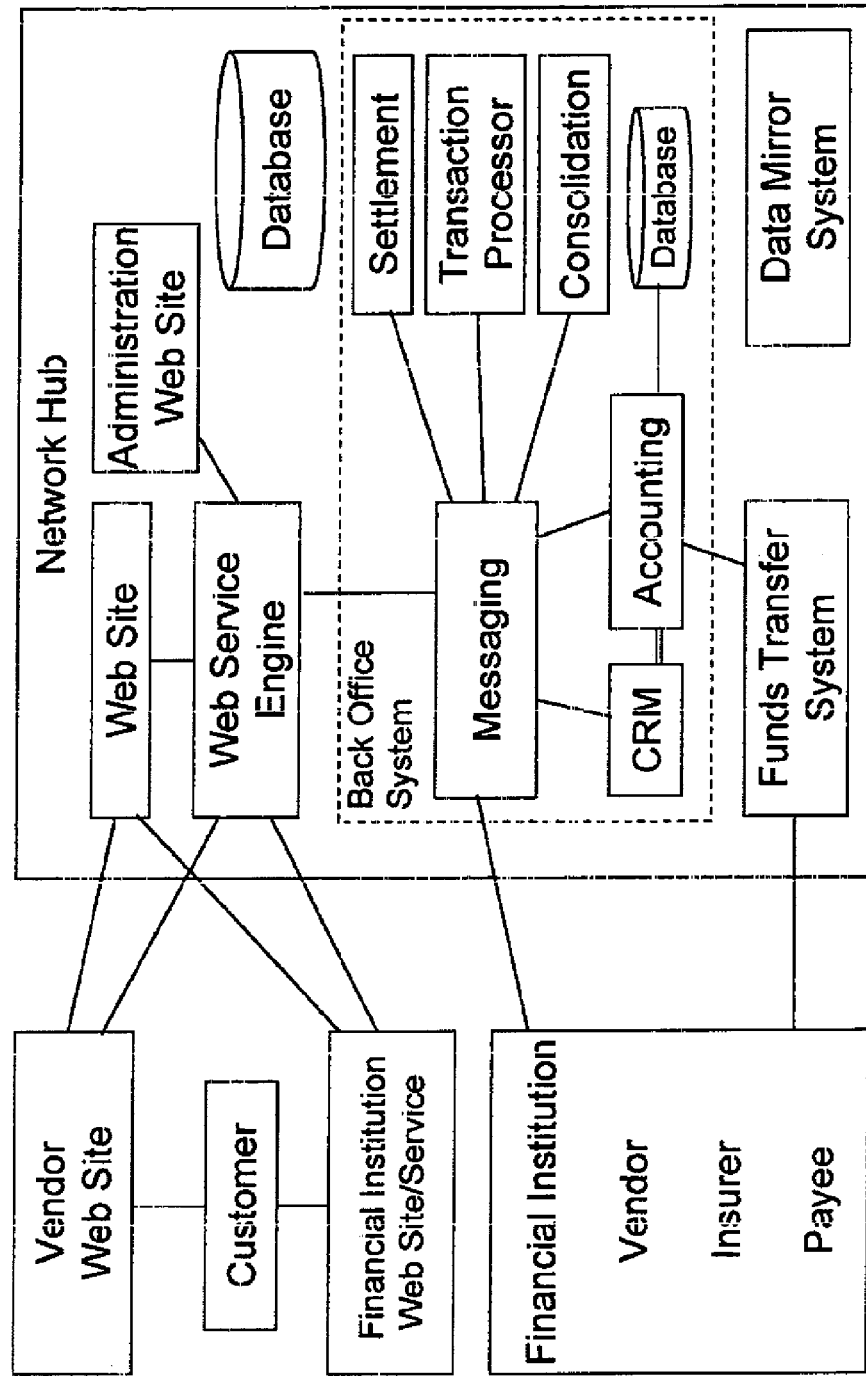
FIG. 19 is a schematic diagram of an exemplary embodiment of the internal process of the hub of the present invention.

FIG. 19 is a schematic diagram of an exemplary embodiment of the internal process of the hub of the present invention. This figure provides a high-level view of the Hub, as well as the entities that make-up the Network.

Figure 20:
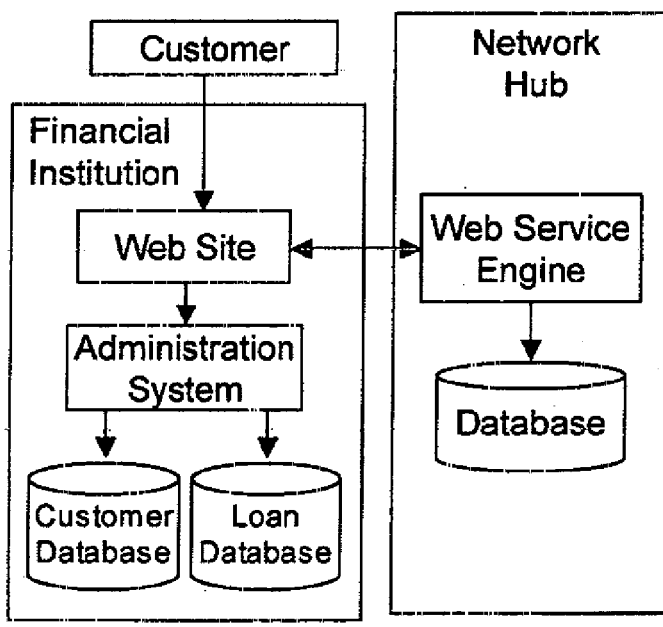
FIG. 20 is a schematic diagram of an exemplary embodiment of flow of the hub of the present invention during the process of the customer applying for an account.

FIG. 20 is a schematic diagram of an exemplary embodiment of flow of the hub of the present invention during the process of the customer applying for an account.

All customers of a financial institution are allowed to use the product system for the following features: Linking Accounts to Account Summary Web Page; Shopping through the product Shopping Network, with payment for purchased goods coming from one of the customer's existing accounts within the financial institution; A money management account, allowing bills to be paid from source of income. In one preferred embodiment, this requires the customer to have direct deposit of paycheck to this financial institution, and he must apply for the account; and a product Loan account linked to the money management account, providing a new form of credit. (It should be noted that the product Loan account could have a pre-approved limit on it, and the customer must apply for the account.) Once the financial institution has set up their system to offer its customers' access into the Network, and the customer has been notified of his pre-approval for money management and loan accounts, the customer must apply for these accounts on the financial institution's web site.

The financial institution displays current information it has about the customer for verification (some additional information may be required from the customer, e.g. information about his direct deposits, including frequency, date of next occurrence etc.). The customer then applies for the selected accounts.

The financial institution creates a money management account. The financial institution sets up an automatic redirect of an existing direct deposit from an existing account into the money management account. Alternately, the financial institution provides information to the customer to enable him to re-direct his paycheck into his money management account. If the customer has not been pre-approved for this account, the financial institution will provide information to the customer in order to qualify. The financial institution also retains the appropriate instructions to move un-retained funds from the money management account to an account of the customer's choice.

The financial institution activates the customer's product loan Account, making it immediately available for use in online shopping. If the customer has not been pre-approved for this account, the financial institution will provide information to the customer in order to apply for it.

The financial institution sends customer and account information to the network entity.

Using the process flow diagram of FIG. 20, the following steps are exemplary steps of the process flow a customer might use to apply for an account through a Financial Institution (FI). The customer logs on to the FI web site. Then, the Customer applies for the product experience: product Loan Account—Individuals mainly; money management account—Individuals mainly; Secure Internet Shopping; Payee—Businesses mainly; and/or other bank services can also be purchased/requested at this time. Next, the FI web site sends Customer request (Add) to the network entity Web Service, supplying Customer Information including: Name, Address, E-mail, FI Customer ID, Account Names (Checking, Credit, Loan, Brokerage, Savings). The network entity Web Service generates a network ID and adds Customer information to Database. The network entity Web Service sends response to FI web site. The FI notifies Customer of product setup.

Figure 21:
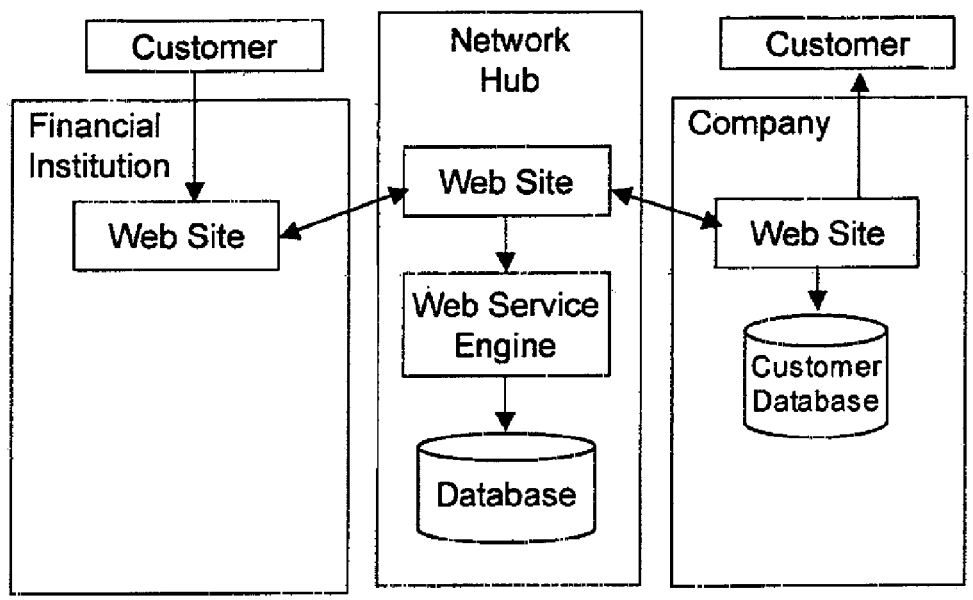
FIG. 21 is a schematic diagram of an exemplary embodiment of flow of the hub of the present invention during the process of the customer linking accounts.

FIG. 21 is a schematic diagram of an exemplary embodiment of flow of the hub of the present invention during the process of the customer linking accounts. A customer's Account Summary page with his financial institution becomes the central place from which he manages all of his financial and non-financial information. This includes the ability to link other accounts to this page. Examples of these accounts include: financial accounts at his home financial institution or other financial institutions; airline mileage accounts; shopping accounts (Amazon, eBay etc.); e-mail accounts etc. The Network Entity manages the linking accounts for each customer.

The financial institution provides a button for a customer to link accounts to his Account Summary. When the customer selects this option, the financial institution passes the customer to a network entity web page where he can manage his linked accounts. The network entity provides a list of all available companies that offer this service, and the customer selects from this list a company to link. The network entity passes the customer to the selected company's login page. Once the customer has successfully logged in, the company may display a list of accounts the customer has, allowing him to select which ones to link. The company then returns the customer to the network entity. The network entity generates a network ID for the customer (if necessary) and records account and linking information in the database. The network entity then returns the customer to the financial institution's Account Summary page. The Web Service call that the financial institution makes to build the new Account Summary page will automatically include information about newly linked accounts.

Using the process flow diagram of FIG. 21, the following steps are exemplary steps of the process flow a customer might use to link accounts. First, the customer logs into the FI web site. Then, the customer requests to link other accounts to this account. The FI then transfers the customer to the network entity web site. The customer then selects from list of Licensed Companies the Company account to link. The network entity web site then transfers the customer to Company web site. The customer logs into Company web site where the Company may display account list for customer to select account to link, update the Customer database to reflect this account now linked into Network, notify the Customer that account is now linked into the Network, and then the Company web site returns the Customer to the network entity with Customer ID. The network entity web site updates the database for the customer. The customer can link another account (see above). The network entity web site returns Customer to the FI web site. It should be noted that the company can be a Financial Institution or some Vendors. In preferred embodiments, the company has a license with the Network Entity.

Figure 22:
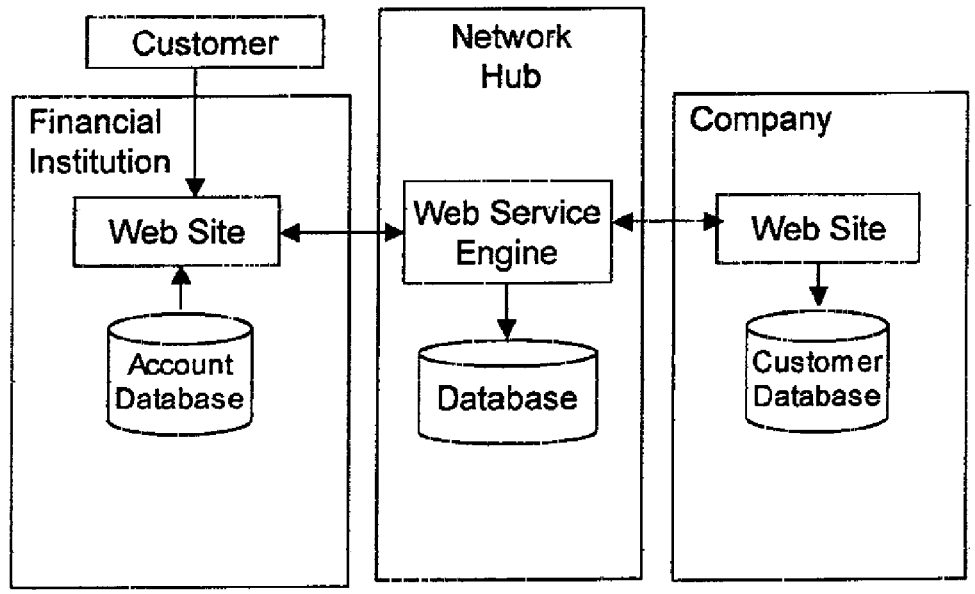
FIG. 22 is a schematic diagram of an exemplary embodiment of flow of the hub of the present invention during the process of displaying an account summary page.

FIG. 22 is a schematic diagram of an exemplary embodiment of flow of the hub of the present invention during the process of displaying an account summary page. The Account Summary page is displayed immediately after the customer successfully logs in to the financial institution's web site, and contains a summary of all financial accounts held by this financial institution, as well as a summary of each account the customer has linked to this page. Exemplary functions the customer may perform here include: request detailed information about any account in his summary; link other accounts to the summary; enter the financial institution's bill payment system to manage payments from his accounts; and/or enter the Shopping Network.

To build the Account Summary page, the financial institution includes a web service request to the network entity for information about linked accounts. The network entity retrieves from the database a list of all linked accounts for this customer, sets a timer and sends a web service request to each linked company requesting linked information. Each company identifies the customer and account(s), and returns a message to the network entity containing the account type, account name (not number), balances and miscellaneous information of each account the customer has linked. The network entity collects all information from each linked company into a single response message containing and sends this in it's response to the financial institution. The financial institution formats and displays this information in the summary.

Detailed Account Information: Certain account types may have extensive account information attached. If the financial institution has requested detailed account information, this will be passed on to the financial institution in the response. An example of this is a Consolidated Investment Portfolio, containing a complete breakdown of the Customers Investments across multiple brokerage accounts. This is useful for the customer as most individuals have multiple brokerage accounts—full service brokerage account, online brokerage account, 401k's, and IRA's. The financial institution may then display this information in any manner their customer wishes to see it, for example: stocks/bonds/cash; industry categories; geographic regions.

Using the process flow diagram of FIG. 22, the following steps are exemplary steps of the process flow process of displaying an account summary page. First, the customer logs into FI web site. Next, the FI sends a Web Service request to the network entity requesting linked account information. Then, the network entity retrieves a list of linked accounts from the database for this customer. Then, the network entity sets a timer and sends a Web Service request to each linked company, requesting summary information for the identified customer. Each company retrieves account information about this customer, and returns this information to the network entity. The network entity collects responses from each company, consolidates it into a single message, and responds to FI with this information. The FI collects account information for customer internally within FI, and combines it with received information from the network entity, and displays it on Account Summary page. It should be noted that the Company can be Financial Institution or some Vendors. It should also be noted that in preferred embodiments the Company is licensed to the network entity. It should be noted that this flow may work for detailed as well as summary information. It should also be noted that this flow may work for order/purchase information, as well as for accounts that require a password and are linked.

Figure 23:
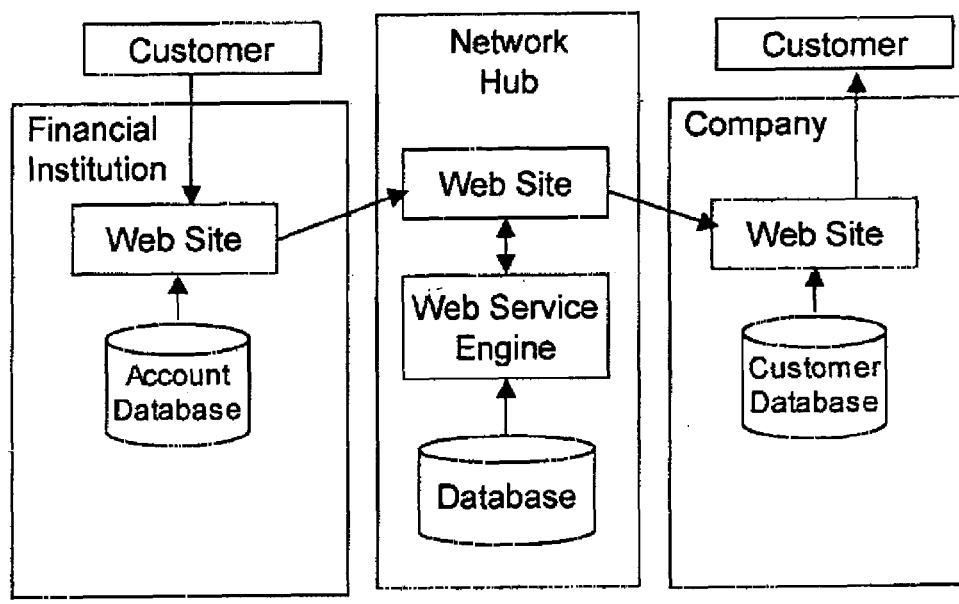
FIG. 23 is a schematic diagram of an exemplary embodiment of flow of the hub of the present invention during the process of the customer connecting to an account.

FIG. 23 is a schematic diagram of an exemplary embodiment of flow of the hub of the present invention during the process of the customer connecting to an account. On the Financial Institution Account Summary page, the customer may request detailed information about any account displayed by clicking on the appropriate account. The financial institution passes the customer to the network entity with information about which account the customer clicked. The network entity identifies the selected account, and sends the customer to the appropriate company. At its discretion, the company may require the customer to log in. The company will then take the customer to the detailed information page for the requested account.

Using the process flow diagram of FIG. 23, the following steps are exemplary steps of the process flow during the process of the customer connecting to an account. First, the customer logs into FI web site. Next, the FI displays Account Summary page, with linked accounts. The customer then clicks on linked account. The FI delivers the customer to the network entity Web Page. The network entity Web Page identifies customer, and appropriate linked account. The network entity Web Page then delivers customer to the appropriate company, with customer/account identifier. The Company may require the customer to log on. The company preferably displays appropriate account information to customer. It should be noted that the Company can be a Financial Institution or some Vendors. In preferred embodiments, the company is licensed to the Network Entity. It should also be noted that this flow works for order/purchase information, as well as for accounts that require a password and are linked.

Figure 24:
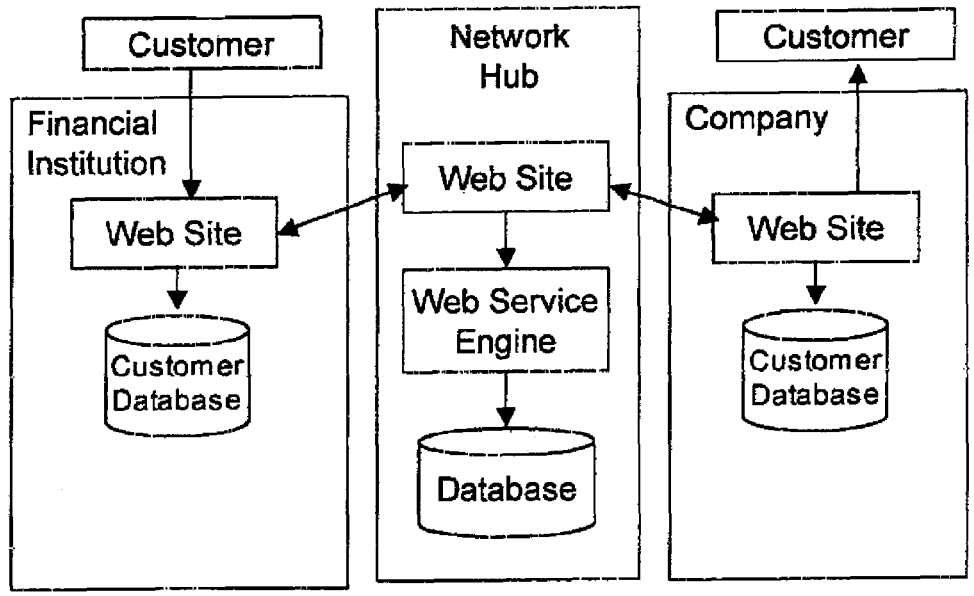
FIG. 24 is a schematic diagram of an exemplary embodiment of flow of the hub of the present invention during the process of the customer updating his profile.

FIG. 24 is a schematic diagram of an exemplary embodiment of flow of the hub of the present invention during the process of the customer updating his profile. A Customer has the ability to updates his profile at his financial institution, with that update automatically changed on other Linked Accounts. If the customer uses the financial institution web site to change his address or other personal information shared on the Network, the financial institution passes the customer to a network entity Web Page. On this page the customer will select which accounts he wants his profile to be updated. The network entity will notify all selected companies of the change of profile web service request, and wait for a response. When confirmation has been received, the customer is notified. At the customer's request, the customer is returned to the financial institution web site. In preferred embodiments, there will be a timer on these requests, and if it expires, the customer is notified of those updates that have been confirmed. The customer is then given a choice as to what to do next: wait longer; try again; or get the network entity to continue requesting a profile change while the customer does other things (notifying the customer when complete). It should be noted that in preferred embodiments it will also be possible for the customer to change his profile on a network entity web page, with the same results.

Using the process flow diagram of FIG. 24, the following steps are exemplary steps of the process flow during the process of the customer updating his profile. First, the customer logs into the FI web site. Next, the customer updates profile information and the FI web site updates the Customer Database. The FI then transfers the customer to the network entity web site with updated profile information and the network entity web site updates the customer information in the Database. The customer then selects from list of Linked accounts on which ones to update Profile. Then the network entity web site sends Profile Update message to each selected Company, and sets the timer. The Company updates Profile in Customer Database, sends a notification email to the customer of the Profile change, and the Company sends a response to the network entity. Preferably the network entity web site then returns the Customer to the FI web site.

Figure 25:
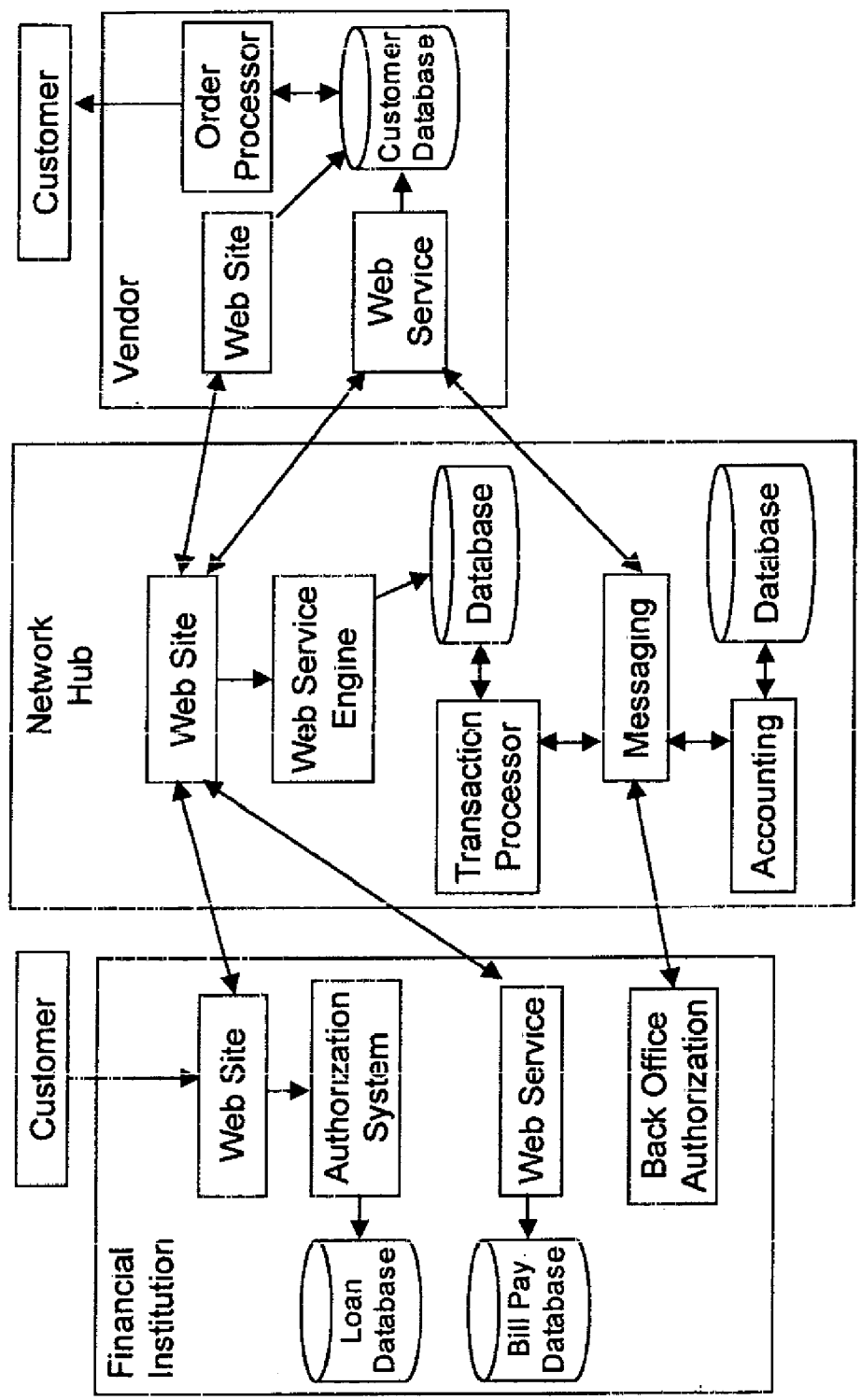
FIG. 25 is a schematic diagram of an exemplary embodiment of flow of the hub of the present invention during the customer shopping process.

FIG. 25 is a schematic diagram of an exemplary embodiment of flow of the hub of the present invention during the customer shopping process. The financial institution provides a single navigation link to the Shopping Network, which in turn links to an extensive network of approved vendors. For example, a customer may choose to shop for a new computer, then pay for it using his product loan account. No direct interaction between the vendor and the financial institution is required. Each organization connects only with the network entity, which acts as the broker for the transaction. The customer can initiate shopping on a vendor web site by either connecting direct to that site, or by navigating from his financial institution through the network entity Network.

Customer connects through the network entity Network: When a member selects the "Shopping" navigation provided on the financial institution's web site, the financial institution passes the customer to the network entity shopping web page. The financial institution preferably provides customer and account information with the customer so that he may be added to the Network if not already a member.

The customer is shown a list of vendors, or a means for finding a vendor (by category or name search). The customer selects the vendor he wishes, and the network entity passes the customer to the selected vendor. The network entity will encrypt and provide with the customer certain information that can later be decrypted to determine the customer and other information relating to the transaction up to this point. This encryption/decryption is a standard component of all transaction through the system of the present invention. The network entity also provides to the selected vendor information about the customer so that the vendor is able to deliver selected goods to the customer and contact the customer if necessary, without the customer having to enter this information directly on the vendor's web page. The alternate to this is this information is not supplied, but is requested by the vendor later on in the purchase process, and the network entity provides this information to the vendor at the customer's request.

The customer selects goods on the Vendor's web site, and is then returned to the network entity to choose the account from which he wishes to finance this purchase. The customer has the choice of all linked financial accounts, and the ability to spread the payment across multiple accounts. Balances are displayed about each account (requiring a web service request to each financial institution, requesting account information). The customer also has the ability at this point to link additional accounts. If any of the linked accounts is a product loan account, as estimate is made of the monthly payments, based on information provided from the financial institution (interest rate, and any additional fees).

If the customer selects a product loan account, insurance options are available on this loan. Insurance rules are retained within the system of the present invention, so that the network entity can authorize insurance on behalf of the company providing the insurance. The customer selects insurance options, and answers certain health questions. If the network entity does not have sufficient information to process the insurance (e.g. employment information may be required, and may not be retained in the system of the present invention), the network entity requests this information from the financial institution, which should retain this information on behalf of the customer, and delivers it in a response to the network entity.

The customer is then passed to the financial institution maintaining the selected account. The financial institution authorizes this transaction based on the transaction amount and the status of the account. The transaction is approved, declined, or approved subject to certain conditions (preliminary approval). The financial institution passes the customer back to the network entity with this authorization, and other transaction information (like an approval code), and the network entity adds the order into the database.

The network entity now completes the online transaction with the vendor with one of three options: a web service message; a back office message; or by passing the customer to the vendor. The vendor chooses the completion option, and it may be necessary to allow a different option for each type of financial account (credit/debit/loan). The vendor can also choose whether they wish to receive preliminary approvals, or wait until the final approval/denial. Requests sent to the vendor to complete the transaction must have responses. If the customer is passed to the vendor, the vendor may later return the customer to the network entity, at which point the customer will go to the shopping page (unless another purchase is initiated).

If the transaction was authorized by the financial institution with a preliminary approval, at a later time the financial institution approves or declines the transaction. The financial institution sends authorization notification to the network entity, and the network entity updates the database. A transaction completion message is then delivered to the vendor, in the method required by the vendor (passing the customer to a vendor web page is not an option). A response is expected from the vendor.

The insurance company is not notified of new insurance until payment for the insurance (see below).

Customer connects direct to Vendor: When a customer connects direct to a vendor, there is no Network Entity information about the customer. When the customer is ready to make a purchase, one of the options available to him is to use the money management payment system. If selected, the vendor passes the customer to the network entity. The network entity may at this point look for a cookie on the customer's PC, which could contain the customer's network information. If this is not available, it is unknown whether the customer is a member of network. The network entity displays some information about the network (with a link to more information), and allows the customer to select his financial institution from a list of licensed financial institutions for the customer to either select his financial institution or to select a financial institution at which to apply for the product. The network entity will pass the customer to the selected financial institution's login page with a generated customer ID.

When the customer is returned from the financial institution, a customer ID will be present. If it is different then the one sent with the customer, the customer was already signed up for the product, so delete the generated customer ID and use the provided one.

Continue the transaction above from where the network entity displays the payment options.

Using the process flow diagram of FIG. 25, the following steps are exemplary steps of the process flow during the customer shopping process. First the customer logs into FI web site. Then, the customer selects to go shopping. The FI web site then transfers the customer to the network entity web site. Then the customer selects the Vendor on the network entity web site. Then the network entity web site transfers the customer to the Vendor web site. Then the customer selects goods, the Vendor retains the order in the database, and the vendor web site returns the customer to the network entity web site. The network entity web site then may up-sell goods to Customer. The network entity displays available Customer accounts: the network entity identifies customer and retrieves from database all customer account identifiers; the network entity sends web service request to financial institution for each account requesting balance information for that account; financial institution responds with balance information; and accounts and balance information displayed for customer selection. The customer then selects account from which to make payment for goods. If a Loan account is selected, the customer selects duration of the loan (and the network entity web site calculates the estimated monthly payments) and the customer selects type of insurance required on this loan (some insurance is provided free on certain loans). The network entity web site then transfers Customer to appropriate FI web site for Authorization of payment (FI authorizes transaction (approval/preliminary approval/denial) for purchase of goods against selected account; if a loan account, required disclosures displayed to customer; and summary of transaction displayed to customer, where Customer gives final approval by providing FI password). The FI web site then returns the Customer to the network entity web site with approval code. If declined, the Customer given opportunity to charge purchase to other account (proceed from the step of the network entity displaying available Customer accounts). The network entity web site then adds the Order to Database, and sets the timer. If AP is required, the network entity web site sends Web Service AP request to FI (FI Web Service adds AP to Bill Pay database and FI Web Service sends response to the network entity). The network entity web site sends Web Service order confirmation request to Vendor (Vendor Web Service updates order in database, Vendor Web Service sends response to the network entity, and Vendor sends email to Customer confirming order). The network entity web site updates Order in Database. If Approval also represents PO from FI, send FI PO to Accounting (Accounting updates database, Accounting sends PO request to Vendor, and Accounting sends Invoice to FI if necessary). If preliminary approval from FI the following steps may be taken: FI sends PO request to the network entity; TP updates Database, and sends FI PO to Accounting; Accounting updates database; Accounting sends PO request to Vendor; and Accounting sends Invoice to FI if necessary. Vendor receives PO from the network entity: Vendor updates order in database (Vendor arranges for delivery of goods to Customer); Vendor sends Invoice to the network entity (this may be a daily file); TP updates database, and sends Vendor Invoice to Accounting; and Accounting updates database.

Figure 26:
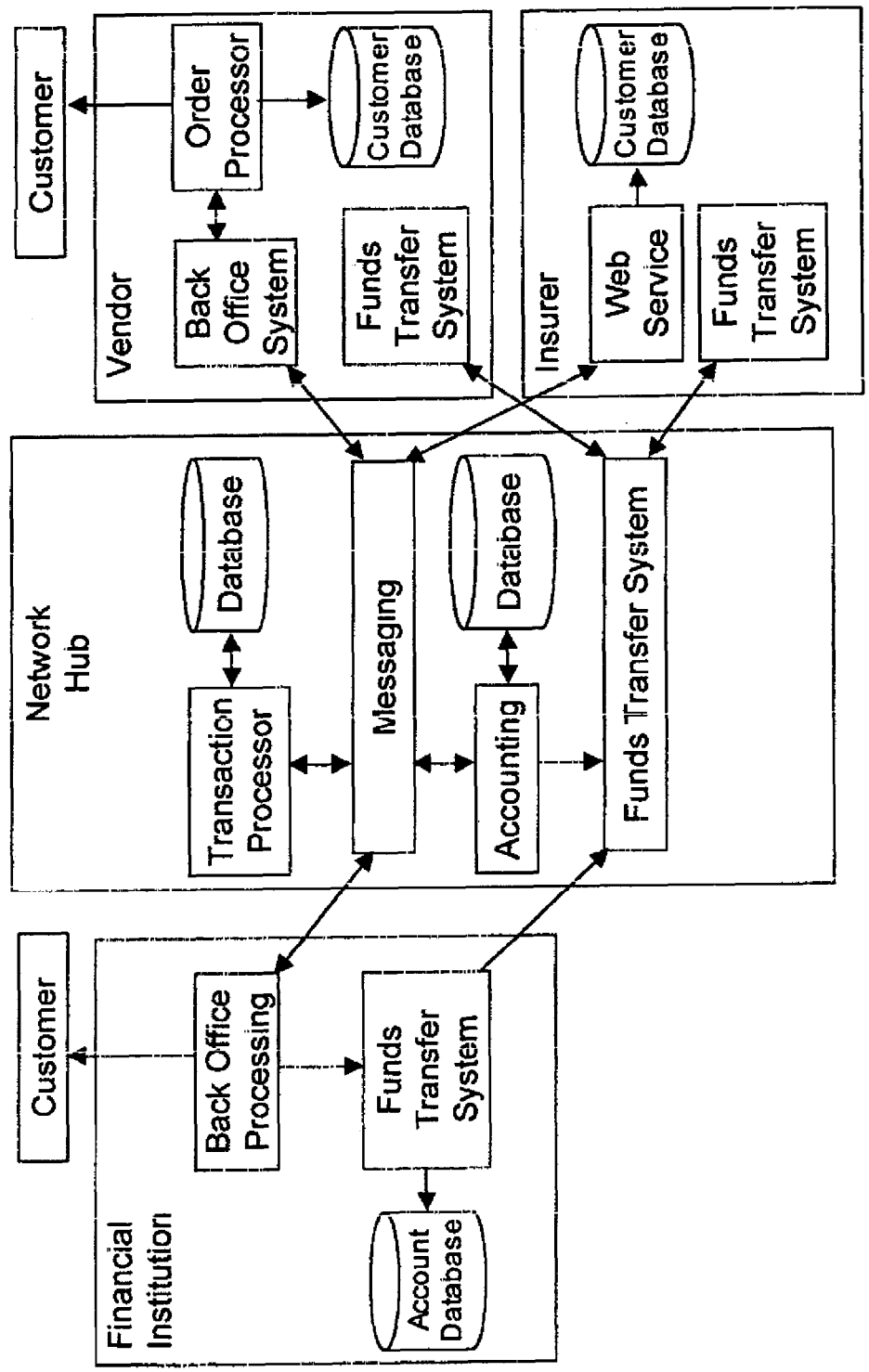
FIG. 26 is a schematic diagram of an exemplary embodiment of flow of the hub of the present invention during the process of the completion of a customer purchase.

Purchase Process: FIG. 26 is a schematic diagram of an exemplary embodiment of flow of the hub of the present invention during the process of the completion of a customer purchase. The customer has selected goods for purchase, and has been authorized by his financial institution. Now the network entity arranges payment for the purchase. This is initiated when the vendor delivers goods to the customer. When the vendor has shipped the purchased product to the customer, they notify the network entity of this. The method of notification is the choice of the vendor—a web service message, or a back office message. If insurance is involved on a product loan for this purchase, the network entity initiates the insurance with the insurer, in a daily activity file. The network entity sends shipping notification to the financial institution, and then confirms receipt of the shipping notification to the vendor. The financial institution delivers payment for goods from the customer's account to the network entity following standard accounting procedures. The network entity then forwards payments to the Vendor and Insurer following standard accounting procedures.

Full/Partial Reversal of Financial Transaction: There are occasions when not all goods are delivered to the customer, or the transaction is cancelled. This will result in a full or partial reversal of the transaction. The network entity will receive from the vendor notification of the partial/full reversal. If insurance is involved in the transaction, insurance is re-calculated, and the insurer is notified. The network entity then sends a Web Service message to the financial institution with information on the reversal, and the financial institution will respond to the network entity.

Using the process flow diagram of FIG. 26, the following steps are exemplary steps of the process flow during the process of the completion of a customer purchase. First, the vendor delivers goods to the Customer. Next, the vendor sends delivery notification to the network entity. Then the TP updates the order in the database. If Insurance, TP sends Insurance Request to Insurer (this may be a daily file). TP then sends delivery notification request to the FI. The FI authorizes payment for goods, and sends email to Customer: payment of funds for goods. The FI then delivers funds with notification to the network entity. The TP updates database, and sends notification to Accounting. Accounting updates database and verifies payment. Accounting releases funds to Vendor and Insurer. Insurer receives Insurance Request from the network entity: Insurer updates database; Insurer sends Insurance Invoice to the network entity; TP updates Database to include Insurance policy info; TP sends Insurance Invoice to Accounting; and Accounting updates database. Authorization of payment of Invoice: Accounting delivers funds with notification to appropriate company through funds transfer system and Company verifies delivery of funds.

Figure 27:
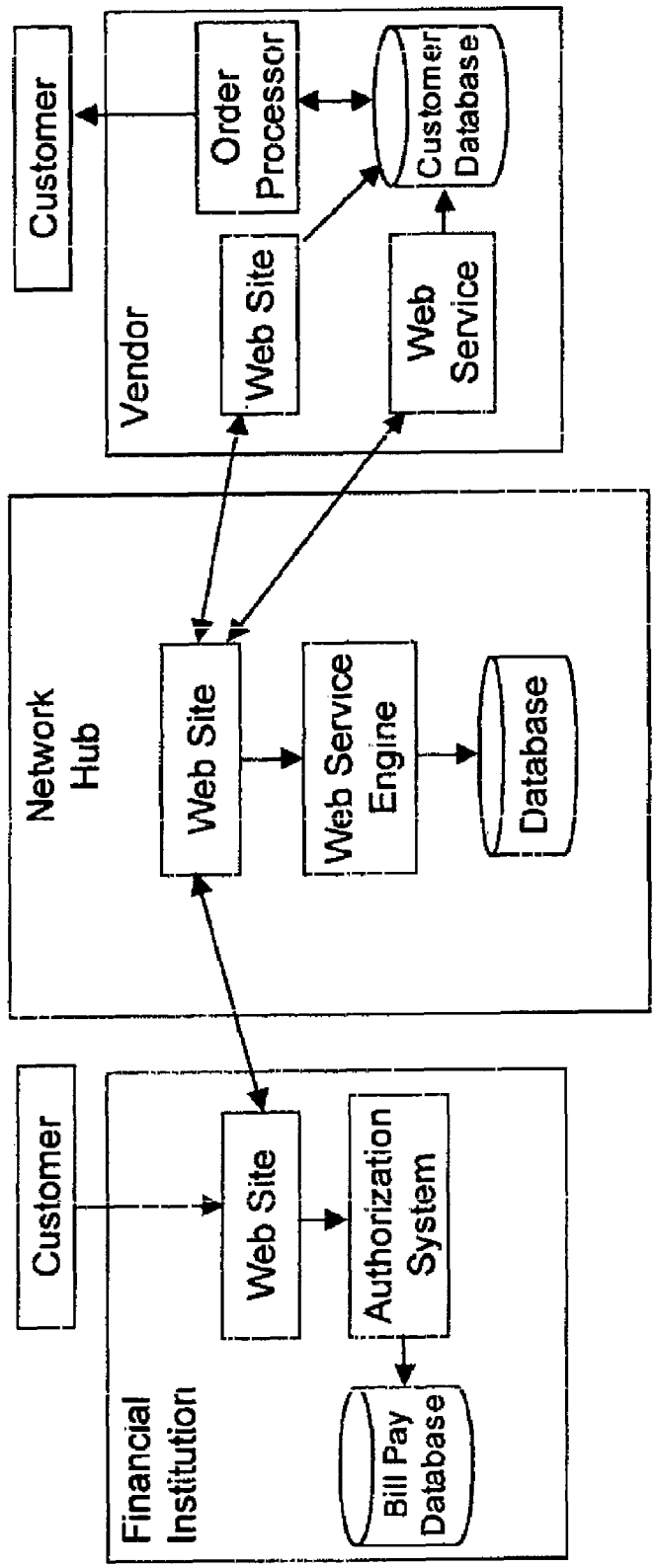
FIG. 27 is a schematic diagram of an exemplary embodiment of flow of the hub of the present invention during the process of the customer making a purchase of a service.

FIG. 27 is a schematic diagram of an exemplary embodiment of flow of the hub of the present invention during the process of the customer making a purchase of a service. A different type of vendor in the Shopping Network is a Service Provider. A Service is a purchase that requires repeating monthly payments, e.g. Internet Broadband. This should result in an automatic payment in the customers Bill Pay system. Once a customer has selected services from a vendor on the Shopping Network, the vendor returns the customer to the network entity. The network entity then passes the customer to the financial institution maintaining his money management account. Once the financial institution has added the appropriate repeating payment to the Bill Pay system, the customer is then passed back to the network entity with the authorization of this transaction. The network entity completes the online transaction with the vendor with one of three options: a web service message; a back office message; or by passing the customer to the vendor. The vendor chooses the completion option. It should be noted that some purchases are for both goods and services, and therefore contain appropriate steps to facilitate both aspects of the purchase.

Customer connects direct to Vendor: Follow the same procedures as described in the shopping section.

Using the process flow diagram of FIG. 27, the following steps are exemplary steps of the process flow during the process of the customer making a purchase of a service. First, the customer logs into FI web site. Next, the customer selects to go shopping. Then, the FI web site transfers the customer to the network entity web site. The customer then selects the Vendor on the network entity web site. The network entity web site transfers the customer to the vendor web site (the customer selects services, the Vendor retains order in database, and the vendor web site returns Customer to the network entity web site). Then the network entity web site may up-sell goods to Customer. Then the network entity web site updates database. Then the network entity web site transfers Customer to appropriate FI web site for Authorization of AP. A summary of the transaction may be displayed to the customer, where the customer gives final approval by providing the FI password. Then the FI adds AP into Bill Pay Database. Then the FI web site returns Customer to the network entity web site. Then the network entity web site updates database. Then the network entity web site sends Web Service order confirmation request to Vendor: the vendor Web Service updates order in database, the vendor Web Service sends response to the network entity, and the vendor sends email to Customer confirming order. Finally, the network entity web site updates Database.

Figure 28:
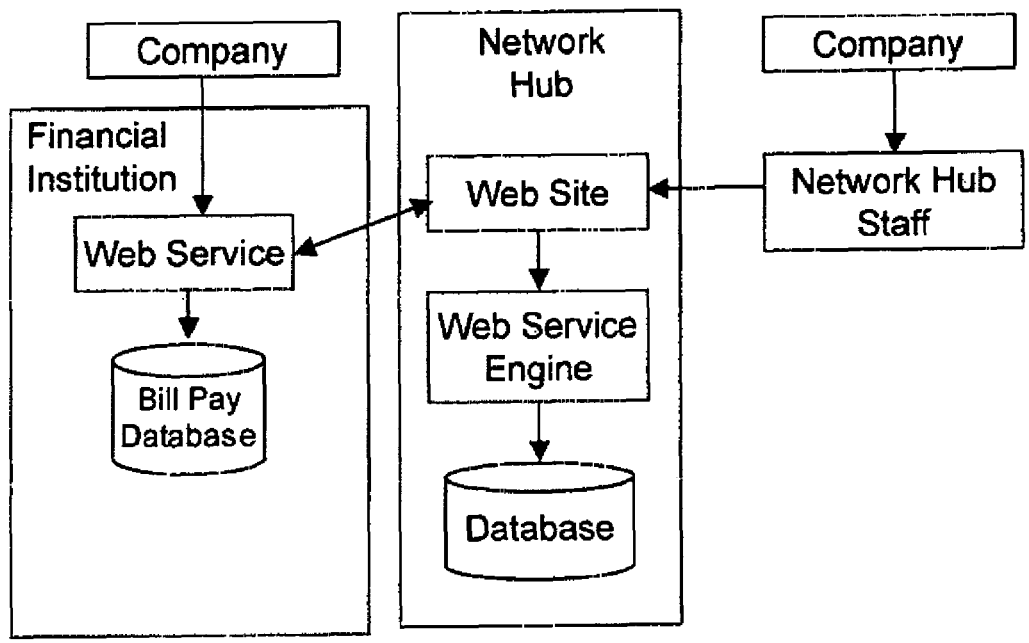
FIG. 28 is a schematic diagram of an exemplary embodiment of flow of the hub of the present invention during the bill pay network set up process of for a company.

Company set up in Bill Pay Network: FIG. 28 is a schematic diagram of an exemplary embodiment of flow of the hub of the present invention during the bill pay network set up process of for a company. A Company may elect to become a Payee in the Bill Pay System of a selection of financial institutions connected to the Network. Digital World Access provides a network to accomplish this. The Company must make a formal request to the network entity to be set up as a network payee in the Network. The network entity will go through a certification process with the company prior to connecting the company to the Network. A network entity staff member will register the company in the Network through a web site, and configure the company to the company's requirements, including selecting which financial institutions the company wishes to be a payee in. The network entity staff member will then initiate activation of the company as a payee. It is possible for the company to request a change to this at a later time. The network entity sends a message to each selected financial institution requesting that the company be added into the financial institution's Bill Pay System. If the Company is not already in the financial institution Bill Pay System it is added to the Bill Pay Database. The financial institution then returns notification of the addition and the Bill Pay Database ID of the Company to the network entity. The company is then informed that this is complete.

Using the process flow diagram of FIG. 28, the following steps are exemplary steps of the process flow during the bill pay network set up process of for a company. First, the company requests to be present on selected Banks Bill Pay System. Next, the network entity staff log into Admin web site, make request, and adds request to Database. Then the network entity Web Service sends request to each selected FI. If the company is not already in FI Bill Pay System, the FI Web Service adds the company to Bill Pay Database. Then the FI Web Service returns Payee ID (within Bill Pay Database) to the network entity. The network entity Web Service updates Company record in Database. It should be noted that the company may be a FI, a Vendor, or any other company.

Figure 29:
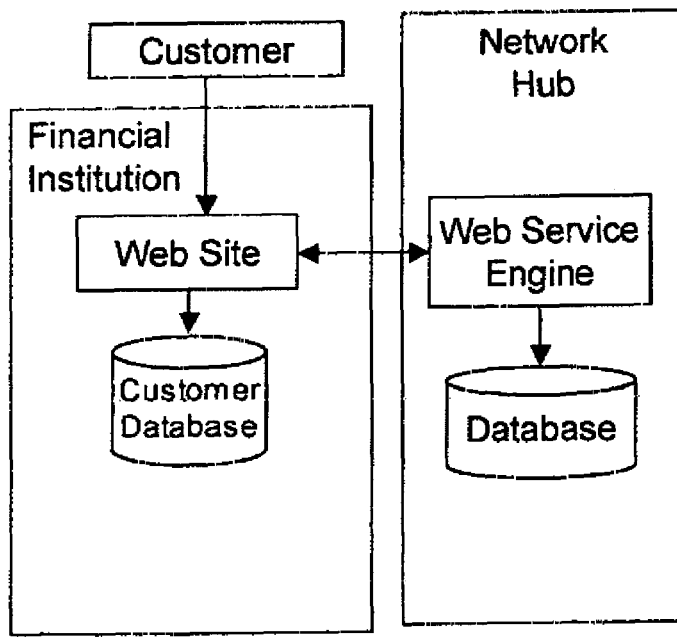
FIG. 29 is a schematic diagram of an exemplary embodiment of flow of the hub of the present invention during the process of the customer registering as a payee.

Customer sets up as Payee: FIG. 29 is a schematic diagram of an exemplary embodiment of flow of the hub of the present invention during the process of the customer registering as a payee. The Customer may elect to become a Payee in the Network. This allows the Customer to receive funds from any other Customer (via Automatic Payment or individual payment), by providing their Network Payee ID to the Customer. The customer elects to become a Network Payee on the financial institution web site. The financial institution sends a Web Service message to the network entity with information on this customer and the specific account selected. The network entity adds this information into the database, and responds with the Network Payee ID for the specific account. The financial institution should retain this payee ID.

Using the process flow diagram of FIG. 29, the following steps are exemplary steps of the process flow during the process of the customer registering as a payee. First, the customer logs info FI web site. Next, the customer requests to become a Network Payee. Then the FI web site sends Customer information to the network entity Web Service. Then the network entity Web Service generates Payee ID for Customer Account, and updates Database with Customer information. Then the network entity Web Service returns Network Payee ID to FI web site. Then the FI web site updates Customer Database to include Network Payee ID. Then the FI web site informs Customer of Network Payee ID. The customer can now give this ID to any other Product Customer in order for that Customer to make payments directly to this Customer. It should be noted that this feature is most likely used for Customers that are Businesses.

Figure 30:
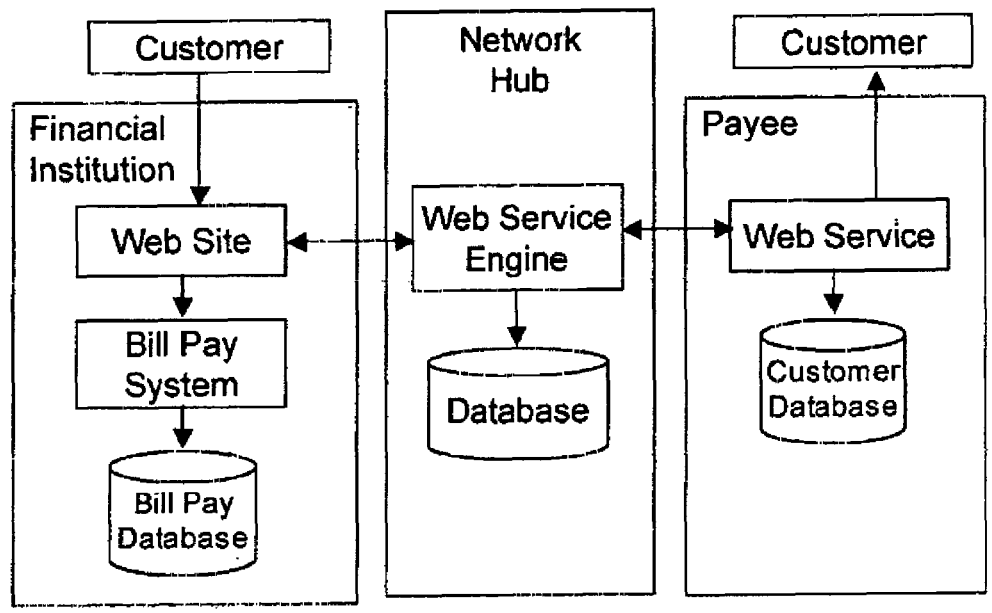
FIG. 30 is a schematic diagram of an exemplary embodiment of flow of the hub of the present invention during the process of a payment/money management account being used to disburse funds.

Using the money management account to Disburse Funds: FIG. 30 is a schematic diagram of an exemplary embodiment of flow of the hub of the present invention during the process of a money management account being used to disburse funds. A Product Customer may make payments from his money management account using the financial institution's existing online bill payment system. A payment is considered to be any expense that the customer can predict, e.g., a fixed amount to transfer to his savings account, or any fixed or variable amount provided in an online bill from an authorized payee, e.g., the customer's phone bill.

By selecting the money management account as the source for the payment, the customer is choosing to use the features of the money management account when paying this bill, i.e., he is expecting the financial institution to retain funds from his direct deposit income in the money management account for later disbursement to the payee.

Adding a Payment: To add a payment, the customer logs in to the financial institution's online bill payment system, and creates a new entry in the same way as today. If the payment is for a variable bill to a payee registered in the variable bill processing network, the financial institution must notify the network entity with a web service message. The network entity will add this new account into the database, and if the payee requires to be notified, the network entity will send the payee an appropriate web service message.

When a customer wants to make payments to an individual/entity that is not currently a payee in the financial institution's bill payment system yet, but has a Network Payee ID, the customer enters this ID into the financial institution's bill payment system in place of selecting a Payee from the current Payee list. The financial institution sends a web service request to the network entity for the Payee; the network entity collects information about the Payee from the database and returns this information to the financial institution. The financial institution adds this Payee information to its bill payment system for this customer. The customer completes the automatic payment by supplying the amount and dates.

If there is insufficient time to retain funds in the money management account from the customer's direct deposits prior to the required payment date, the customer must approve transfer of sufficient funds from another account to this account for the first payment.

Modifying/Deleting a Payment: A customer may choose to modify or delete any payment with the exception of a product loan payment. The customer does this through the financial institution's online bill payment system. If deleting a payment for a variable bill to a payee registered in the variable bill-processing network, the financial institution must notify the network entity with a web service message. The network entity will delete this account from the database, and if the payee requires to be notified, the network entity will send the payee an appropriate web service message.

In the event that the customer reduces the payment amount, any excess funds that may be in the money management account will be transferred to the customer's discretionary account.

Synchronizing Bill Pay System with the network entity: It is necessary for both the financial institution and the network entity to be able to recognize payees being paid from the money management account. Rather than sending all information about each payee for each transaction in the Activity File (see below), it is preferable that an identifier be used for each payee that both the financial institution and the network entity recognizes. This is only necessary for larger payees—those that are available to customers searching by name of payee.

When such a payee is first being paid from the money management account, or prior to this, the financial institution sends notification of the addition and the Bill Pay Database ID of the Company to the network entity. The network entity adds this information into the payee database (if not already there), and will respond with a Network Payee ID.

Using the process flow diagram of FIG. 30, the following steps are exemplary steps of the process flow during the process of a money management account being used to disburse funds. For most Automatic Payments, the customer follows standard procedure for using FI's existing Bill Pay system: the customer logs info FI web site; the customer enters FI Bill Pay system; and the customer selects Payee and amount, following standard Bill Pay procedures (Bill Pay system adds Payment to Customer Bill Pay). Variable Bill Processing requires the Payee to be notified: the customer identifies bill as Variable Bill; the FI sends Web Service message to the network entity with Payee identifier, and account information; the network entity sends notification to Payee to identify this customer as wishing to process variable bills through the network entity; the Payee updates database, sends notification email to the customer, and responds to the network entity; and the network entity updates the database and responds to FI. The network entity requires knowing all major Payees accessing money management account: the FI web site sends Payee notification to the network entity Web Service; the network entity Web Service adds FI Payee information to Database; the network entity Web Service responds with the network entity Payee ID; and FI may choose to add the network entity Payee ID to database. Some Automatic Payments involve using Network Payee ID, provided directly from Payee to Customer: the customer logs info FI web site; the customer enters FI Bill Pay system; the customer enters Network Payee ID; the FI web site sends Payee ID request to the network entity Web Service; the network entity Web Service collects Name, Address, and routing information for Payee Account from database, and returns it to FI; and the FI Bill Pay system adds Payment to Customer Bill Pay.

Figure 31:
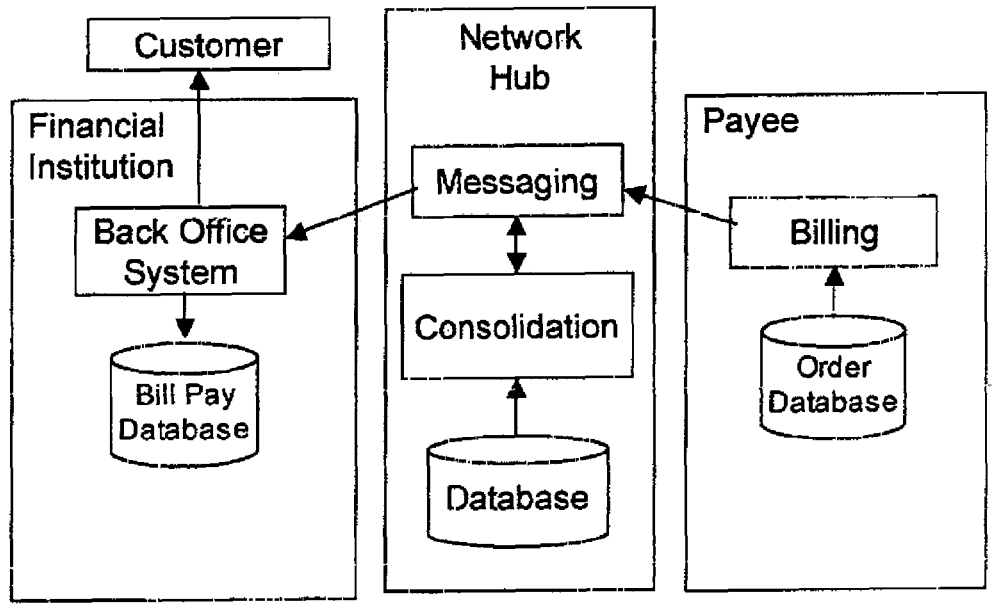
FIG. 31 is a schematic diagram of an exemplary embodiment of flow of the hub of the present invention during the process of variable automatic payment processing.

Variable Automatic Payment Processing: FIG. 31 is a schematic diagram of an exemplary embodiment of flow of the hub of the present invention during the process of variable automatic payment processing. Some bills may have a variable amount each month (e.g. Utility bills, Credit Cards). The Network provides a method for setting up, processing, and authorizing bills like this.

Variable Bill Set Up: The customer logs in to the financial institution's online bill payment system and requests to set up a "Variable Bill". The Customer then selects the Payee Company, and provides the customer account number for that Payee. The financial institution records this as a variable bill, and passes this information to the network entity via a web service message. The network entity will add this new account into the database, and if the payee requires to be notified, the network entity will send the payee an appropriate web service message. See above for details.

Variable Bill Processing: The Payee Company sends a file to the network entity on a regular basis that contains a summary of customers and the variable bill amounts. The consolidation process processes this file, determining for each customer whether variable bill processing has been requested and for which financial institution the customer processes bills. The network entity then sends to each financial institution a summary of all variable bills for Customers of that financial institution. The financial institution's Back Office system updates the Bill Pay Database to record the exact amount of each bill for each Customer and notifies the Customer of receipt of a Variable Bill.

The financial institution can provide any of several methods for the customer to authorize a variable bill; the choice (if any) determined by the customer when the variable is setup. Examples of payment methods are: the customer may be required to authorize each variable bill (described below); the financial institution will automatically pay the bill amount; the financial institution will automatically pay the minimum due amount (e.g. for credit cards); the financial institution will automatically pay a fixed amount or the due amount whichever is lower; and the financial institution will pay the due amount up to a determined level (and if above this level, the customer is required to authorize the payment).

Variable Bill Authorization: Once the Customer receives notification from the financial institution regarding a Variable Bill that requires authorization, he logs into the financial institution web site (possibly through a link in the notification email), where the financial institution displays the Variable Bill to be authorized. The Customer authorizes payment of the Variable Bill by providing his financial institution password, and the financial institution sets up a one-time bill payment in the Bill Pay System from an account of the customer's choice. If the account of choice is the money management account, and there is insufficient time available for the funds to be retained prior to the bill payment date, the financial institution either requests a different account or the customer authorizes funds to be transferred from other accounts into the money management account.

Using the process flow diagram of FIG. 31, the following steps are exemplary steps of the process flow during the process of variable automatic payment processing. First, the payee sends file to the network entity containing summary of customers and variable bill amounts. This file is passed on to Consolidation. Next, the network entity Consolidation determines from the Database, each customer, and the appropriate FI. The network entity sends a file to each FI with summary of variable bills for that FI. Then the FI updates Bill Pay Database to record exact amount of each bill for each Customer. If maximum amount for Customer exceeded by actual amount, notify Customer. It should be noted that the company may be a FI, a Vendor, or any other Company.

Figure 32:
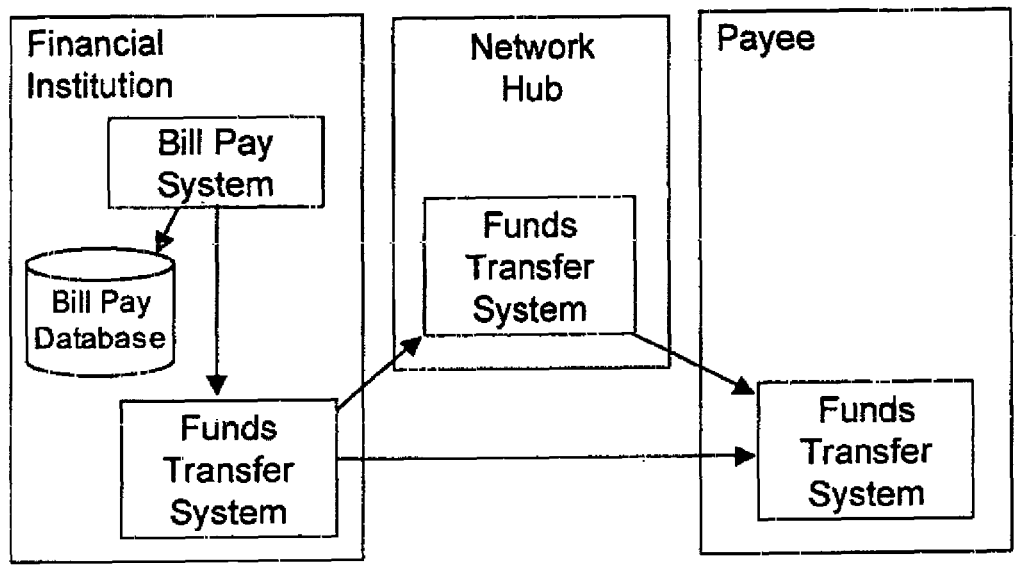
FIG. 32 is a schematic diagram of an exemplary embodiment of flow of the hub of the present invention during the process of the financial institution processing an automatic payment.

Financial Institution Processing of Automatic Payment: FIG. 32 is a schematic diagram of an exemplary embodiment of flow of the hub of the present invention during the process of the financial institution processing an automatic payment. Each day, the financial institution bill pay system processes all automatic payments scheduled for that day. The financial institution bill pay system follows existing procedures when performing its daily automatic payments, and instructions regarding transferring funds to Payee's also follow existing procedures. The account from which a payment is made may be a money management account. The Payee of an automatic payment may be Digital World Access. If this is the case, the network entity will receive funds and determine the relevent destination payee. The network entity will retain commission (if any) and then distribute funds to relevent payee following standard procedures.

Using the process flow diagram of FIG. 32, the following steps are exemplary steps of the process flow during the process of the financial institution processing an automatic payment. First, the FI Bill Pay System authorizes AP payment. Next, the FI Funds Transfer System delivers funds to Payee following standard procedures. Then, the Payee receives funds. If the processing of Bill Payment is made through the network entity the following steps are preferably followed: FI Bill Pay System authorizes AP payment; FI Funds Transfer System delivers funds to the network entity following standard procedures; Accounting verifies received payments; Accounting delivers funds (less the network entity commission) to Payee following standard transfer procedures; and Payee receives funds.

Figure 33:
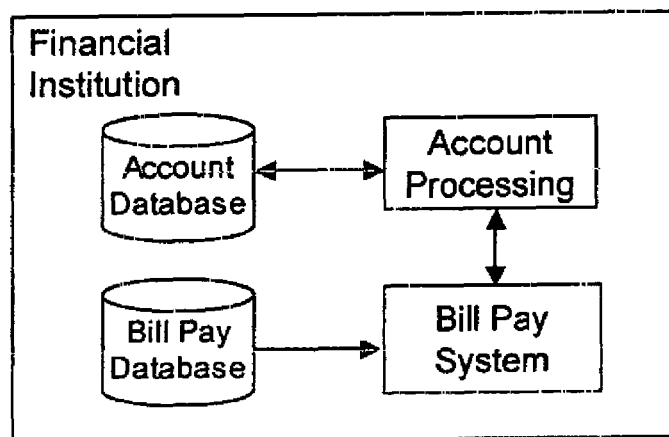
FIG. 33 is a schematic diagram of an exemplary embodiment of flow of the hub of the present invention as it pertains to financial institution payroll procedures.

Financial Institution—Payroll Procedures: FIG. 33 is a schematic diagram of an exemplary embodiment of flow of the hub of the present invention as it pertains to financial institution payroll procedures. On a customer's payday, the net amount of his paycheck is deposited into his money management account. Alternately, funds may be deposited into this account from other sources. The financial institution recognizes funds have been deposited into the money management account. The financial institution then determines the amount of funds to retain to cover customer-directed payments (from its Bill Pay system), and transfers all remaining funds to the customer's discretionary account.

Using the process flow diagram of FIG. 33, the following steps are exemplary steps of the process flow during the financial institution payroll procedures. First, the FI Account Processing System recognizes deposit of funds in the money management account. Next, the FI Account Processing System requests of Bill Pay system amount to be retained in the money management account. Then the FI Bill Pay system calculates amount to be retained in the money management account based on current account funds and monthly bills, and informs Account Processing system of amount. Then the FI Account Processing System transfers un-retained funds to Flow Through account (probably Checking account).

Figure 34:
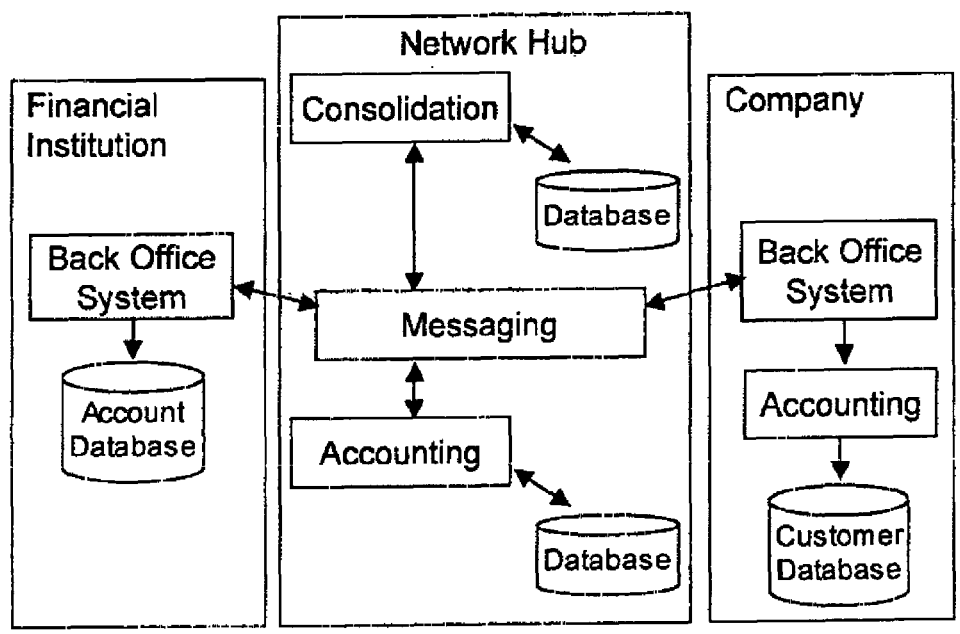
FIG. 34 is a schematic diagram of an exemplary embodiment of flow of the hub of the present invention during the process of the network hub processing an activity file received from a financial institution.

Financial Institution—Activity File: FIG. 34 is a schematic diagram of an exemplary embodiment of flow of the hub of the present invention during the process of the network hub processing an activity file received from a financial institution.

The financial institution must send to the network entity on a daily basis everything that has happened relating to money management accounts. This includes deposited funds and Automatic Payments.

The financial institution collects all activity on the money management account throughout the day in an Activity File, and at a specified time sends this file to the network entity. The consolidation process processes this file, determining for each entry whether any company requires to be invoiced based on that entry. The consolidation process groups relevant entries into appropriate files for each company to be invoiced, and notifies accounting with a summary of the invoice (this notification may be performed by settlement at a pre-determined time, grouping files from multiple financial institutions into a single file for each company). The network entity accounting then sends an Invoice to the appropriate company.

Using the process flow diagram of FIG. 34, the following steps are exemplary steps of the process flow during the process of the network hub processing an activity file received from a financial institution. First, the FI collects activity on money management account throughout the day in Activity File. Next the FI sends Activity File to the network entity, and this file is passed on to the Consolidation Module. Then Consolidation updates Database to reflect contents of file. Then Consolidation groups records by company/FI. If invoicing of any company required: Consolidation sends invoicing details to Accounting; Accounting sends Invoice to Company. Standard accounting procedures follow; and Accounting updates database.

Miscellaneous

Insurance Claim: Insurance is available on loans from the product loan account. If the customer has chosen to insure his loan, and suffers a covered event (e.g. involuntary unemployment), his product loan is either paid off completely (see below) or converts to interest-only payments for the duration of the coverage (resulting in an extension of the loan). Coverage expires either when the customer no longer qualifies for coverage or when the limit of coverage has expired. After this term, responsibility for the full loan payment reverts to the customer.

When a customer submits a claim on his insurance covering a Product Loan, and the claim is approved, the insurer informs the network entity with a message or a file. The network entity updates the database and sends a Web Service message to the financial institution with information about the insurance. The financial institution changes the product loan to Interest Only payments until further notice, and temporarily suspends the appropriate Bill Pay entry for this customer (interest payments made from the insurance company).

Once the insurance is no longer covering the loan, the insurer informs the network entity with a message or a file. The network entity updates the database and sends a Web Service message to the financial institution to revert the loan to a conventional payoff method, i.e., fully amortized principal & interest payments. The financial institution also reinstates the bill pay entry to its original payment schedule, but with extended duration as required.

It should be noted that it is the responsibility of the customer to request insurance activation. The financial institution will provide contact information for the Insurer to the customer on request.

Insurance Claim—loan paid off: Certain insured events may result in the full payment of the loan. At this point the loan is paid off directly from the Insurance Company, and the financial institution terminates the appropriate bill payment in the bill payment system.

Download Account Activity to Personal Software: If the financial institution currently allows its customers to download account information into personal software, e.g., Quicken, Money etc., the financial institution must extend this functionality to the new Product accounts and functions. Note: This does not involve the network entity in any way.

Insufficient Funds in money management account: There may be times when the balance of funds in the money management account is insufficient to cover all scheduled payments. There will be advanced warning of this situation, as it would be recognized either when funds are deposited into the account, or a bill payment is added/modified. Thus there is time to remedy the situation. If the customer is not currently online, the financial institution sends an email to the customer requesting that the customer logon in order to remedy the situation. The customer is given a choice of how to remedy the situation: the customer transfers sufficient funds from another account into the money management account; the customer identifies a backup account for to be used in instances where insufficient funds are available in the money management account; the customer redirects payments to alternate accounts; or the customer does nothing (This will result in payments being made until insufficient funds are available for a payment, at which point the payment will not be made and the financial institution notifies the customer of this). It should be noted that this does not involve the network entity in any way.

Automatic Change to Amount of Bill in Bill Pay System: On occasions, it is necessary to change the amount of a previously established payment. Examples include: Vendor ships partial order to customer, and customer cancels remainder of order and Insurance claim. The network entity will be informed of such an event and this will result in sending a Web Service message to the financial institution describing the customer, account, and payment information in all cases. This will never result in an increase of a bill payment amount/ duration above its original password approved amount/duration. The financial institution adjusts the bill payment appropriately and returns confirmation that this has been done.

Adjustments Against Customer Account: On occasion, it is necessary to reverse out a completed transaction, either fully or partially. Examples include: Vendor ships partial order to customer, and customer cancels remainder of order and Customer returns faulty goods to Vendor. The network entity will be informed of such an event and this will trigger a Web Service message to the financial institution describing the customer, account and order information. The financial institution performs an Adjustment against the customer's account, and returns confirmation that this has been done.

Message Error Processing: In order to accommodate inherent problems in any communications system, error processing including reversals will be performed where necessary. In extreme circumstances manual intervention will be required.

Credit Card Processing: The system of the present invention has the capability to process credit card transactions. For credit card processors that issue their own cards (e.g. American Express, Diners), the credit card processor can set themselves up as if they are a financial institution.

For credit card processors that do not issue their own cards (e.g. VISA, MasterCard), there are two methods for transactions to be processed. First, a transaction is authorized directly with the financial institution that issued the card, with possibly a notification to the credit card processor. The credit card processor may require fees to be retained from the transaction as it passes through the system of the present invention, and passed on to the credit card processor. Second, the credit card processor can position themselves between the network entity and the financial institution that issued the card. The credit card processor will look like a financial institution to the network entity, and will look like the network entity to the financial institution. By positioning themselves thus, they are then able to monitor and verify all transactions processed through the system of the present invention using their credit cards, and can also withhold fees for using their cards.

In order for a credit card to be used for a specific transaction, it may be necessary for the appropriate vendor to be signed up with the credit card processor (this decision will be decided by the Credit Card company and the network entity), and it may be necessary for certain vendor information (e.g. Merchant ID for this credit card processor) to be supplied to the network entity and passed on to the credit card processor.

Multiple Data Center Processing: The system of the present invention will involve multiple data centers, with information on each data center mirrored on some but not necessarily all other data centers. A determination is preferably made regarding each type of information in the system of the present invention, and the mirroring requirements of that information. For example, a vendor that does business in the United States should have all it's information mirrored across all data centers within the United States. Another example is that a customer, when registered by a financial institution on one data center, should be mirrored on a single other data center. Information required for a specific transaction will not necessarily reside on the data center that is processing the transaction. One of two actions must take place, dependent on circumstances: first, the transaction is preferably transferred to the appropriate data center for processing (the transaction can continue through this data center, or through both data centers); and second, a request is made to the appropriate data center for information required to complete the transaction (this information can be discarded after use, or retained in the database (resulting in this information now being mirrored)). In either case, it is preferably possible from the transaction and the database to determine which processing center hosts required information for processing this transaction.

Figure 35:
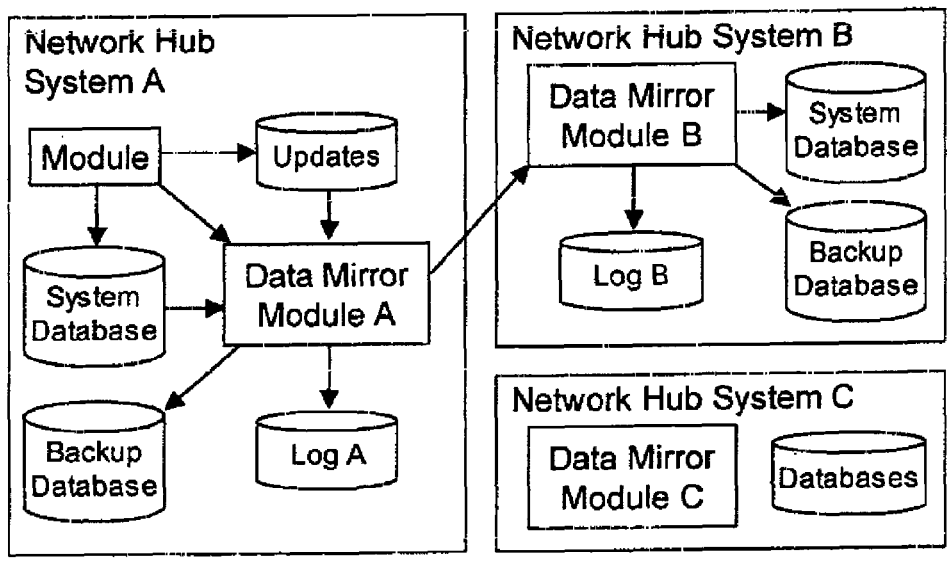
FIG. 35 is a schematic diagram of an exemplary embodiment of flow of the hub of the present invention ensuring data integrity across multiple network hub data canters.

Data Mirror System: FIG. 35 is a schematic diagram of an exemplary embodiment of flow of the hub of the present invention ensuring data integrity across multiple network hub data canters. The data mirror system is responsible for ensuring database updates on one system are duplicated on other systems. There will also be backup databases on the each system, and the data mirror system may be responsible for maintaining these databases as well. It is intended that there will eventually be multiple systems communicating with each other. Every system will have at least one other system that is an exact duplicate (mirrored)—any change to the database on one system will automatically result in the identical change being made to the other. Some information may be mirrored across systems that are not mirrored. For example, System A and System B are mirrored to each other but not to systems C and D (which are mirrored themselves), however information about customer XYZ may be mirrored across Systems A, B, C, and D.

The flow diagram of FIG. 35, shows the paths for possible ways for the data mirror module to be informed that a record has changed. Data that is added, updated, or deleted results in mirroring of that change on another system or other systems. First, the data mirror module recognizes when a database file/table is modified, and reads the modified record/entry. Second, the module making the change sends a message directly to the data mirror module. Third, the module making that change records the change in an update file/table. The data mirror module continually reads records from this file/table. The process for the Data Mirror Module A receiving a database change is implemented using the following steps. First, Data Mirror Module A updates each backup database on system A with database change. Next, Data Mirror Module A determines which other systems require notification of database change (in this example, only B). Then, Data Mirror Module A groups multiple database changes into single message, and sends message to data mirror module B. Data Mirror Module B then updates databases on system B with database change. Data Mirror Module B then sends response to data mirror module A confirming databases updated. Then Data Mirror Module A updates log to reflect confirmed changes.

Module Overview

This section identifies the key modules of the system. Expected capabilities for the modules are defined.

Generic Messaging Capabilities: Encrypted Flow Info Passing: Information used by the system of the present invention may be needed to be included in messages as an encrypted package to be sent back in subsequent messages. This information would be encrypted and only readable by the system of the present invention. This would facilitate the tracking of an activity through the system across multiple varying requests. Depending on the type of a message absence of the encrypted package may or may not constitute an error condition. Standard cryptographic measures should be taken to guarantee the integrity of the encrypted package such as including a timestamp to guarantee a difference between encrypted data that has the same contents. Examples of Encrypted Package Data include FinancialInstitutionID, CustomerID, VendorID, TransactionType, and Timestamp.

Web Site: There are several functions that the web site preferably facilitates. Most likely form posts will be used as the message passing method when transferring users between sites. End point URLs for transferring users to other companies' web sites is preferably configurable. All operations that require transferring the user from one company to another will pass through the network entity site so that companies do not have to have knowledge of other companies systems. Each function is listed with a description of pages used.

Shopping: Shopping in the system is generally initiated with a customer selecting on his financial institution web page to go shopping, whereupon the financial institution will pass the customer to the network entity Vendor Selection page. An alternate method for a customer to go shopping is for the customer to go directly to the vendor web site, select goods for purchase, and then select the Product Payment System to facilitate the purchase. In this case, the vendor passes the customer to the network entity Customer Identification page.

Vendor Selection Page: The primary method of reaching this page is from the customer's financial institution web page. The user will be passed to a selected vendor to shop for products that can be purchased through the system of the present invention. Received Data may include: Financial Institution ID and Customer ID. Actions may include: Provides a link to the link account page; Displays a cached vendor list; The customer is given the capability to search for vendors that are connected to the system of the present invention; The customer is given the capability to request a vendor to be added to the shopping system; The customer may be exposed to advertising and a top vendor list; and, when a customer selects a vendor, encrypt flow information and transfer the customer to the vendor's site to shop.

Customer Identification Page: The primary method of reaching this page is from the vendor's web page. At this point the network entity does not know who the customer is, or whether he is even in the system. The network entity must try to identify the customer, allow the customer to select his financial institution, and inform the customer about the Product. Received Data may include Vendor ID and order information. Actions may include: Attempt to identify the customer by accessing a cookie (this cookie should contain a list of customer IDs, display the ID for the customer to select his, and pass the customer on to his financial institution to log on, or to the payment selection page); provides information about the Product, and a link to further information; provide a selection method for the customer to select his financial institution (encrypt flow information and pass the customer to the selected financial institution. The financial institution (one that the customer has logged on and possibly registered for the Product) will pass the customer back to the network entity payment selection page with his Product Customer ID.)

Payment Selection Page: When making a purchase through the system the vendor will handover the user to the network entity site to select which account(s) they would like to make a purchase from. If the money management account is a Product loan account then the network entity web site will prompt for specifics about the loan terms and insurance. The system will hand over the user to the selected financial institution to authorize the transaction. The financial institution will return payment-processing results to the network entity site and the network entity site will return payment-processing results to the vendor. Received Data may include encrypted flow information, financial institution ID, customer ID, vendor ID, and details about purchase. Actions may include: provides a link to the link account page; if financial institution and customer id is unknown transfer use to the customer identification page; collect from database-linked accounts for identified customer; request details for customer's linked accounts from each financial institution; for each request that times out, display default and system stored information for the account; display all the customers' accounts with account specific details (balances, interest rates); and when a customer selects a money management account, if a product loan account is selected transfer the customer to the insurance selection page, encrypt flow information, and transfer the customer to the FI's web site.

Insurance Selection Page: Insurance is available on purchases financed from product loan accounts. Actions may include: displays a cached insurance option list, possibly based on customer, financial institution and geographic location; determine and display insurance prices in monthly amounts, based on the amount financed, interest rate of loan, duration of loan, financial institution and customer; display insurance questions; when customer selects insurance, determine whether sufficient customer information available. If not, send web service request to financial institution requesting additional information (e.g. employment information) and verify customer selections; encrypt flow information; and transfer the customer to the FI's web site.

Authorization Results Processing Page: Once the financial institution has authorized the transaction, they return the customer to the network entity to complete the transaction. Received Data may include: encrypted flow information, authorization ID, and financed information. Actions may include: if authorization declined, customer is given opportunity to charge purchase to other account; order added to system database and sets timer for settlement; if automatic payment required, automatic payment request sent to financial institution; if vendor finalizes purchase, customer transferred to vendor with authorization; authorization request message sent to vendor and the vendor responds with confirmation; update order in system database; if approval also represents PO from financial institution send PO to accounting; and display confirmation to customer.

Linking Accounts: When a user selects to link accounts they will be passed to the network entity site to select the company where they hold an account to be linked within the system of the present invention. The user will be handed over to the other company's site to authorize the linking. When the link is successfully authorized the company will return the user to the system of the present invention with details about the linked account, where the account will be linked to the originating company account.

Link Account Page: This page displays certain information about the customer, and current linked accounts. This also allows the customer to select a company to link accounts with. This is the same page that the company will return the customer with linked information. Received Data may include: Company ID and Customer ID. Actions may include: Determine if new linking information is included and update database to reflect new links; Provide a link to the vendor selection page, or a return link to the payment selection page if transferred from there; display information about the customer, and current linked accounts; provide a link to the modify profile page; display a cached company-linking list; give the customer the opportunity to delete/modify-linked accounts; give the customer the capability to search for companies that are connected to the system of the present invention; give the customer the capability to request a company not currently listed to be linked; and when the customer selects a with which to link, encrypt flow information, generate a Product Customer ID, and transfer the customer to the company's site to authorize the linking.

Link Account Transfer Processing Page: The user will be able to view a summary of linked accounts from a company web page. This page will also allow the customer to transfer to a different company maintaining a linked account. The user will select a linked account, and the company will pass the customer to the network entity. Received Data may include: Source Company ID, Customer ID, and linking identifier. Actions may include: Identify the company from linking information and transfer the customer to the destination company's site.

Update Profiles: When a user changes their profile on a company web site, they may be passed to the network entity site where they will be able to select linked accounts they want to update with their profile changes.

Update Profile Page: Received Data may include: Company ID, Customer ID, and Profile Data. Actions may include: Provide a link to the link accounts page; display linked accounts for user to select which accounts to update; send profile update messages to selected companies; and display results of updates.

Company Self Management: Companies that are setup in the system of the present invention will be able to manage their own configuration information via a password protected site.

Company Login Page: Actions may include: login in the Company Administrator.

Company Management Page: Actions may include: identify company and company administrator; display information about company/administrator; allow certain information to be changed in database; and send update request message to CRM for requested changes requiring the network entity authorization.

Administrative Web Site

The network entity administrative web site preferably provides support for managing all aspects of the system of the present invention. Access to the administrative site and functions is preferably secured and restricted. It should be noted that administrative tasks that are preferably supported are listed; however, this list is meant to be exemplary and is not meant to limit the scope of the invention. Administrator Login Page: Actions may include: login the network entity administrative staff. Company Management Pages: Actions may include: send, add, update, or delete a company message to the system of the present invention. Customer Management Page Actions may include: view or update customer data in the system database. System Configuration Management Page: Actions may include: update configuration changes and reload modules affected by configuration changes. System Status Page Actions may include: display the status of various pieces of the system.

Web Service Engine: The web service engine preferably supports communication between the system of the present invention and external companies following the open interoperable web service standards. Most but not all web service communication will also be supported in other more proprietary message passing formats and methods through the messaging framework. End points for sending data to other companies is preferably configurable. Message structure is preferably configurable by company but a default structure should be specified. All messages that don't conform to the internal format will be converted to the internal system message format. In one preferred embodiment, internal messages will be supported in only one format.

Generate Identifier: A key component in the structure of this system is a company or customer identifier. These identifiers are random and unique. Received Data may include: company/customer indicator. Actions may include: generate random identifier for customer or company, verify identifier not already assigned, assign identifier, and return identifier.

Account Management: The system of the present invention contains information about customers and companies. This information requires management, with all management requests passing through the web service engine.

Manage Customer Message: Companies can maintain details about accounts they control that are registered for customers in the system of the present invention. This will primarily be used during signup or on account information/status changes. This will also be used internally for managing linked account information, and profile change information. Received Data may include: company ID, customer's information, and account information. Actions may include: add, update or delete the customer's information; add or update account information; add, update or delete linking information; and return Customer ID.

Manage Company Message: Internal message only. The system of the present invention will need to maintain and retrieve information about companies that connect to the system of the present invention. Much of the information stored will be settings specific to the connecting company. Received Data may include: company ID; company details; and operation (Retrieve, Add, Update, Delete). Actions may include: perform the requested operation on the company record and return the result of the operation. Get Company List Message: Internal message only. Received Data may include: Search Parameters. Actions may include: return a list of companies filtered by the search parameters.

Linked Account Information: A company's web site can display summary information about a customer's linked accounts using the linked account information functionality. Connecting to a linked account will also be supported by the linked account information returned by the system of the present invention. Get Linked Account Information Message: A list of linked accounts and account information are requested for a specified customer. Received Data may include: Customer ID and Linking Type. Actions may include: Identify customer and collect linked account information; Identify linked companies based on Linking Type; Using a configurable timeout request account details for all linked accounts from the identified companies; On timeout return timeout status code; and Return the list of linked accounts and relevant summary information.

Payment Processing: There are several messages that will be used to support the payment process including Authorization Response Message, Vendor Delivery Notification Message, Payment Reversal Message, Financial Institution Purchase Order Message, and Vendor Invoice Order Message. Authorization Response Message Received Data may include: Company ID, Customer ID, Authorization ID, and Authorization Status. Actions may include: Update order in system, Send authorization message to vendor, and Return processing result. Vendor Delivery Notification Message: Received Data may include: Company ID, Order ID, Authorization ID, and Ship status. Actions may include: Update order in system database, If insurance is necessary send insurance request to Insurer (this may be a daily file), Send delivery notification to FI, and Return results. Payment Reversal Message: Received Data may include: Company ID, Order ID, Authorization ID, and Reversal Amount. Actions may include: Send reversal request to FI, Save reversal result to system database, and Return reversal result. Financial Institution Purchase Order Message Received Data may include: Company ID, Order ID, Authorization ID, and Amount. Actions may include: Update order in system database, Send PO to accounting, and Return result. Vendor Invoice Order Message: Received Data may include: Company ID, Order ID, Authorization ID, and Amount. Actions may include: Update order in system database, Send invoice to accounting, and Return result.

Insurance Processing: When loan purchases that have insurance are made the network entity will be invoiced for the purchased insurance. Vendor Invoice Order Message Received Data may include: Company ID, Order ID, Authorization ID, Insurance ID, and Policy Info. Actions may include: Update policy information for order in system database, Send insurance invoice to accounting, and Return result.

Bill Pay management: Several messages are provided to enhance the bill pay experience. The services provided support variable bill pay and allowing small payee's to cheaply and easily accept bill payments among other things. Exemplary messages include Add Company As Payee Message, Add Customer As Payee Message, Variable Bill Pay Setup Message, Major Payee Setup Message, and the network entity Payee ID Lookup Message. Add Company As Payee Message: Received Data may include: Company ID and Payee Details. Actions may include: Add payee information to the database of the system of the present invention, Send payee information to each selected FI with the network entity Payee ID, Save Returned FI payee ID, and Return result. Add Customer As Payee Message: Received Data may include: Financial Institution ID, Customer ID, and Customer Payee Information. Actions may include: Add payee information to the database of the system of the present invention and Return the network entity Payee ID. Variable Bill Pay Setup Message: Received Data may include: Financial Institution ID, Network ID, Account ID, and Payee ID. Actions may include: Send notification to payee to setup receipt of variable bills, Variable bill setup saved in system database, and Results sent to financial institution. Major Payee Setup Message: Received Data may include: Financial Institution ID and FI Payee Information. Actions may include: FI payee information added to system database and Return the network entity Payee ID to FI. The network entity Payee ID Lookup Message: Received Data may include: Financial Institution ID and the network entity Payee ID. Actions may include: Lookup payee via the network entity Payee ID and Return the network entity Payee Details to FI.

Messaging Framework: The messaging framework is the core controller of messages passing through the system. Web service requests destined for the back office system will be passed into the messaging framework. The messaging framework preferably supports configurable message format, structure, and transmission. All messages that don't conform to the internal format will be converted to the internal system message format. Internal messages will be supported in only one format. The messaging framework preferably facilitates message flow and guarantee message processing.

Message Processing: Messages will be received that require processing. External Message Identify source of message; Identify message and translate message to internal format if required; and Transfer message to the appropriate destination. Most external messages will be delivered to the Transaction Processor (some may go direct to accounting and/or to the consolidation process). Internal Message for External Destination: Translate message to external format if required; and Deliver message to the appropriate destination. Internal Message for Internal Destination: Transfer message to the appropriate destination.

Transaction Processor: The transaction processor will be responsible for execution of most of the business processing. The transaction processor is preferably highly configurable via a table driven rules engine type environment. The transaction-processing configuration is preferably able to reload in real time. The transaction processor preferably supports distributed processing and guaranteed execution. Work will be handed to the transaction processor from settlement and messaging. Account Management: All account management messages that would require to be processed already have a web service available. Use the appropriate web service to accomplish the task.

Payment Processing: Exemplary back end messages that support the payment process may include the following messages: Transaction Authorization Message, Vendor Delivery Notification Message, Payment Reversal Message, and Financial Institution Purchase Order Message. Transaction Authorization Message: Message from financial institution authorizing a purchase by the customer at a vendor. Received Data may include: Company ID, Customer ID, Authorization ID, and Authorization Status. Actions may include: Update order in system, Send authorization message to vendor, and Return processing result. Vendor Delivery Notification Message: Message from Vendor signifying goods have been delivered. This would be used to instigate payment from financial institution for payment. Received Data may include: Company ID, Order ID, Authorization ID, and Ship status. Actions may include: Update order in system database, If insurance is necessary send insurance request to Insurer (this may be a daily file), Send delivery notification to FI, and Return results. Payment Reversal Message: Message from Vendor signifying order has been partially or fully reversed. Received Data may include: Company ID, Order ID, Authorization ID, and Reversal Amount. Actions may include: Send reversal request to FI, Save reversal result to system database, and Return reversal result. Financial Institution Purchase Order Message. Received Data may include: Company ID, Order ID, Authorization ID, and Amount. Actions may include: Update order in system database, Send PO to accounting, and Return result.

Bill Pay management: To support processing variable bills payees will have to send a billing file to the system of the present invention to process and send to relevant financial institutions. Payee Billing File: Received Data may include: Company ID, Customer ID, and Bill Amount. Actions may include: File sent to consolidation. Financial Institution Activity File: Financial institutions preferably send the system of the present invention details of activities involving the money management account including payments, paychecks processing, and transfers. Financial Institution Activity File: Received Data may include: Financial Institution ID, Customer ID, Account ID, Activity Type, Destination, and Activity Amount. Actions may include: File sent to consolidation.

Settlement: The settlement module is preferably designed to support the execution of dynamically scheduled processing and regularly scheduled processing. The two operations can be separated into two separate sub modules. Both types of processing preferably guarantee the execution of scheduled processes.

Dynamically Scheduled Processing: During the processing of messages through the system there will be times when processes will need to be scheduled to run at a later point in time. Other modules will be able to dynamically schedule the execution of processes. The execution of processing should be highly configurable such as via a table driven state machine. One intension of this module is to recognize errors in processing (for example a transaction that has not completed in a specified time), and attempt to correct them automatically. As the system is in use, more situations will occur that can be incorporated into this module in order to automate as much of the processing of the system as possible. This module is preferably designed for easy addition of further functionality. One option that may be made available as a last resort—to send a message to the CRM in order to involve a member of the network entity staff to address a situation that this module was unable to rectify. Dynamically Scheduled Processing Examples: Messaging retries, Wait for responses, Status checks, and Production of reports on system and system activity.

Regularly Scheduled Processing: To support system functionality there will be several activities that will need to be scheduled to occur on a regular basis. Examples would be various types of end of day processing and system log file processing. The scheduling and execution of processes should be highly configurable such as via a table driven state machine. Regularly Scheduled Processing Examples: Daily consolidation processing, Daily log file processing, and Database cleanup.

Consolidation: The consolidation module is preferably designed to support processing financial activity files to generate summary information for the accounting system. Initially the system will have to process activity files from financial institutions and billing files from payees. The consolidation module should be designed to easily allow the addition of processing new file sources and summary destinations. The module should support distributed processing and guaranteed execution. The consolidation module preferably supports communication with the accounting system.

Payee Billing File: Received Data may include: Company ID, Customer ID, and Bill Amount. Actions may include: database of the system of the present invention is updated with contents of file, File is processed separating billings by FI, and each FI variable bill file is sent. Financial Institution Activity File: Received Data may include: Financial Institution ID, Customer ID, Account ID, Activity Type, Destination, and Activity Amount. Actions may include: the database of the system of the present invention is updated with contents of file, Records are grouped by receiver of funds/receiving FI, and if invoicing of any company required invoice is sent to accounting.

CRM (Customer Relationship Management): The CRM package preferably provides standard CRM capabilities and provide a useable API for integration into the system of the present invention. The CRM system would be used to report the occurrence of exceptional cases to the customer service department.

Accounting: The accounting package preferably provides standard accounting capabilities and provide a useable API for integration into the system of the present invention. The accounting package is preferably capable of supporting the high volume transaction requirements of the system and provide open standards for transferring data with other companies and applications. The account package preferably integrates with funds transfer systems.

Where possible, high volume processing should not be performed in the accounting package, but in the consolidation and/or other components of the system, with summary information passed into the accounting package.

Funds Transfer System: The funds transfer system preferably supports the standard fund transfer capabilities needed to guarantee the delivery and receipt of funds. The funds transfer system preferably integrates with the accounting package.

Funds will be received, which are preferably identified. Subsequently, the system preferably generates instructions for distributing funds to desired destinations. There may be multiple financial institutions and accounts within which this process takes place, depending on conditions. It may even be possible that funds are received in one account in one financial institution, and subsequent funds are transferred out of an account on a separate financial institution. It may be necessary to transfer funds between the network entity accounts on different financial institutions to accommodate the transaction.

Each financial institution that performs this processing is considered a Master Payment Distributor.

Funds transferred may occur in one of many methods, determined by the financial institution and the circumstances. One method available would be an account transfer for those transfers that are within a financial institution.

Data Mirroring System: The data mirroring system preferably performs the task of duplicating information on a real time basis with other systems of the present invention in remote data centers, and possibly also duplicate databases at the same data center. It preferably integrates with minimal performance impact to critical components of the system. It preferably also guarantees duplication of data on a real time basis, with 'Store and Forward' capabilities as a backup. Information preferably is not lost if a data mirror process crashes for any reason, but would be able to be picked up where it left off when restarted.

Monitoring System: The system of the present invention preferably supports the monitoring all modules. Tracking of information, warnings, and errors across the system is essential. Monitoring of all hardware performance and software status and performance is preferably supported. Preferably there is a single location to retrieve information from the system of the present invention.

Generic Class Libraries: To facilitate code reuse and system consistency functionality that is used repeatedly should be place into well-defined class libraries. Examples of possible class libraries are presented below.

Data Access Libraries: Provides various libraries that encapsulate and abstract redundant data access code.

Application Logging Libraries: Provides libraries that facilitate and abstract the logging of relevant information. Exemplary libraries may include error, status, and warning events.

Message Processing Libraries: Provides libraries that facilitate in processing the various types and formats of messages that the system may receive.

Miscellaneous Libraries: Any other generic libraries that can aid in encapsulation and abstraction of the system to promote code reuse and improve system maintainability.

Credit Card Processor

Figure 36:
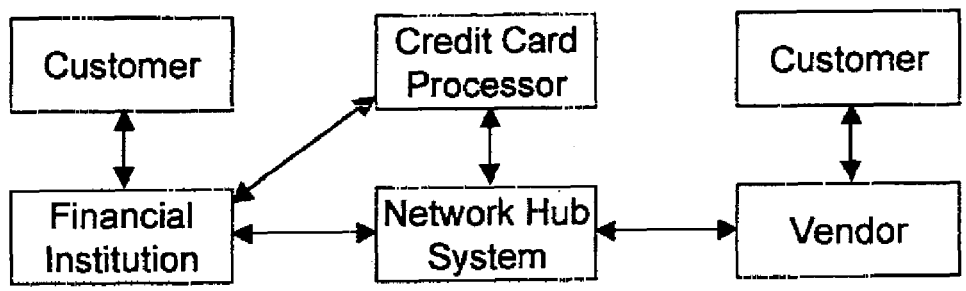
FIG. 36 is a schematic diagram of an exemplary embodiment of flow of the different entities of the present invention relating to a credit card processor being a component in the system.

FIG. 36 is a schematic diagram of an exemplary embodiment of flow of the different entities of the present invention relating to a credit card processor being a component in the system. This section provides high-level transaction/process flows of the Network as related to a credit card processor. The credit card processor is an intermediary between the network entity and financial institution card issuers for processing credit card transactions. Preferably, the financial institution is still required to be connected to the system of the present invention for informational purposes only regarding credit cards.

Figure 37:
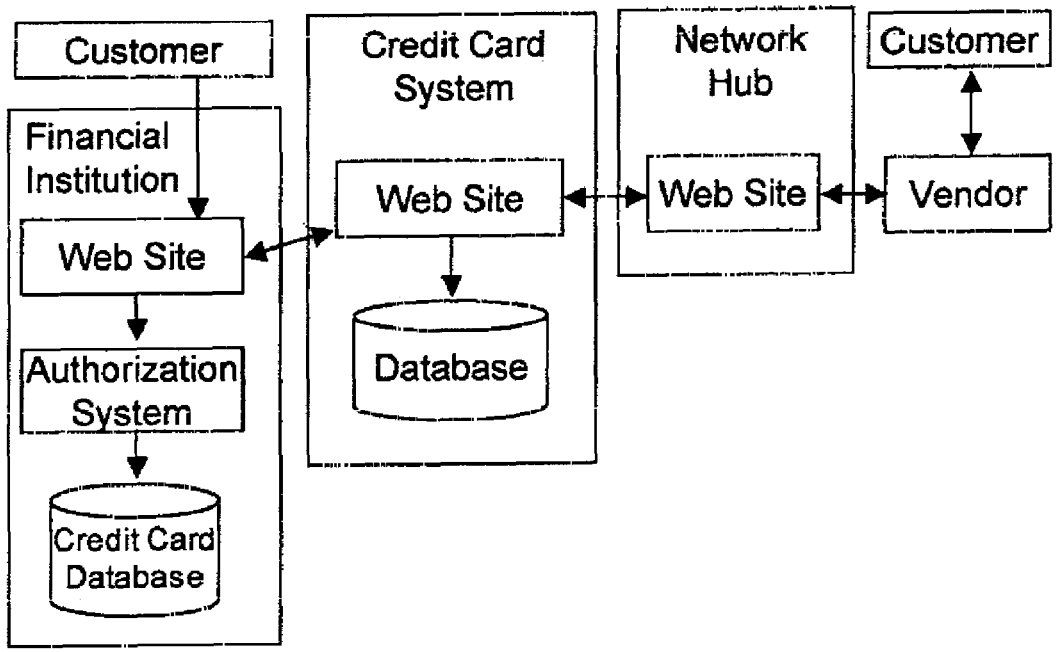
FIG. 37 is a schematic diagram of an exemplary embodiment of flow of the credit card processor of the present invention during the process of the customer shopping process using a credit card.

Shopping: FIG. 37 is a schematic diagram of an exemplary embodiment of flow of the credit card processor of the present invention during the process of the customer shopping process using a credit card. A single navigation link by the credit card processor to the Shopping Network provides access to an extensive network of approved vendors. For example, a customer may choose to shop for a DVD, then pay for it using his credit card. No direct interaction between the vendor and the credit card processor is required. Each organization connects only with the network entity, which acts as the broker for the transaction.

Once the customer has selected goods on the Vendor's web site, the customer is then passed to the network entity to choose the account from which he wishes to finance this purchase. The network entity identifies the customer, the issuing financial institution, and the means for the financial institution to identify the customer and account. If the customer chooses to finance the purchase using his credit card, the customer is passed to the appropriate credit card processor. The credit card processor records the transaction and passes the customer through to the identified financial institution.

The financial institution authorizes this transaction based on the transaction amount and the status of the account. In order to validate the transaction, the financial institution asks for password confirmation.

The customer is then passed back to the credit card processor with the authorization of this transaction, the credit card processor passes the customer back to the network entity, and the network entity completes the online transaction with the Vendor.

Figure 38:
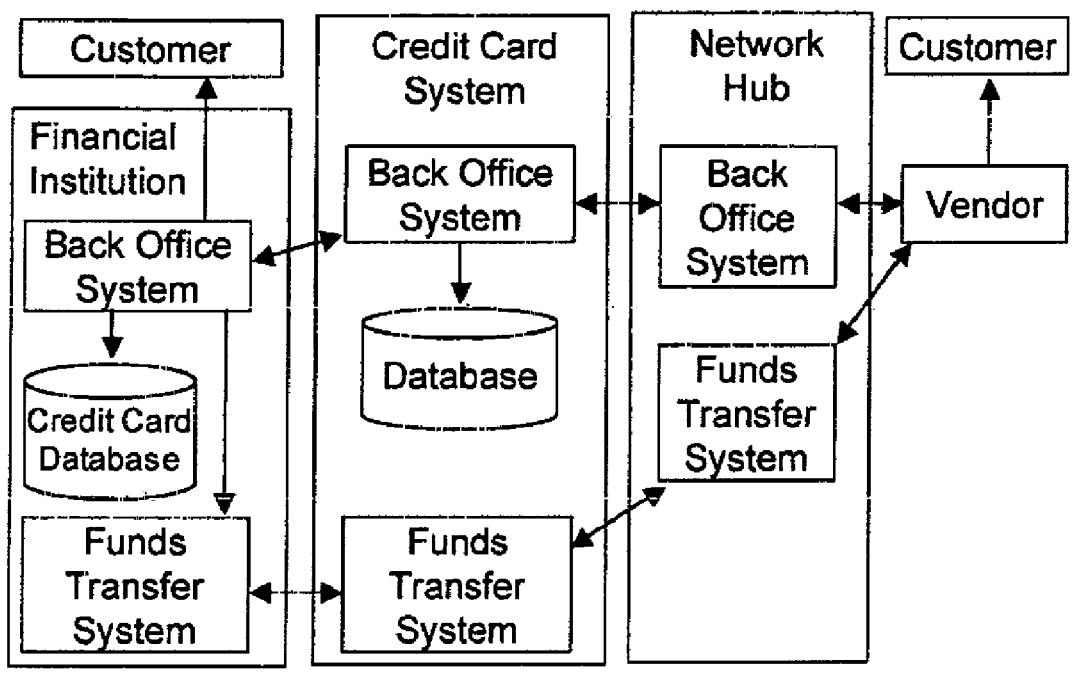
FIG. 38 is a schematic diagram of an exemplary embodiment of flow of the credit card processor of the present invention during the completion of a customer purchase where the customer used a credit card.

Purchase Process: FIG. 38 is a schematic diagram of an exemplary embodiment of flow of the credit card processor of the present invention during the completion of a customer purchase where the customer used a credit card. The customer has selected goods for purchase, and has been authorized. Now the network entity arranges payment for the purchase. When the vendor has shipped the purchased product to the customer, they notify the network entity of this. The network entity sends shipping notification to the credit card processor, and the credit card processor sends shipping notification to the financial institution. This triggers payment from the customer's account to the credit card processor. The credit card processor forwards payment to the network entity, and the network entity then forwards payments to the Vendor.

Full/Partial Reversal of Financial Transaction: There are occasions when not all goods are delivered to the customer, or the transaction is cancelled. This will result in a full or partial reversal of the transaction. The network entity will send a Web Service message to the credit card processor with information on the reversal, and the credit card processor send a similar message to the financial institution, and standard reversal processing will follow.

Miscellaneous

Adjustments Against Customer Account: On occasion, it is necessary to reverse out a completed transaction, either fully or partially. One example is that the vendor ships a partial order to the customer, and the customer cancels remainder of order. Another example is that the customer returns faulty goods to the Vendor. The network entity sends a Web Service message to the credit card processor describing the customer, account and order information, which the credit card processor preferably forwards to the financial institution. The financial institution performs an Adjustment against the customer's account, and returns confirmation that this has been done.

Message Error Processing: In order to accommodate inherent problems in any communications system, error processing including reversals will be performed where necessary. In extreme circumstances manual intervention will be required.

Financial Institution

Transaction Flows: This section provides high-level transaction/process flows of the Network as related to a financial institution.

Figure 39:
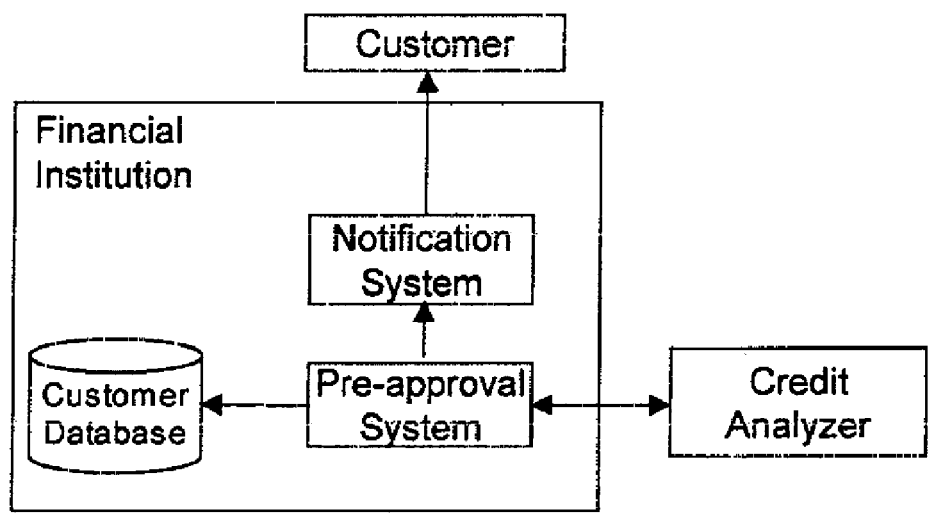
FIG. 39 is a schematic diagram of an exemplary embodiment of flow of the financial institution processor of the present invention during the process of the customer being approved for accounts.

Setting up a Customer in the System: FIG. 39 is a schematic diagram of an exemplary embodiment of flow of the financial institution processor of the present invention during the process of the customer being approved for accounts. All customers of the financial institution are allowed to use the system for the following exemplary features: Linking Accounts to Account Summary Web Page and Shopping through the Shopping Network, with payment for purchased goods coming from one of the customer's existing accounts within the financial institution. Neither of these features requires any additional setup for each Customer. The remainder of this section specifically relates to setting up the Product Payment and Loan accounts.

In order for a customer to qualify and use the Product Payment and Loan accounts, some setup steps are required. The financial institution determines whether the customer qualifies for these Product features: the financial institution pre-qualifies a customer for the Product Payment and Loan accounts; the financial institution notifies the customer that he has been pre-approved for the Product, providing information about all available features of the Product; and the customer then goes online and applies for the Product accounts.

Customer Pre-Qualification for money management account: the network entity requires that participating financial institutions pre-qualify existing customers with direct deposit of payroll (or other an equivalent system that deposits a sufficiently predictable dollar amounts into an on a regular basis, e.g., a regular distribution from a retirement account) for a money management account.

For customers who don't currently have direct deposit of their income, the financial institution may notify them of the availability of this service if they subsequently setup direct deposit.

Customer Pre-Qualification for product loan Account: The financial institution may determine whether or not to approve a product loan account, and an individualized credit limit for each customer; using its chosen practices for credit application and approval, e.g. credit history within the financial institution, or an external credit authorizing company. money management account approval is required for this account.

Figure 40:
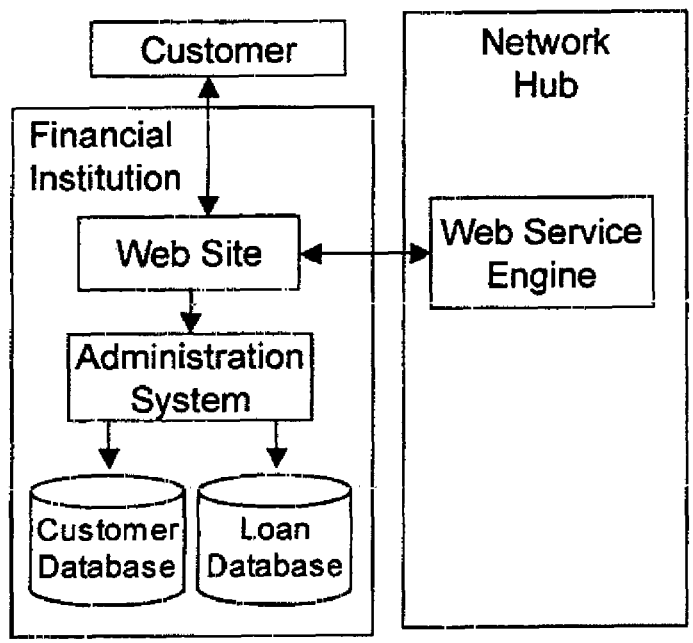
FIG. 40 is a schematic diagram of an exemplary embodiment of flow of the financial institution processor of the present invention during the process of the customer being configured into the network hub system.

Customer Applies For the Product: FIG. 40 is a schematic diagram of an exemplary embodiment of flow of the financial institution processor of the present invention during the process of the customer being configured into the network hub system. Once the financial institution has set up their system to offer its customers' access into the Network, and the customer has been notified of his pre-approval for the Product Payment and Loan accounts, the customer preferably applies for these accounts on the financial institution's web site.

The financial institution displays current information it has about the customer for verification (some additional information may be required from the customer, e.g. information about his direct deposits, including frequency, date of next occurrence etc.). The customer then applies for the selected accounts.

The financial institution creates a money management account. The financial institution sets up an automatic redirect of an existing direct deposit from an existing account into the money management account. Alternately, the financial institution provides information to the customer to enable him to re-direct his paycheck into his money management account. If the customer has not been pre-approved for this account, the financial institution will provide information to the customer in order to qualify. The financial institution also retains the appropriate instructions to move un-retained funds from the money management account to an account of the customer's choice.

The financial institution activates the customer's product loan Account, making it immediately available for use in online shopping. If the customer has not been pre-approved for this account, the financial institution will provide information to the customer in order to apply for this account.

The financial institution sends customer and account information to the network entity, and the network entity responds with a network entity customer ID. The financial institution should retain this ID and use it in all further communication with the network entity relating to this customer.

Figure 41:
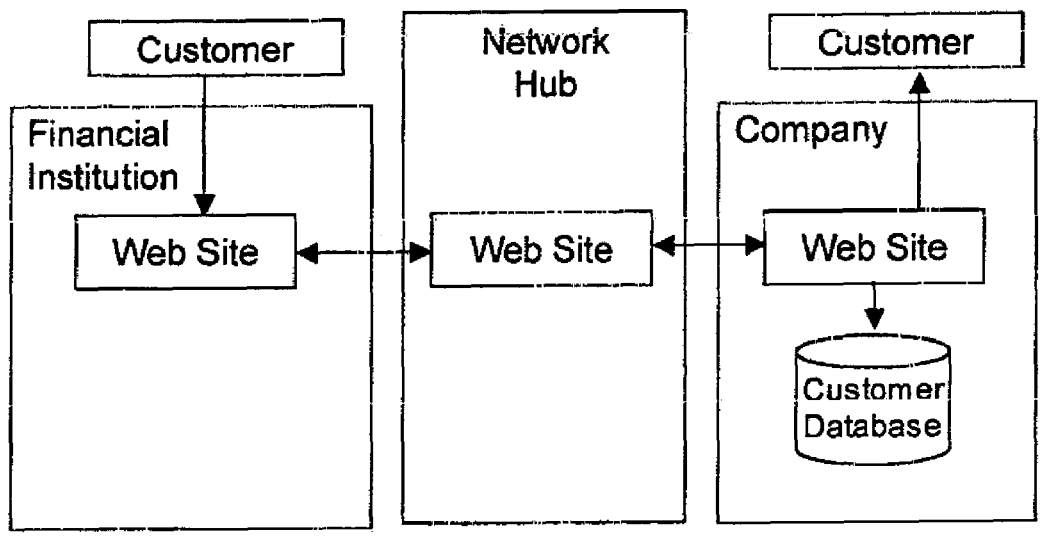
FIG. 41 is a schematic diagram of an exemplary embodiment of flow of the financial institution processor of the present invention during the process of the customer linking accounts.

Customer Links Other Accounts: FIG. 41 is a schematic diagram of an exemplary embodiment of flow of the financial institution processor of the present invention during the process of the customer linking accounts. It should be noted that this is an optional function to the financial institution A customer's Account Summary page with his financial institution becomes the central place from which he manages all of his financial and non-financial information. This includes the ability to link other accounts to this page. Examples of these accounts include: financial accounts at his home financial institution or other financial institutions; airline mileage accounts; shopping accounts (Amazon, eBay etc.); e-mail accounts etc. The network entity manages the list of accounts each customer may access. The financial institution sends and receives information about linked accounts via Web Service messages to and from the network entity.

Customer Links Account to Account Summary: The financial institution provides a button for a customer to link accounts to his Account Summary. When the customer selects this option, the financial institution passes the customer to a network entity web page, where he is able to choose which account(s) to add/remove.

The network entity returns the customer to the financial institution's Account Summary page when this function is complete. The Web Service call that the financial institution makes to build the new Account Summary page will automatically include information about newly linked accounts.

Other Financial Institution's Customer Adds New Account: When a customer of another financial institution wants to add an account domiciled at this financial institution to his Account Summary, the network entity will bring the customer to the financial institution's login page. Once the customer has successfully logged in, the financial institution displays the list of accounts the customer has, and allows him to select which ones to add. A network entity customer ID will be provided with the customer—the financial institution should retain this ID and use it in all further communication with the network entity relating to this customer. Once the customer has chosen the account(s) to add, the financial institution returns the customer to the network entity.

It should be noted that when a customer wants to remove a linked account from his Account Summary, this does not require any interaction with the financial institution that owns that account.

Figure 42:
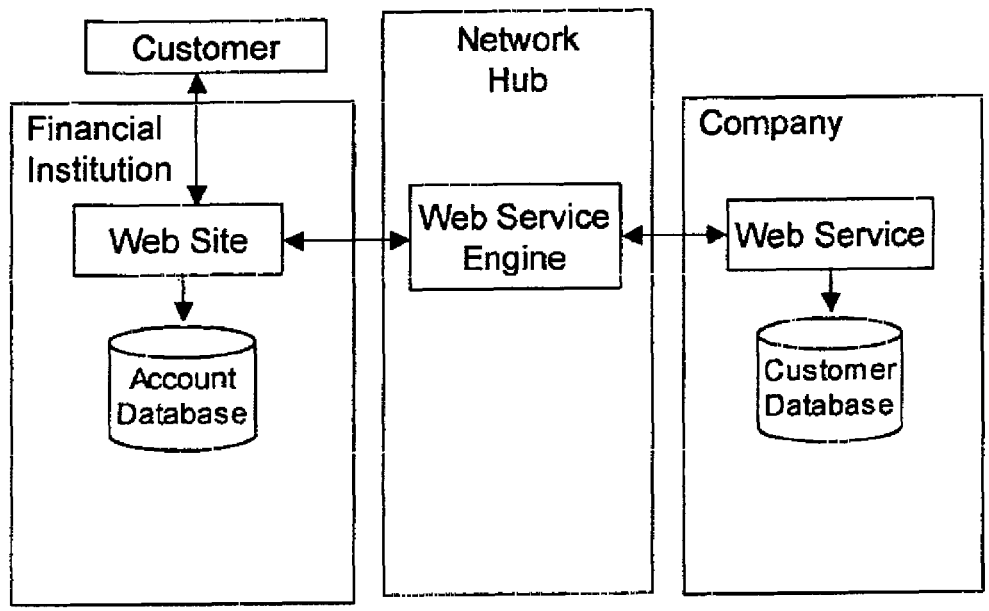
FIG. 42 is a schematic diagram of an exemplary embodiment of flow of the financial institution processor of the present invention during the process of displaying an account summary page.

Customer Views Account Summary: FIG. 42 is a schematic diagram of an exemplary embodiment of flow of the financial institution processor of the present invention during the process of displaying an account summary page. The Account Summary page is displayed immediately after the customer successfully logs in to the financial institution's web site, and contains a summary of all financial accounts held by this financial institution, as well as a summary of each account the customer has linked to this page. Required functions the customer may perform here are: request detailed information about any account in his summary; link other accounts to the summary; enter the financial institution's bill payment system to manage payments from his accounts; and enter the Shopping Network.

Collected Account Information: This is an optional function to the financial institution. To build the Account Summary page, the financial institution includes a web service request to the network entity for information about linked accounts. This response message to this request contains the account type, account name, balance(s) and miscellaneous information for all linked accounts domiciled at other institutions. The financial institution formats and displays this information in the summary. The financial institution preferably supports the reverse situation, where another financial institution's customer logs in to that financial institution's web site. In this instance, the network entity will send a Web Service message to the financial institution asking for appropriate account information for accounts at this financial institution that the customer has linked to his Account Summary elsewhere. The financial institution returns a message to the network entity with the requested information for display on the other financial institution's Account Summary page.

Detailed Account Information: Certain account types may have extensive account information attached, supplied to the network entity by the company where the account is situated. The financial institution receiving this information may elect to display this information on the account summary page, or on a separate web page. An example of this is a Consolidated Investment Portfolio, containing a complete breakdown of the Customers Investments across multiple brokerage accounts. This is useful for the customer as most individuals have multiple brokerage accounts—full service brokerage account, online brokerage account, 401k's, and IRA's. The financial institution may then display this information in any manner their customer wishes to see it, for example: stocks/bonds/cash; industry categories; geographic regions.

Customer Connects to Linked Account: On the Account Summary page, the customer may request detailed information about any account displayed. If the customer selects a linked account, the financial institution passes the customer to the network entity. On return from the network entity, the financial institution re-displays the Account Summary page.

Other Financial Institution's Customer Connects to Linked Account: When a customer of another financial institution asks for detailed information on a linked account that belongs to this financial institution, the network entity will send the customer to this financial institution. At its discretion, the financial institution may require the customer to log in. The financial institution will then take the customer to the detailed information page for the requested account.

Figure 43:
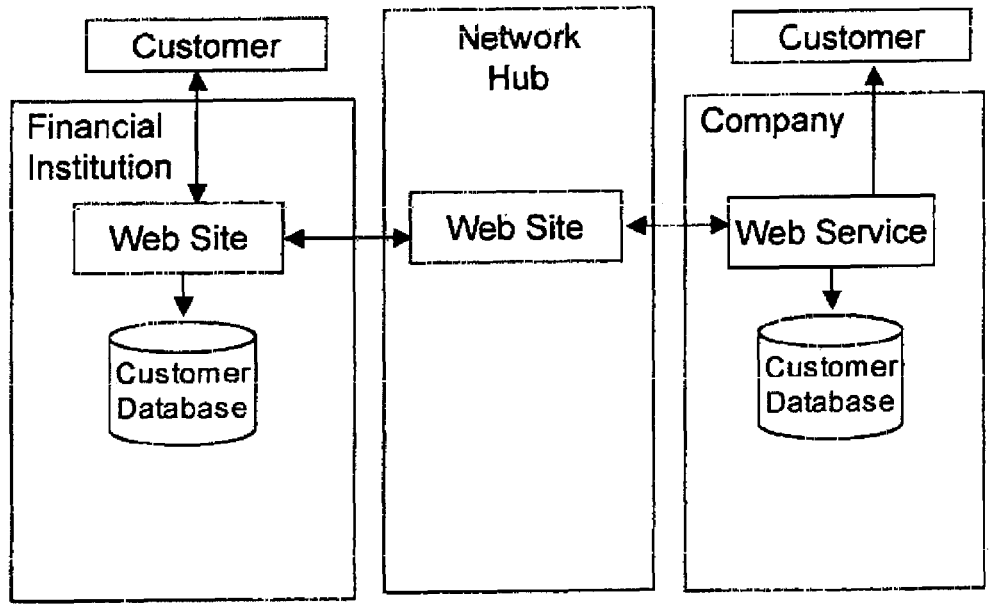
FIG. 43 is a schematic diagram of an exemplary embodiment of flow of the financial institution processor of the present invention during the process of the customer updating his profile.

Customer Updates Profile: FIG. 43 is a schematic diagram of an exemplary embodiment of flow of the financial institution processor of the present invention during the process of the customer updating his profile. It should be noted that this is an optional function to the financial institution. A Customer preferably has the ability to updates his profile at his financial institution, with that update automatically changed on other Linked Accounts.

If the customer uses the financial institution web site to change his address or other personal information shared on the Network, the financial institution passes the customer to a network entity Web Page. On this page the customer will select which accounts he wants his profile to be updated. Once this is complete, the customer is returned to the financial institution web site.

The financial institution preferably supports the reverse situation, where the network entity sends a Web Service message to the financial institution when the customer changes his profile at a different financial institution's web site. The financial institution will update this information for the customer, and respond to the network entity with confirmation that this has been done.

Figure 44:
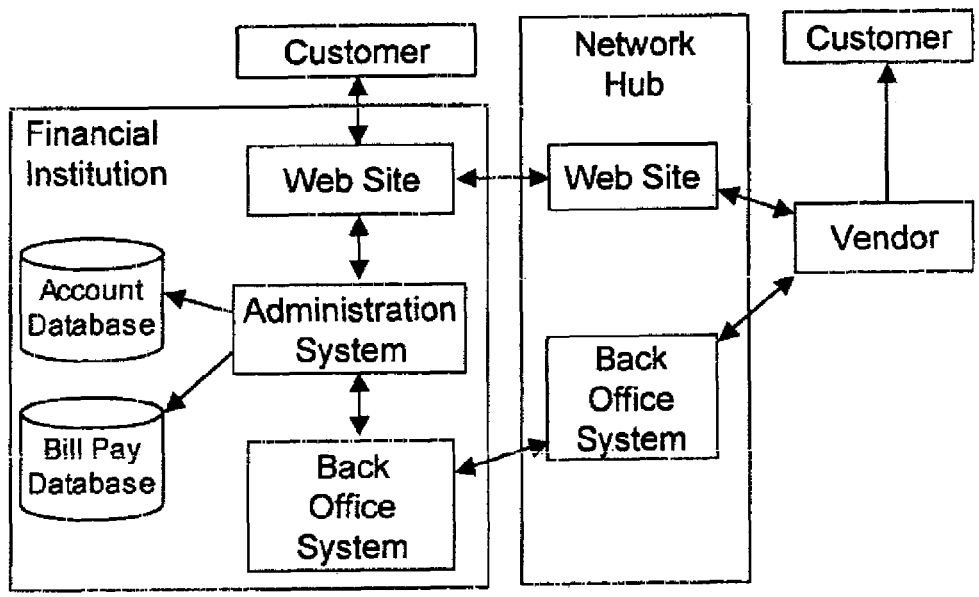
FIG. 44 is a schematic diagram of an exemplary embodiment of flow of the financial institution processor of the present invention during the customer shopping process.

Shopping: FIG. 44 is a schematic diagram of an exemplary embodiment of flow of the financial institution processor of the present invention during the customer shopping process. The financial institution provides a single navigation link to the Shopping Network, which in turn links to an extensive network of approved vendors. For example, a customer may choose to shop for a new computer, then pay for it using his product loan account. No direct interaction between the vendor and the financial institution is required. Each organization connects only with the network entity, which acts as the broker for the transaction.

When a member selects the "Shopping" navigation provided on the financial institution's web site, the financial institution passes the customer to the network entity. The financial institution preferably provides customer and account information with the customer so that he may be added to the Network if he is not already a member.

The customer selects the Vendor he wishes, and selects goods on the Vendor's web site. The customer is then returned to the network entity to choose the account from which he wishes to finance this purchase. In some embodiments it may be necessary for the system of the present invention to obtain limited information about the customer's available accounts, wherein the network entity will send a Web Service message to the financial institution asking for appropriate account information for accounts at this financial institution. The financial institution returns a message to the network entity with the requested information.

The customer is then passed to the financial institution of the selected account. The financial institution authorizes this transaction based on the transaction amount and the status of the account. If the customer chooses to finance the purchase using his product loan account, the financial institution makes a credit decision about whether the transaction is approved, declined, or approved subject to certain conditions (preliminary approval), and makes appropriate disclosures to the customer, summarizes the transaction. In order to validate the transaction, the financial institution asks for password confirmation. If the purchase is using his product loan account and an Automatic Payment is required in the bill pay system, the financial institution adds the appropriate Automatic Payment to the bill pay database.

The customer is then passed back to the network entity with the authorization of this transaction, and the network entity completes the online transaction with the Vendor.

If the transaction was authorized by the financial institution with a preliminary approval, at a later time the financial institution approves or declines the transaction. The financial institution updates the appropriate account and Bill Pay Database as necessary. The financial institution sends authorization notification to the network entity, and this is forwarded to the Vendor.

Linking Financial Institution Account to the network entity's Payment Options: When a Product Customer wishes to make a purchase using an account at a financial institution that the customer has not linked to the network entity, the network entity will bring the customer to the financial institution's login page. Once the customer has successfully logged in, the financial institution displays the list of accounts the customer has, and allows him to select which ones to add. A network entity customer ID will be provided with the customer—the financial institution should retain this ID and use it in all further communication with the network entity relating to this customer. Once the customer has chosen the account(s) to add, the financial institution returns the customer to the network entity.

Customer Connects Direct to Vendor: When a customer connects direct to a vendor, there is no Network Entity information about the customer. When the customer is ready to make a purchase, one of the options available to him is to use the Product payment system. If selected, the vendor passes the customer to the network entity. The network entity may at this point look for a cookie on the customer's PC, which could contain the customer's Network Entity information. If this is not available, it is unknown whether the customer is a member of the Network. The network entity displays some information about the product (with a link to more information), and allows the customer to select his financial institution from a list of licensed financial institutions for the customer to either select his financial institution or to select a financial institution at which to apply for the Product. The network entity will pass the customer to the selected financial institution's login page with a generated customer ID. If an existing customer and already signed up for the Product. When the customer logs in, the financial institution returns the customer to the network entity with the customer's original the network entity customer ID. If an existing customer and not already signed up for the Product. When the customer logs in, the financial institution displays the list of accounts the customer has, and allows him to select which ones to add. A network entity customer ID will be provided with the customer—the financial institution should retain this ID and use it in all further communication with the network entity relating to this customer. Once the customer has chosen the account(s) to add, the financial institution returns the customer to the network entity. If a new customer for the financial institution, the financial institution should take the customer through the process of informing the customer about the Product and allowing him to sign up for the Product. The customer should be allowed to return to the network entity regardless of the outcome.

Figure 45:
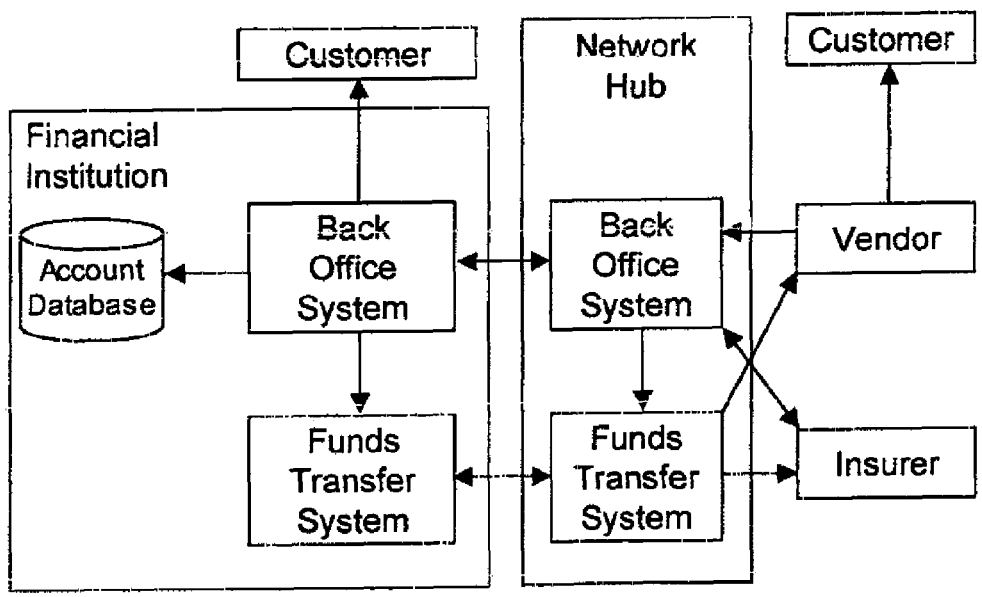
FIG. 45 is a schematic diagram of an exemplary embodiment of flow of the financial institution processor of the present invention during the process of the completion of a customer purchase.

Purchase Process: FIG. 45 is a schematic diagram of an exemplary embodiment of flow of the financial institution processor of the present invention during the process of the completion of a customer purchase. The customer has selected goods for purchase, and has been authorized. Now the network entity arranges payment for the purchase. When the vendor has shipped the purchased product to the customer, they notify the network entity of this. If insurance is involved on a product loan for this purchase, the network entity initiates the insurance with the insurer. The network entity sends shipping notification to the financial institution, and this triggers payment from the customer's account to the network entity. The network entity then forwards payments to the Vendor and Insurer.

Full/Partial Reversal of Financial Transaction: There are occasions when not all goods are delivered to the customer, or the transaction is cancelled. This will result in a full or partial reversal of the transaction. The network entity will send a Web Service message to the financial institution with information on the reversal, and standard reversal processing will follow.

Figure 46:
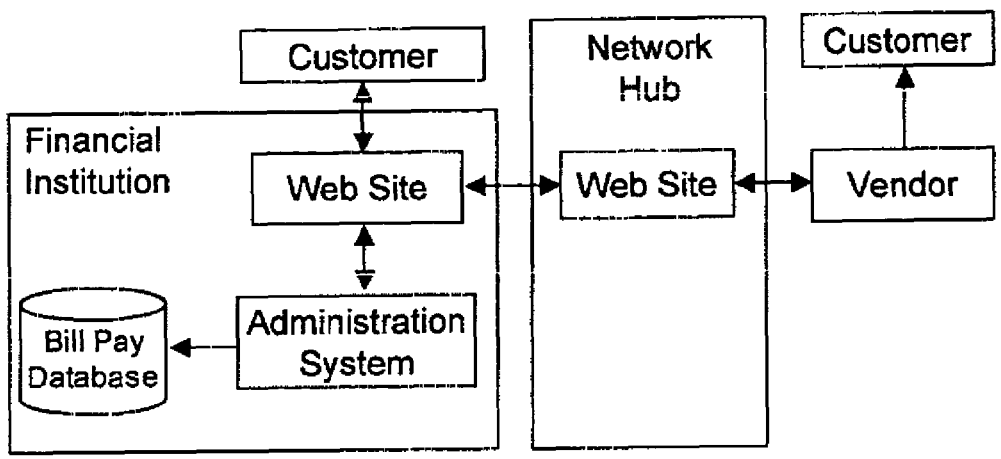
FIG. 46 is a schematic diagram of an exemplary embodiment of flow of the financial institution processor of the present invention during the process of the customer making a purchase of a service.

Customer Purchase of Services: FIG. 46 is a schematic diagram of an exemplary embodiment of flow of the financial institution processor of the present invention during the process of the customer making a purchase of a service. A different type of vendor in the Shopping Network is a Service Provider. A Service is a purchase that requires repeating monthly payments, e.g. Internet Broadband. This should result in an automatic payment in the customers Bill Pay system. Once a customer has selected services from a vendor on the Shopping Network, the vendor returns the customer to the network entity. The network entity then passes the customer to the financial institution maintaining his money management account. The financial institution summarizes the transaction and asks for password approval. The financial institution then adds the appropriate repeating payment to the Bill Pay system. The customer is then passed back to the network entity with the authorization of this transaction, and the network entity completes the online transaction with the Vendor. It should be noted that some purchases are for both goods and services, and therefore contain appropriate steps to facilitate both aspects of the purchase.

Figure 47:
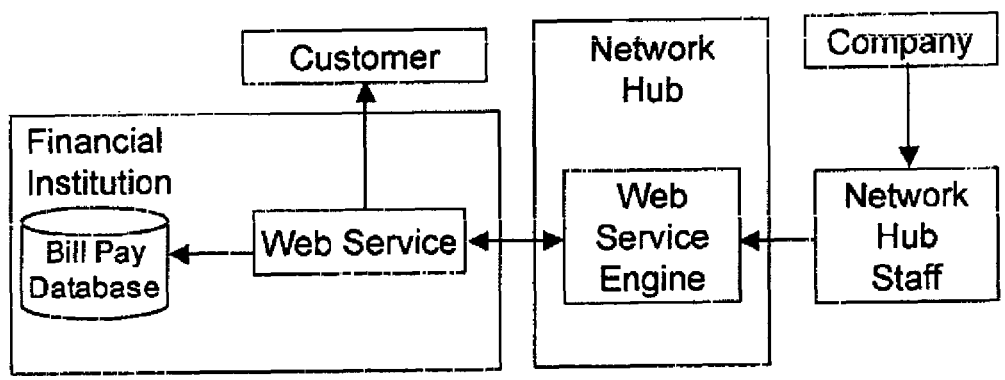
FIG. 47 is a schematic diagram of an exemplary embodiment of flow of the financial institution processor of the present invention during the bill pay network set up process of for a company.

Company Set Up in Bill Pay Network: FIG. 47 is a schematic diagram of an exemplary embodiment of flow of the financial institution processor of the present invention during the bill pay network set up process of for a company. A Company may elect to become a Payee in the Bill Pay System of a selection of financial institutions connected to the Network. Digital World Access provides a network to accomplish this. The Company preferably makes a formal request to the network entity to be set up as a network payee in the Network. Once the network entity has gone through a verification process with the Company making the request, the network entity sends a message to each selected financial institution requesting that the company be added into the financial institution's Bill Pay System. If the Company is not already in the financial institution Bill Pay System it is added to the Bill Pay Database. The financial institution then returns notification of the addition and the Bill Pay Database ID of the Company to the network entity.

Figure 48:
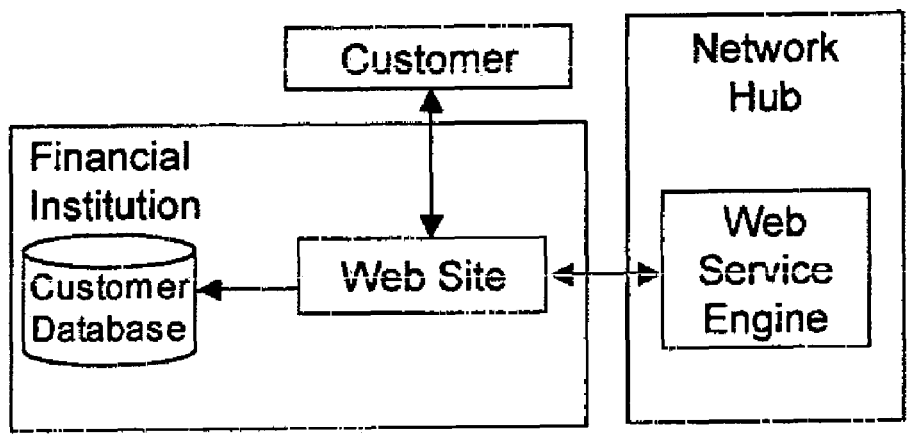
FIG. 48 is a schematic diagram of an exemplary embodiment of flow of the financial institution processor of the present invention during the process of the customer registering as a payee.

Customer Sets Up as Payee: FIG. 48 is a schematic diagram of an exemplary embodiment of flow of the financial institution processor of the present invention during the process of the customer registering as a payee. The Customer may elect to become a Payee in the Network. This allows the Customer to receive funds from any other Customer (via Automatic Payment or individual payment), by providing their Network Payee ID to the Customer. The customer elects to become a Network Payee on the financial institution web site. The financial institution sends a Web Service message to the network entity with information on this customer and the specific account selected. The response contains the Network Payee ID for the specific account, and the financial institution should retain this identifier. This feature of the Product is most likely to be used by customers that are businesses.

Figure 49:
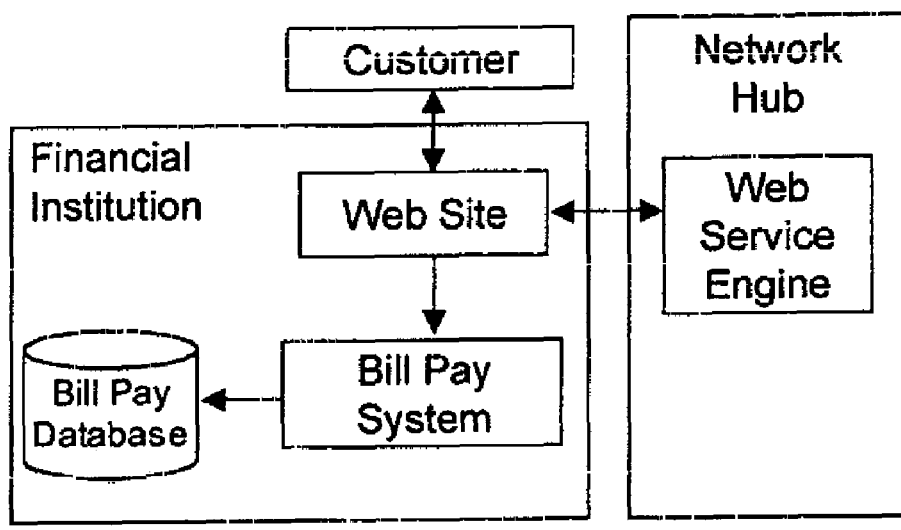
FIG. 49 is a schematic diagram of an exemplary embodiment of flow of the financial institution processor of the present invention during the process of a payment/money management account being used to disburse funds.

Using the money management account to Disburse Funds: FIG. 49 is a schematic diagram of an exemplary embodiment of flow of the financial institution processor of the present invention during the process of a money management account being used to disburse funds. A Product Customer may make payments from his money management account using the financial institution's existing online bill payment system. A payment is considered to be any expense that the customer can predict, e.g., a fixed amount to transfer to his savings account, or any fixed or variable amount provided in an online bill from an authorized payee, e.g., the customer's phone bill. By selecting the money management account as the source for the payment, the customer is choosing to use the features of the money management account when paying this bill, i.e., he is expecting the financial institution to retain funds from his direct deposit income in the money management account for later disbursement to the payee.

Adding a Payment: To add a payment, the customer logs in to the financial institution's online bill payment system, and creates a new entry in the same way as today. If the payment is for a variable bill to a payee registered in the variable bill-processing network, the financial institution preferably notifies the network entity with a web service message. When a customer wants to make payments to an individual/entity that is not currently a payee in the financial institution's bill payment system but that has a Network Payee ID, the customer enters this ID into the financial institution's bill payment system in place of selecting a Payee from the current Payee list. The financial institution sends a web service request to the network entity for the payee, and the network entity returns information about the payee to the financial institution for the financial institution to add to its bill payment system for this customer. The customer completes the automatic payment by supplying the amount and dates. If there is insufficient time to retain funds in the money management account from the customer's direct deposits prior to the required payment date, the customer preferably approves transfer of sufficient funds from another account to this account for the first payment.

Modifying/Deleting a Payment: A customer may choose to modify or delete any Product payment with the exception of a product loan payment. The customer does this through the financial institution's online bill payment system. If deleting a payment for a variable bill to a payee registered in the variable bill-processing network, the financial institution preferably notifies the network entity with a web service message. In the event that the customer reduces the payment amount, any excess funds that may be in the money management account will be transferred to the customer's discretionary account.

Synchronizing Bill Pay System with the network entity: It is necessary for both the financial institution and the network entity to be able to recognize payees being paid from the money management account. Rather than sending all information about each payee for each transaction in the Activity File (see below), it is preferable that an identifier be used for each payee that both the financial institution and the network entity recognizes. This is only necessary for larger payees—those that are available to customers searching by name of payee. When such a payee is first being paid from the money management account, or prior to this, the financial institution sends notification of the addition and the Bill Pay Database ID of the Company to the network entity. The network entity will respond with a Network Payee ID.

Figure 50:
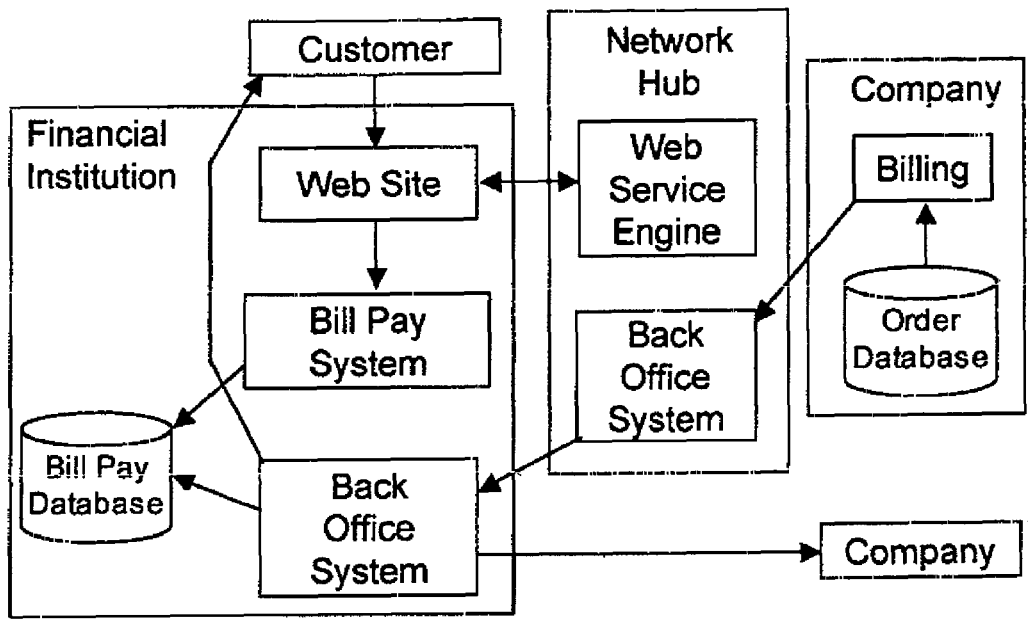
FIG. 50 is a schematic diagram of an exemplary embodiment of flow of the financial institution processor of the present invention during the process of automatic variable bill processing.

Variable Bill Processing: FIG. 50 is a schematic diagram of an exemplary embodiment of flow of the financial institution processor of the present invention during the process of automatic variable bill processing. It should be noted that this is an optional function to the financial institution. Some bills may have a variable amount each month (e.g. Utility bills, Credit Cards). The Network provides a method for setting up, processing, and authorizing bills like this.

Variable Bill Set Up: The customer logs in to the financial institution's online bill payment system and requests to set up a "Variable Bill". The Customer then selects the Payee Company, and provides the customer account number for that Payee. The financial institution records this as a variable bill, and passes this information to the network entity.

Variable Bill Processing: The Payee Company sends a file to the network entity on a regular basis that contains a summary of customers and the variable bill amounts. The network entity then processes the file received from the Payee Company and sends to each financial institution a summary of all variable bills for Customers of that financial institution. The financial institution's Back Office system updates the Bill Pay Database to record the exact amount of each bill for each Customer and notifies the Customer of receipt of a Variable Bill. The financial institution can provide any of several methods for the customer to authorize a variable bill; the choice (if any) determined by the customer when the variable is setup. Examples of payment methods include: the customer may be required to authorize each variable bill (described below); the financial institution will automatically pay the bill amount; the financial institution will automatically pay the minimum due amount (e.g. for credit cards); the financial institution will automatically pay a fixed amount or the due amount whichever is lower; and the financial institution will pay the due amount up to a determined level (if above this level, the customer is required to authorize the payment).

Variable Bill Authorization: Once the Customer receives notification from the financial institution regarding a Variable Bill that requires authorization, he logs into the financial institution web site (possibly through a link in the notification email), where the financial institution displays the Variable Bill to be authorized. The Customer authorizes payment of the Variable Bill by providing his financial institution password, and the financial institution sets up a one-time bill payment in the Bill Pay System from an account of the customer's choice. If the account of choice is the money management account, and there is insufficient time available for the funds to be retained prior to the bill payment date, the financial institution either requests a different account or the customer authorizes funds to be transferred from other accounts into the money management account.

Figure 51:
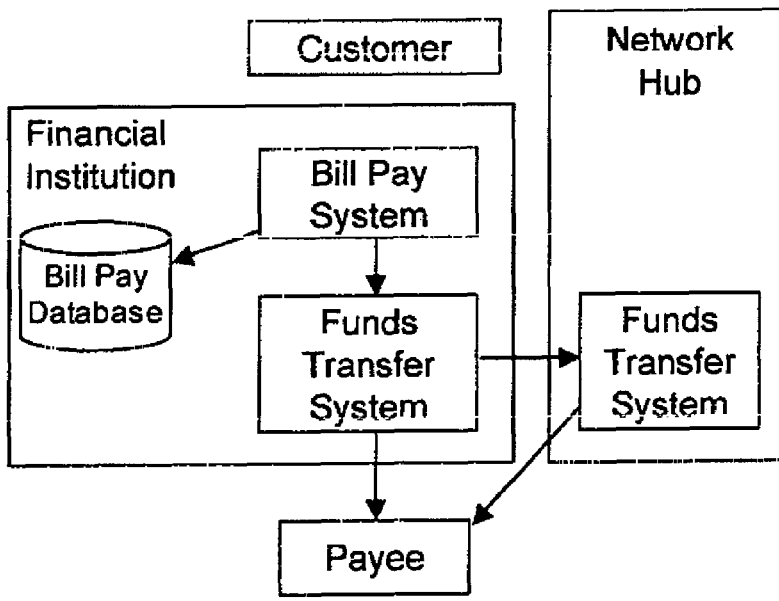
FIG. 51 is a schematic diagram of an exemplary embodiment of flow of the financial institution processor of the present invention during the process of the financial institution processing an automatic payment.

Financial Institution Processing of Automatic Payment: FIG. 51 is a schematic diagram of an exemplary embodiment of flow of the financial institution processor of the present invention during the process of the financial institution processing an automatic payment. Each day, the financial institution bill pay system processes all automatic payments scheduled for that day. The financial institution bill pay system follows existing procedures when performing its daily automatic payments, and instructions regarding transferring funds to Payee's also follow existing procedures. The account from which a payment is made may be a money management account. The Payee of an automatic payment may be Digital World Access.

Figure 52:
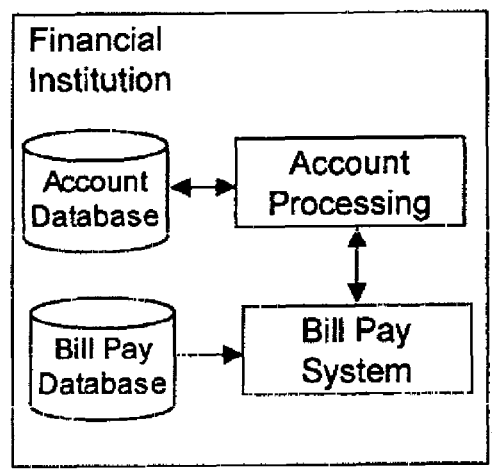
FIG. 52 is a schematic diagram of an exemplary embodiment of flow of the financial institution processor of the present invention during the process of the financial institution payroll procedures.

Financial Institution—Payroll Procedures: FIG. 52 is a schematic diagram of an exemplary embodiment of flow of the financial institution processor of the present invention during the process of the financial institution payroll procedures. On a customer's payday, the net amount of his paycheck is deposited into his money management account. Alternately, funds may be deposited into this account from other sources. The financial institution recognizes funds have been deposited into the money management account. The financial institution then determines the amount of funds to retain to cover customer-directed payments (from its Bill Pay system), and transfers all remaining funds to the customer's discretionary account.

Figure 53:
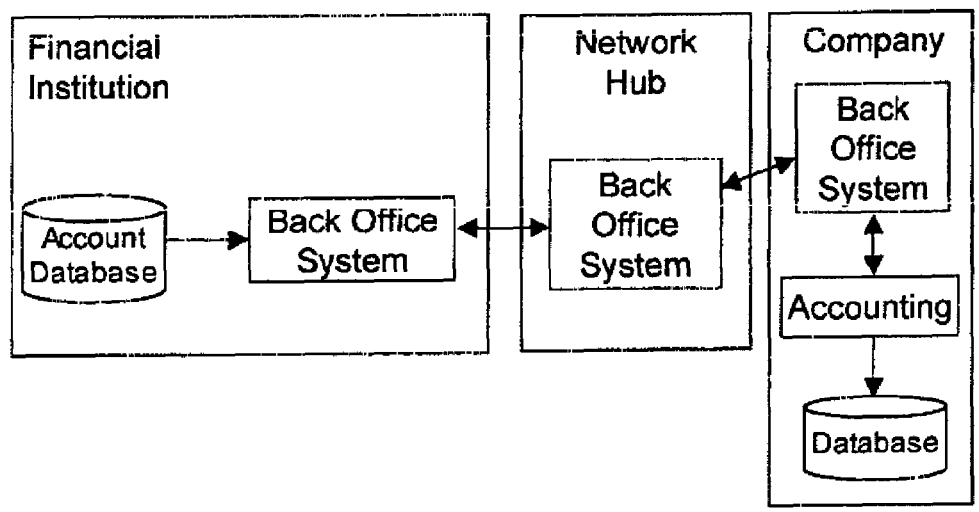
FIG. 53 is a schematic diagram of an exemplary embodiment of flow of the financial institution processor of the present invention during the processing of a financial institution activity file.

Financial Institution—Activity File: FIG. 53 is a schematic diagram of an exemplary embodiment of flow of the financial institution processor of the present invention during the processing of a financial institution activity file. The financial institution preferably sends to the network entity on a daily basis everything that has happened relating to money management accounts. This includes deposited funds and Automatic Payments. The financial institution collects all activity on the money management account throughout the day in an Activity File, and at a specified time sends this file to the network entity. The network entity may invoice certain companies as a result of this Activity File. If this is so, then the network entity sends an Invoice to the appropriate companies.

Miscellaneous

Insurance Claim: Insurance is available on loans from the product loan account. If the customer has chosen to insure his loan, and suffers a covered event (e.g. involuntary unemployment), his product loan is either paid off completely (see below) or converts to interest-only payments for the duration of the coverage (resulting in an extension of the loan). Coverage expires either when the customer no longer qualifies for coverage or when the limit of coverage has expired. After this term, responsibility for the full loan payment reverts to the customer. When a customer submits a claim on his insurance covering a Product Loan, and the claim is approved, the network entity sends a Web Service message to the financial institution with information about the insurance. The financial institution changes the product loan to Interest Only payments until further notice, and temporarily suspends the appropriate Bill Pay entry for this customer (interest payments made from the insurance company). Once the insurance is no longer covering the loan, the network entity sends a Web Service message to the financial institution to revert the loan to a conventional payoff method, i.e., fully amortized principal & interest payments. The financial institution also reinstates the bill pay entry to its original payment schedule, but with extended duration as required. It should be noted that it is the responsibility of the customer to request insurance activation. The financial institution will provide contact information for the Insurer to the customer on request. Insurance Claim—loan paid off: Certain insured events may result in the full payment of the loan. At this point the loan is paid off directly from the Insurance Company, and the financial institution terminates the appropriate bill payment in the bill payment system.

Download Account Activity to Personal Software: If the financial institution currently allows its customers to download account information into personal software, e.g., Quicken, Money etc., the financial institution preferably extends this functionality to the new Product accounts and functions. The network entity is not involved in this process.

Insufficient Funds in money management account: There may be times when the balance of funds in the money management account is insufficient to cover all scheduled payments. There will be advanced warning of this situation, as it would be recognized either when funds are deposited into the account, or a bill payment is added/modified. Thus there is time to remedy the situation. If the customer is not currently online, the financial institution sends an email to the customer requesting that the customer logon in order to remedy the situation. The customer is given a choice of how to remedy the situation including: the customer transfers sufficient funds from another account into the money management account; the customer identifies a backup account for to be used in instances where insufficient funds are available in the money management account; the customer redirects payments to alternate accounts; and the customer does nothing which would will result in payments being made until insufficient funds are available for a payment, at which point the payment will not be made and the financial institution notifies the customer of this.

Automatic Change to Amount of Bill in Bill Pay System: On occasions, it is necessary to change the amount of a previously established payment. One example is that the vendor ships partial order to customer, and customer cancels remainder of order. Another example is an insurance claim. The network entity sends a Web Service message to the financial institution describing the customer, account, and payment information in all cases. This will never result in an increase of a bill payment amount/duration above its original password approved amount/duration. The financial institution adjusts the bill payment appropriately and returns confirmation that this has been done.

Adjustments Against Customer Account: On occasion, it is necessary to reverse out a completed transaction, either fully or partially. One example includes the Vendor ships partial order to customer, and customer cancels remainder of order. Another example is that a customer returns faulty goods to Vendor. The network entity sends a Web Service message to the financial institution describing the customer, account and order information. The financial institution performs an Adjustment against the customer's account, and returns confirmation that this has been done.

Message Error Processing: In order to accommodate inherent problems in any communications system, error processing including reversals will be performed where necessary. In extreme circumstances manual intervention will be required.

Request for Information: There are several instances when the system of the present invention will request information from a financial institution about a customer. Three exemplary embodiments include account summary, account details, and customer information for insurer. Account summary is used during the shopping process, as well as for account aggregation. The financial institution should return a list of accounts with balances. If a product loan account, the interest rate and other loan features should also be returned. Account details are optional for the financial institution to participate in, and is only valid on certain accounts. Details of the specified account should be returned. Customer information for insurer is used for insurance purposes only, where the customer has requested insurance on a purchase financed through the product loan account, and the insurer does not have sufficient information about the customer (e.g. employment information). The financial institution should return required information.

Vendor

This section provides high-level transaction/process flows of the Network as related to a vendor.

Figure 54:
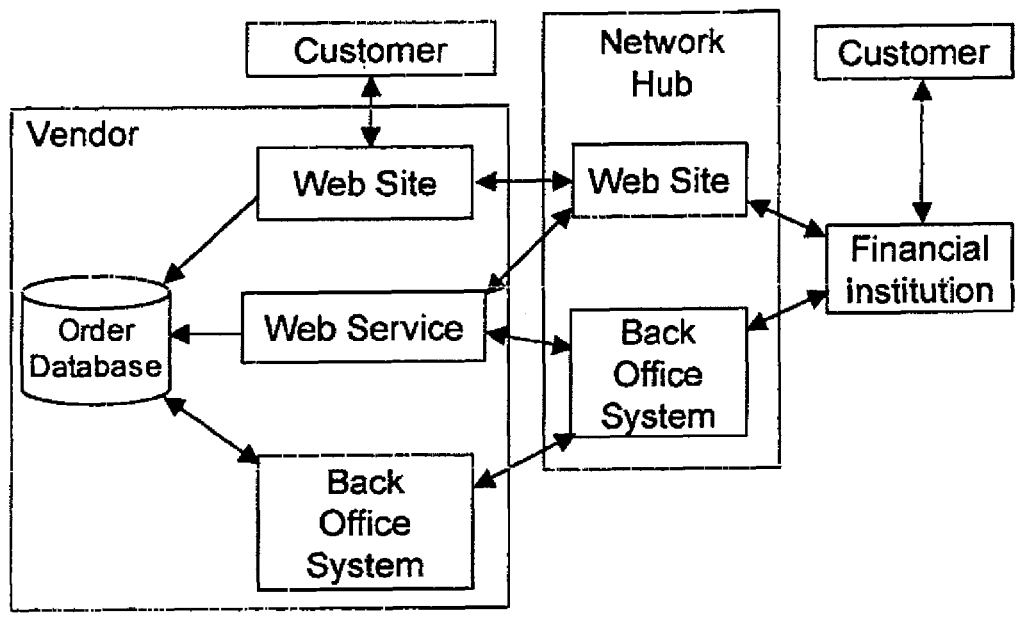
FIG. 54 is a schematic diagram of an exemplary embodiment of flow of the vendor processor of the present invention during the customer shopping process.

Shopping: FIG. 54 is a schematic diagram of an exemplary embodiment of flow of the vendor processor of the present invention during the customer shopping process. The financial institutions provide a single navigation link to the Network, which in turn links to an extensive network of vendors. For example, a customer may choose to shop for a new computer, then pay for it using his product loan account. No direct interaction between the vendor and the financial institution is required. Each organization connects only with the network entity, which acts as the broker for the transaction. The customer can initiate shopping on a vendor web site by either connecting direct to that site, or by navigating through the network entity Network.

Customer connects through the network entity Network: When a member selects the "Shopping" navigation provided on the financial institution's web site, the financial institution passes the customer to the network entity shopping web page. The customer is shown a list of vendors, or a means for finding a vendor (by category or name search). The customer selects the vendor he wishes, and the network entity passes the customer to the selected vendor. The network entity will encrypt and send with the customer certain information that should later be sent back with the customer. The network entity also provides to the selected vendor information about the customer so that the vendor is able to deliver selected goods to the customer and contact the customer if necessary, without the customer having to enter this information directly on the vendor's web page. The alternate to this is this information is not supplied, but is requested by the vendor later on in the purchase process, and the network entity provides this information to the vendor at the customer's request.

The customer selects goods on the Vendor's web site, and is then returned to the network entity to choose the account from which he wishes to finance this purchase. The customer has the choice of all linked financial accounts, and the ability to spread the payment across multiple accounts. If any of the linked accounts is a product loan account, as estimate is made of the monthly payments, based on If the customer selects a product loan account, insurance options are available on this loan.

The customer is then passed to the financial institution maintaining the selected account. The financial institution authorizes this transaction based on the transaction amount and the status of the account. The transaction is approved, declined, or approved subject to certain conditions (preliminary approval). The financial institution passes the customer back to the network entity with this authorization, and other transaction information (like an approval code), and the network entity adds the order into the database.

The network entity now completes the online transaction with the vendor with one of three options: a web service message; a back office message; or by passing the customer to the vendor. The vendor chooses the completion option. The vendor can also choose whether they wish to receive preliminary approvals, or wait until the final approval/denial. Requests sent to the vendor to complete the transaction preferably result in a response to the Network Entity. If the customer is passed to the vendor, the vendor may later return the customer to the network entity, at which point the customer will go to the shopping page (unless another purchase is initiated).

If the transaction was authorized by the financial institution with a preliminary approval, at a later time the financial institution approves or declines the transaction. The financial institution sends authorization notification to the network entity. A transaction completion message is then delivered to the vendor in the method required by the vendor (passing the customer to a vendor web page is not an option). A response is expected from the vendor.

Customer connects direct to Vendor: When a customer connects direct to a vendor, there is no Network information about the customer. When the customer is ready to make a purchase, one of the options available to him is to use the Product payment system. If selected, the vendor passes the customer to the network entity. The network entity identifies the customer and continues the transaction from the displays the payment options.

Authorized Transaction: The financial institutions approving the transaction will respond to the network entity in one of three ways: Approval, Preliminary Approval, and Decline. Approval is when the transaction has been fully approved. This is the equivalent of a Purchaser Order (PO). Preliminary Approval is when the transaction does not have final approval. A Transaction Completion (which is the equivalent of a PO) will follow at a later time. Declines do not get back to the vendor.

The vendor then has the choice of how it wishes to receive transaction approvals. For preliminary Approvals only, the vendor puts the order on hold until it receives a Transaction Completion message (equivalent to a PO). An approval from a financial institution will result in a Preliminary Approval followed immediately by a Transaction Completion message. A Transaction Completion message results in the vendor shipping the goods to the customer. For Approvals only, the vendor ships goods to the customer. The vendor preferably bears in mind in this instance that the approval may be a considerable time after the order was first selected (maybe a couple of weeks) as the network entity will drop a Preliminary Approval messages from a financial institution and forward a Transaction Completion message to the vendor as an Approval. For both preliminary approvals and approvals, how the vendor wishes to receive transaction approval may change transaction by transaction where appropriate.

The vendor also has the choice as to how it wishes to receive the following types of messages: Customer directed to the vendor web site (not available for Transaction Completion messages); Web Service message; Back Office message; and Back Office file (this will be a daily file containing all messages for the day).

Figure 55:
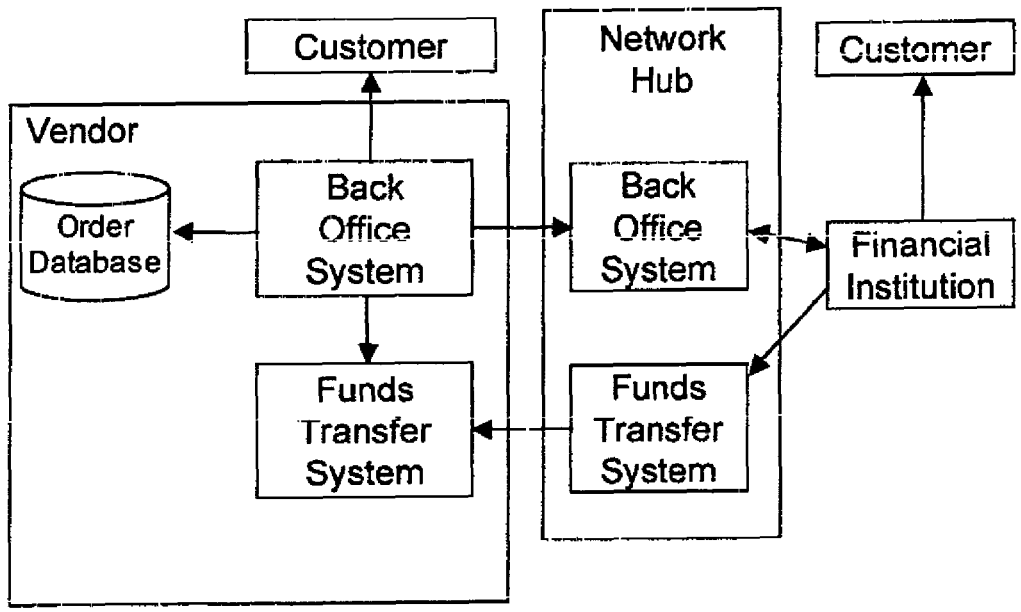
FIG. 55 is a schematic diagram of an exemplary embodiment of flow of the vendor processor of the present invention during the process of the completion of a customer purchase.

Purchase Process: FIG. 55 is a schematic diagram of an exemplary embodiment of flow of the vendor processor of the present invention during the process of the completion of a customer purchase. The customer has selected goods for purchase, and has been authorized by his financial institution. Now the network entity arranges payment for the purchase. This is initiated when the vendor delivers goods to the customer.

When the vendor has shipped the purchased product to the customer, they notify the network entity of this. The method of notification is the choice of the vendor—a web service message, or a back office message. If insurance is involved on a product loan for this purchase, the network entity initiates the insurance with the insurer. The network entity sends shipping notification to the financial institution, and then confirms receipt of the shipping notification to the vendor.

The financial institution delivers payment for goods from the customer's account to the network entity following standard accounting procedures. The network entity then forwards payments to the Vendor and Insurer following standard accounting procedures.

Full/Partial Reversal of Financial Transaction: There are occasions when not all goods are delivered to the customer, or the transaction is cancelled. This will result in a full or partial reversal of the transaction. The vendor will send notification of the partial/full reversal to the network entity. If insurance is involved in the transaction, insurance is re-calculated, and the insurer is notified. The network entity then sends a Web Service message to the financial institution with information on the reversal, and confirms receipt of the reversal to the vendor.

Figure 56:
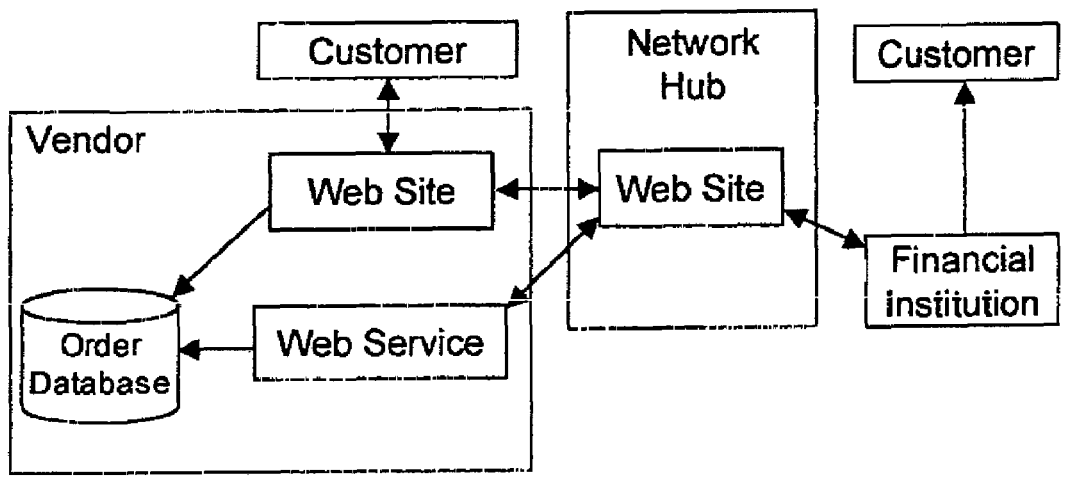
FIG. 56 is a schematic diagram of an exemplary embodiment of flow of the vendor processor of the present invention during the process of the customer making a purchase of a service.

Customer Purchase of Services: FIG. 56 is a schematic diagram of an exemplary embodiment of flow of the vendor processor of the present invention during the process of the customer making a purchase of a service. A different type of vendor in the Shopping Network is a Service Provider. A Service is a purchase that requires repeating monthly payments, e.g. Internet Broadband. This should result in an automatic payment in the customers Bill Pay system.

Once a customer has selected services from a vendor on the Shopping Network, the vendor passes the customer to the network entity with order information. The network entity then passes the customer to the financial institution with his money management account. Once the financial institution has added the appropriate repeating payment to the Bill Pay system, the customer is then passed back to the network entity with the authorization of this transaction. The network entity completes the online transaction with the vendor with one of three options: a web service message; a back office message; or by passing the customer to the vendor. The vendor chooses the completion option.

It should be noted that some purchases are for both goods and services, and therefore contain appropriate steps to facilitate both aspects of the purchase.

Figure 57:
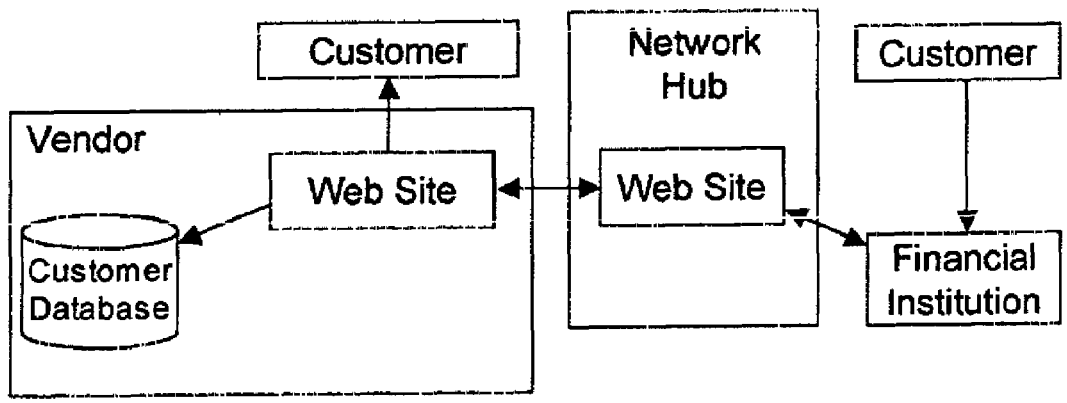
FIG. 57 is a schematic diagram of an exemplary embodiment of flow of the vendor processor of the present invention during the process of the customer linking accounts.

Customer Links Vendor Account: FIG. 57 is a schematic diagram of an exemplary embodiment of flow of the vendor processor of the present invention during the process of the customer linking accounts. It should be noted that this is an optional function to the vendor. A customer's Account Summary page with his financial institution becomes the central place from which he manages all of his financial and non-financial information. This includes the ability to link other accounts to this page. Examples of these accounts include: financial accounts at his home financial institution or other financial institutions; airline mileage accounts; shopping accounts (Amazon, eBay etc.); e-mail accounts; other vendor accounts etc.

Figure 58:
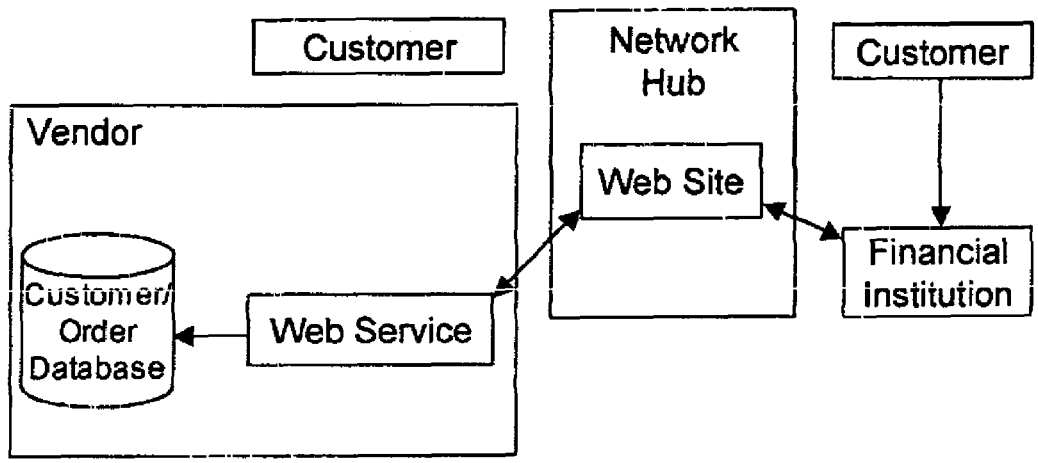
FIG. 58 is a schematic diagram of an exemplary embodiment of flow of the vendor processor of the present invention during the process of displaying an account summary page.

Customer Links Account to Account Summary: FIG. 58 is a schematic diagram of an exemplary embodiment of flow of the vendor processor of the present invention during the process of displaying an account summary page. The customer elects to link his vendor account to his financial institution Account Summary page on a network entity web page. This network entity web page transfers the customer to the vendor's logon page, where the customer logs on. If the customer has more than one account with the vendor, the customer is allowed to select which accounts he wishes to link. The vendor updates the customer record to indicate selected linked accounts, and returns the customer to the network entity web page with a vendor identification of each linked account.

Customer Links Purchase Status: It is also desirable to show the status of a purchase in process (or recently completed purchase) on the customer's financial institution account summary page. This is accomplished in the same manner as linking accounts above.

Customer Views Account Summary: FIG. 58 is a schematic diagram of an exemplary embodiment of flow of the vendor processor of the present invention during the process of displaying an account summary page. It should be noted that this is an optional function to the vendor. When the customer views his financial institution Account Summary page, linked account information is displayed. This information is collected from linked accounts. The network entity will send a Web Service message to the vendor asking for appropriate account information for accounts at this vendor that the customer has linked to his financial institution Account Summary page. The vendor returns a message to the network entity with the requested information for display on the Account Summary page.

Order summary: If the customer had made a purchase from the vendor that is in process, or has recently been delivered, the status of this purchase may also be displayed on the customer's financial institution Account Summary page. The network entity will send a web service message to the vendor asking for order status information.

Customer Connects to Linked Account: When a customer asks for detailed information on a linked account/order from his financial institution Account Summary page that belongs to this vendor, the network entity will send the customer to this vendor. At its discretion, the vendor may require the customer to log in. The vendor will then take the customer to the detailed information page for the requested account/order.

Figure 59:
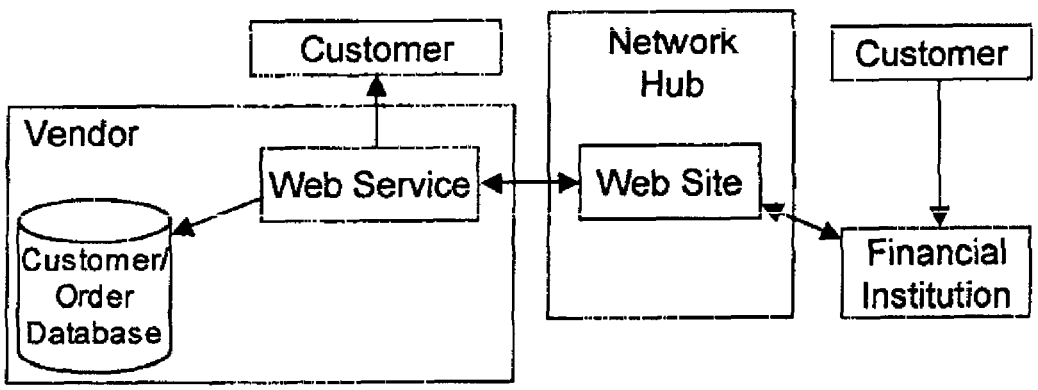
FIG. 59 is a schematic diagram of an exemplary embodiment of flow of the vendor processor of the present invention during the process of the customer updating his profile.

Customer Updates Profile: FIG. 59 is a schematic diagram of an exemplary embodiment of flow of the vendor processor of the present invention during the process of the customer updating his profile. It should be noted that this is an optional function to the vendor. A Customer has the ability to updates his profile at his financial institution, with that update automatically changed on other Linked Accounts. The network entity sends a Web Service message to the vendor when the customer changes his profile at a financial institution's web site. The vendor will update this information for the customer, and respond to the network entity with confirmation that this has been done.

Message Error Processing: In order to accommodate inherent problems in any communications system, error processing including reversals will be performed where necessary. In extreme circumstances manual intervention will be required.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A money management network configured to permit at least one financial transaction comprising:
   at least one customer having access to the money management network;
   at least one financial institution linked to at least one network hub, at the financial institution there being account information associated with the financial institution and with the customer, the account information having a financial institution customer identifier, wherein the money management network is configured such that the customer can request the transmission of the financial institution customer identifier from the financial institution to the network hub, and wherein the financial institution customer identifier is transmitted to the network hub;

at least one vendor linked to the at least one network hub, at the vendor there being vendor customer information associated with the vendor and with the customer, the vendor customer information having a vendor customer identifier, wherein the money management network is configured such that the customer can request the transmission of the vendor customer identifier from the vendor to the network hub, and wherein the vendor customer identifier is transmitted to the network hub; and, wherein within the network hub, the financial institution customer identifier and vendor customer identifier are selectively linked, thus forming a connection between the account information and the vendor customer information such that at least one financial transaction involving the financial institution, the vendor and the customer are permitted.

2. The money management network of claim 1 wherein the financial institution customer identifier and vendor customer identifier are selectively linked by the customer at a web site hosted by the network hub.

3. The money management network of claim 1 wherein the selective linking of the financial institution customer identifier and vendor customer identifier is further configured such that:

the customer having access to a web site hosted by the network hub, wherein the customer can request a link identifier, and wherein the network hub delivers a link identifier to the customer;

the customer having access to a web site hosted by the vendor, wherein the customer can request a network link using the link identifier, and wherein the vendor delivers the link identifier to the network hub with the vendor customer identifier;

the customer having access to a web site hosted by the financial institution, wherein the customer can request a network link using the link identifier, and wherein the financial institution delivers the link identifier to the network hub with the financial institution customer identifier; and, wherein within the network hub, the financial institution customer identifier associated with the link identifier and the vendor customer identifier associated with the link identifier are linked.

4. The money management network of claim 3 wherein the customer can request a link identifier from a web site hosted by a vendor, and wherein the customer receives a link identifier associated in the network hub with the vendor customer identifier.

5. The money management network of claim 1 further comprising at least one of the following:

(a) the customer having access to a web site hosted by the vendor, wherein the customer can select goods/services for purchase creating a purchase order;

(b) the customer having access to a web site hosted by the financial institution, wherein the customer can authorize payment for a selected vendor purchase order; and (c) the money management network configured such that the vendor receives funds from the customer in payment for selected goods/services.

6. The money management network of claim 1 wherein the at least one financial transaction consists of at least one of the following:

(a) from the vendor to the financial institution a purchase order;
(b) from the vendor to the financial institution a repeating purchase order;
(c) from the vendor to the financial institution a repeating variable purchase order;
(d) from the financial institution to the vendor a transaction authorization;
(e) from the vendor to the financial institution a transaction reversal/adjustment;
(f) from the financial institution to the vendor a transfer of funds;
(g) from the customer's account at the financial institution to a vendor account identified by the vendor a transfer of funds;
(h) from the vendor to the financial institution a transfer of funds;
(i) from the vendor to the financial institution a sufficient funds request;
(j) from the financial institution to the vendor an account balance;
(k) from the financial institution to the network hub an account balance; and,
(l) an other financial transaction.

7. A method of permitting a financial transaction on a money management network, comprising:

at least one financial institution within the money management network, associating account information with a customer and associating a financial institution customer identifier with the account information, the customer requesting the transmission of the financial institution customer identifier from the financial institution to at least one network hub within the money management network, the financial institution transmitting the financial institution customer identifier to the network hub;

at least one vendor within the money management network, associating vendor customer information with a customer and associating a vendor customer identifier with the vendor customer information, the customer requesting the transmission of the vendor customer identifier from the vendor to the at least one network hub within the money management network, the vendor transmitting the vendor customer identifier to the network hub;

within the network hub, selectively linking the financial institution customer identifier and the vendor customer identifier to thereby permit at least one transaction associated with each of the financial institution, the vendor and the customer.

8. The method of claim 7 wherein the customer at a web site hosted by the network hub selectively linking the financial institution customer identifier and the vendor customer identifier.

9. The method of claim 7 wherein the selective linking of the financial institution customer identifier and vendor customer identifier further comprises:

the customer at a web site hosted by the network hub requesting a link identifier, and wherein the network hub delivering a link identifier to the customer;

the customer at a web site hosted by the vendor requesting a network link using the link identifier, and wherein the vendor delivering the link identifier to the network hub with the vendor customer identifier;

the customer at a web site hosted by the financial institution requesting a network link using the link identifier, and wherein the financial institution delivering the link identifier to the network hub with the financial institution customer identifier; and, within the network hub, linking the financial institution customer identifier associated with the link identifier and the vendor customer identifier associated with the link identifier.

10. The method of claim 9 wherein the customer requesting a link identifier at a web site hosted by a vendor, and wherein the customer receiving a link identifier associated in the network hub with the vendor customer identifier.

11. The method of claim 7 further comprising at least one of the following:
   (a) the customer at a web site hosted by the vendor selecting goods/services for purchase creating a purchase order;
   (b) the customer at a web site hosted by the financial institution authorizing payment for a selected vendor purchase order; and
   (c) the money management network delivers funds from the customer to the vendor in payment for selected goods/services.

12. A financial institution within a money management network, the financial institution adapted to be linked to at least one network hub and wherein, at the financial institution a financial institution customer identifier is associated with account information that is associated with a customer, and wherein on request of the customer the financial institution is operable to transmit the financial institution customer identifier to the network hub, the financial institution customer identifier adapted to be linked with a vendor customer identifier within the network hub, the vendor customer identifier being associated with selected vendor customer information at a vendor, and wherein the linking of the financial institution customer identifier and the vendor customer identifier within the network hub thus forms a connection between the account information at the financial institution and the vendor customer information at the vendor that enables a transaction between the financial institution, the vendor and the customer, and wherein within the financial institution funds are transferred from at least one customer account such that funds will be received by the vendor.

13. The financial institution of claim 12 wherein the financial institution hosts a web site providing access to the customer, wherein the customer can request a network link using a link identifier previously obtained by the customer, and wherein the financial institution delivers the link identifier to the network hub with the financial institution customer identifier, and wherein within the network hub the financial institution customer identifier associated with the link identifier and the vendor customer identifier associated with the link identifier are linked.

* * * * *